(12) United States Patent
Takashima et al.

(10) Patent No.: US 8,261,096 B2
(45) Date of Patent: Sep. 4, 2012

(54) INFORMATION PROCESSING APPARATUS, INFORMATION RECORDING MEDIUM, INFORMATION PROCESSING METHOD, AND COMPUTER PROGRAM

(75) Inventors: Yoshikazu Takashima, Tokyo (JP); Tomoyuki Asano, Kanagawa (JP); Satoshi Kitani, Tokyo (JP); Katsumi Muramatsu, Tokyo (JP); Jun Yonemitsu, Kanagawa (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1418 days.

(21) Appl. No.: 10/567,505

(22) PCT Filed: Aug. 10, 2004

(86) PCT No.: PCT/JP2004/011476
§ 371 (c)(1),
(2), (4) Date: Apr. 17, 2006

(87) PCT Pub. No.: WO2005/017756
PCT Pub. Date: Feb. 24, 2005

(65) Prior Publication Data
US 2006/0227973 A1    Oct. 12, 2006

(30) Foreign Application Priority Data

Aug. 14, 2003  (JP) .................................. 2003-293308
Sep. 29, 2003  (JP) .................................. 2003-337665

(51) Int. Cl.
*G06F 12/14* (2006.01)
*H04N 7/167* (2011.01)
*H04L 29/06* (2006.01)

(52) U.S. Cl. ............ 713/193; 713/165; 713/171; 726/2; 726/6; 726/7; 726/26; 726/29; 726/30; 726/31; 726/32; 380/200; 380/201; 380/202; 380/203; 380/277; 380/278; 380/282

(58) Field of Classification Search ................... 713/193
See application file for complete search history.

(56) References Cited

U.S. PATENT DOCUMENTS 6,529,949 B1 * 3/2003 Getsin et al. .................. 709/217
(Continued)

FOREIGN PATENT DOCUMENTS

JP    2001-257670    9/2001
(Continued)

OTHER PUBLICATIONS

Horiuchi et al., "The New Method of License Key Management for Content Distribution System—key management for grouping content-," *IEEE International Conference on consumer electronics*, Jun. 17, 2003, pp. 56-57.

*Primary Examiner* — Edan Orgad
*Assistant Examiner* — Jenise Jackson
(74) *Attorney, Agent, or Firm* — K&L Gates LLP

(57) ABSTRACT

An information processing apparatus, an information recording medium, an information processing method, and a computer program are provided.
In an information recording medium storing many pieces of content, a configuration that allows use management on segmented content basis is provided. A plurality of content management units corresponding to title, index and other information are set by partitioning stored content in an information recording medium. Different unit keys that are encryption keys are allocated to different content management units. At least the content real data included in each content management unit is encrypted by use of the unit key and the encrypted data is stored. In content reproduction, units are identified and decryption is executed by use of a unit key corresponding to each unit for reproduction. In an information recording medium storing many pieces of content for example, each of segmented pieces of content may be managed.

43 Claims, 37 Drawing Sheets

U.S. PATENT DOCUMENTS

| | | | |
|---|---|---|---|
| 7,555,779 B2 * | 6/2009 | Nakano et al. | 726/26 |
| 2003/0079222 A1 * | 4/2003 | Boykin et al. | 725/31 |
| 2005/0065890 A1 * | 3/2005 | Benaloh | 705/51 |
| 2005/0097062 A1 * | 5/2005 | Benaloh | 705/71 |
| 2005/0193210 A1 * | 9/2005 | Benaloh | 713/182 |
| 2005/0262267 A1 * | 11/2005 | Jennings | 709/238 |
| 2006/0165388 A1 * | 7/2006 | Uesaka et al. | 386/125 |
| 2006/0212400 A1 * | 9/2006 | Kamperman et al. | 705/51 |
| 2008/0253734 A1 * | 10/2008 | Kang et al. | 386/46 |
| 2008/0282083 A1 * | 11/2008 | Risan et al. | 713/153 |

FOREIGN PATENT DOCUMENTS

| | | |
|---|---|---|
| JP | 2003-87237 | 3/2003 |

* cited by examiner

FIG. 5

| TITLE | CONTENT MANAGEMENT UNIT (CPS) | UNIT KEY (CPS) |
|---|---|---|
| TITLE 1 | CPS1 | Ku1 |
| TITLE 2 | CPS1 | Ku1 |
| TITLE 3 | CPS2 | Ku2 |
| ..... | ..... | ..... |
| TITLE n | CPSm | Kum |

FIG. 7

| APPLICATION INDEX | CONTENT MANAGEMENT UNIT (CPS) | UNIT KEY (CPS) |
|---|---|---|
| GAME 1 | CPS1 | Ku1 |
| GAME 2 | CPS2 | Ku2 |
| WEB 1 | CPS1 | Ku1 |
| ..... | ..... | ..... |
| OTHERS n | CPSm | Kum |

FIG. 9

| REPRODUCTION PROGRAM (MOVIE OBJECT) | CONTENT MANAGEMENT UNIT (CPS) | UNIT KEY (CPS) |
|---|---|---|
| REPRODUCTION PROGRAM 1 | CPS1 | Ku1 |
| REPRODUCTION PROGRAM 2 | CPS1 | Ku1 |
| REPRODUCTION PROGRAM 3 | CPS2 | Ku2 |
| ..... | ..... | ..... |
| REPRODUCTION PROGRAM n | CPSm | Kum |

FIG. 11

| REPRODUCTION SECTION SPECIFICATION FILE (PLAY LIST) | CONTENT MANAGEMENT UNIT (CPS) | UNIT KEY (CPS) |
|---|---|---|
| PLAY LIST 1 | CPS1 | Ku1 |
| PLAY LIST 2 | CPS1 | Ku1 |
| PLAY LIST 3 | CPS2 | Ku2 |
| ..... | ..... | ..... |
| PLAY LIST n | CPSm | Kum |

FIG. 13

| CLIP | CONTENT MANAGEMENT UNIT (CPS) | UNIT KEY (CPS) |
|---|---|---|
| CLIP 1 | CPS1 | Ku1 |
| CLIP 2 | CPS1 | Ku1 |
| CLIP 3 | CPS2 | Ku2 |
| ..... | ..... | ..... |
| CLIP n | CPSm | Kum |

FIG. 15

| APPLICATION INDEX | REPRODUCTION SECTION SPECIFICATION FILE (PLAY LIST) | CONTENT MANAGEMENT UNIT (CPS) | UNIT KEY (CPS) |
|---|---|---|---|
| | PLAY LIST 1 | CPS1 | Ku1 |
| | PLAY LIST 2 | CPS1 | Ku1 |
| | PLAY LIST 3 | CPS2 | Ku2 |
| GAME 1 | | CPS3 | Ku3 |
| GAME 2 | | CPS4 | Ku4 |
| WEB 1 | | CPS3 | Ku3 |
| ...... | ...... | ...... | ...... |
| OTHERS n | | CPSm | Kum |

FIG. 18

| INDEX OR APPLICATION FILE ON APPLICATION LAYER | CONTENT MANAGEMENT UNIT (CPS) | UNIT KEY (CPS) |
|---|---|---|
| TITLE 1 | CPS1 | Ku1 |
| TITLE2 | CPS1 | Ku1 |
| APPLICATION 1 | CPS2 | Ku2 |
| APPLICATION 2 | CPS3 | Ku3 |
| ...... | ...... | ...... |
| OTHERS n | CPSm | Kum |

FIG. 21

| CONTENT MANAGEMENT UNIT (CPS) | INITIAL STATUS | CURRENT STATUS |
|---|---|---|
| CPS1 | Discrete only | Discrete |
| CPS2 | Discrete initially | Bound |
| CPS3 | Bound only | Bound |
| CPS4 | Bound initially | Discrete |
| ..... | ..... | ..... |
| CPSm | Discrete only | Discrete |

FIG. 22

| Field NAME | num of bits |
|---|---|
| Num_of_Content | 16 |
| for(I=0;I<Num_of_Content;I++){ CCI_and_other_info_for_Content[I] | 128 |
| } | |

CONTENTS OF CCI_and_other_info_for_Content[I] : PART OR ALL OF THE INFORMATION SHOWN BELOW IS HELD BY FLAG OR VALUE; ANY NUMBER OF BITS MAY BE USED BY VALUE

| | (FLAG/VALUE) | (CONTENTS) |
|---|---|---|
| <OPERATION IN DISCRETE STATUS> | | |
| REPRODUCTION | FLAG | OK/NG |
| METHOD OF REPRODUCING CONTENT THAT CANNOT BE REPRODUCED IN DISCRETE STATUS | VALUE | CONNECTION TO KEY DISTRIBUTION SERVER, LOADING OF MEMORY CARD STORING KEY, ETC. |
| SERVER SPECIFICATION | VALUE | INDEX VALUE TO SERVER LIST |
| <OPERATION IN BOUND STATUS> | | |
| COPY/STREAMING COMPATIBILITY INFORMATION | VALUE | COMPATIBILITY INFORMATION FOR REPRODUCING CONTENT BY ANOTHER DEVICE IN NETWORK |
| METHOD OF DATA CONVERSION AT COPY/STREAMING | VALUE | METHOD AVAILABLE WHEN CONVERTING CONTENT SO AS TO BE REPRODUCED BY ANOTHER DEVICE |
| COPYABILITY TO RECORDING MEDIA OF SAME TYPE IN NETWORK | FLAG | OK/NG |
| COPY COUNT TO RECORDING MEDIA OF SAME TYPE IN NETWORK | VALUE | NUMBER OF TIMES COPY IS MADE |
| EXPIRATION DATE OF COPY TO RECORDING MEDIA OF SAME TYPE IN NETWORK | VALUE | EXPIRATION DATE OF COPY |
| COPYABILITY TO RECORDING MEDIA OF DIFFERENT TYPE IN NETWORK | FLAG | OK/NG |
| COPY COUNT OF COPY TO RECORDING MEDIA OF DIFFERENT TYPE IN NETWORK | VALUE | NUMBER OF TIMES COPY IS MADE |
| EXPIRATION DATE OF COPY TO RECORDING MEDIA OF DIFFERENT TYPE IN NETWORK | VALUE | EXPIRATION DATE OF COPY |
| AVAILABILITY OF DATA TO BE COPIED TO RECORDING MEDIA OF DIFFERENT TYPE IN NETWORK | FLAG | OK/NG |
| SPECIFICATION OF DATA TO BE COPIED TO RECORDING MEDIA OF DIFFERENT TYPE IN NETWORK | VALUE | INDEX VALUE FOR SPECIFYING DATA TO BE COPIED |
| COPYABILITY TO PORTABLE DEVICE | FLAG | OK/NG |
| COPY COUNT TO PORTABLE DEVICE | VALUE | NUMBER OF TIMES COPY IS MADE |
| EXPIRATION DATE OF COPY TO PORTABLE DEVICE | VALUE | EXPIRATION DATE OF COPY |
| AVAILABILITY OF DATA TO BE COPIED TO PORTABLE DEVICE | FLAG | OK/NG |
| SPECIFICATION OF DATA TO BE COPIED TO PORTABLE DEVICE | VALUE | INDEX VALUE FOR SPECIFYING DATA TO BE COPIED |
| PERMISSION OF STREAMING | FLAG | OK/NG |
| SPECIFICATION OF SUBJECT THAT RECEIVES STREAMING | VALUE | RESTRICTION OF SUBJECT DEVICES |
| PERMISSION OF REMOTE REPRODUCTION | FLAG | OK/NG |
| SPECIFICATION OF SUBJECT THAT RECEIVES REMOTE REPRODUCTION | VALUE | RESTRICTION OF SUBJECT DEVICES |
| PROCESSING OF SUBJECT TO BE EXECUTED WHEN CONTENT BECAME NO BOUND STATUS | VALUE | IMMEDIATE INVALIDATION, INVALIDATION AFTER CERTAIN PERIOD, OR DELETION OF COPY |
| DOWNLOAD DATA TYPE | VALUE | DOWNLOAD DATA TYPE (SUBTITLES, AUDIO, STILL IMAGE, ETC.) |
| DOWNLOAD DATA ACQUISITION METHOD | VALUE | CONNECTION TO DOWNLOAD SERVER, LOADING OF MEMORY CARD STORING DATA, ETC. |
| 501 { SPECIFICATION OF DOWNLOAD SERVER | VALUE | INDEX VALUE TO DOWNLOAD SERVER LIST |
| ACQUISITION OF OPERATION CONTROL INFORMATION FROM SERVER | FLAG | DEPEND ON OPERATION CONTROL INFORMATION ACQUIRED FROM SERVER |
| SPECIFICATION OF SERVER FOR ACQUIRING OPERATION CONTROL INFORMATION | VALUE | INDEX VALUE TO SERVER LIST INDICATIVE OF SERVER FOR ACQUIRING OPERATION CONTROL INFORMATION |

FIG. 23

(A) PUTTING ALL INFORMATION INTO ONE LOOP

| Field NAME | num of bits |
|---|---|
| Num_of_Content | 16 |
| for(I=0;I<Num_of_Content;I++){ | |
|   Num_of_function | 16 |
|   for(J=0;J<Num_of_function;J++){ | |
|     CCI_and_other_info_length | 16 |
|     CCI_and_other_info_type | 8 |
|     CCI_and_other_info_value | 8 |
|     Additional_info | N |
|   } | |
| } | |

(B) DIVIDING LOOP BY STATUS

| Field NAME | num of bits |
|---|---|
| Num_of_Content | 16 |
| for(I=0;I<Num_of_Content;I++){ | |
|   Num_of_Discrete_function | 16 |
|   for(J=0;J<Num_of_function;J++){ | |
|     CCI_and_other_info_for_length | 16 |
|     CCI_and_other_info_type | 8 |
|     CCI_and_other_info_value | 8 |
|     Additional_info | N |
|   } | |
|   Num_of_Bound_function | 16 |
|   for(J=0;J<Num_of_function;J++){ | |
|     CCI_and_other_info_length | 16 |
|     CCI_and_other_info_type | 8 |
|     CCI_and_other_info_value | 8 |
|     Additional_info | N |
|   } | |
| } | |

LIST OF CCI_and_other_info_for_type AND CONTENTS OF CCI_and_other_info_value AND Additional_info

| "CCI_and_other_info_type" | "CCI_and_other_info_value" | "Additional_info" |
|---|---|---|
| REPRODUCTION IN DISCRETE STATUS | OK/NG | METHOD OF REPRODUCING CONTENT THAT IS NOT REPRODUCIBLE IN DISCRETE STATUS |
| COPY TO RECORDING MEDIA OF SAME TYPE IN NETWORK | OK/NG | SPECIFICATION OF SERVER |
| COPY TO RECORDING MEDIA OF DIFFERENT TYPE IN NETWORK | OK/NG | COPY COUNT, EXPIRATION DATE, AVAILABILITY OF DATA FOR COPY, SPECIFICATION OF DATA FOR COPY, SPECIFICATION OF METHOD OF DATA CONVERSION FOR COPY |
| | | COPY COUNT, EXPIRATION DATE, AVAILABILITY OF DATA FOR COPY, SPECIFICATION OF DATA FOR COPY, SPECIFICATION OF METHOD OF DATA CONVERSION FOR COPY |
| COPY TO PORTABLE DEVICE | OK/NG | COPY COUNT, EXPIRATION DATE, AVAILABILITY OF DATA FOR COPY, SPECIFICATION OF DATA FOR COPY, SPECIFICATION OF METHOD OF DATA CONVERSION FOR COPY |
| STREAMING IN NETWORK | OK/NG | SPECIFICATION OF DEVICE SUBJECT TO STREAMING, AVAILABILITY OF DATA FOR STREAMING, SPECIFICATION OF DATA FOR STREAMING, SPECIFICATION OF METHOD OF DATA CONVERSION FOR STREAMING |
| REMOTE REPRODUCTION IN NETWORK | OK/NG | SPECIFICATION OF DEVICE SUBJECT TO REMOTE REPRODUCTION |
| PROCESSING TO BE EXECUTED WHEN BOUND STATUS IS CLEARED | VALUE | IMMEDIATE INVALIDATION, INVALIDATION AFTER CERTAIN PERIOD, OR DELETION OF COPY |
| REPRODUCTION OF DOWNLOAD DATA | VALUE (DATA TYPE) | SPECIFICATION OF METHOD OF ACQUIRING DOWNLOAD DATA, DOWNLOAD SERVER |
| INFORMATION FOR ACQUIRING OPERATION CONTROL INFORMATION FROM SERVER | VALUE | SPECIFICATION OF SERVER |
| USER-DEFINED INFORMATION | UNIQUELY DEFINED BY CONTENT OWNER | UNIQUELY DEFINED BY CONTENT OWNER |

502
503

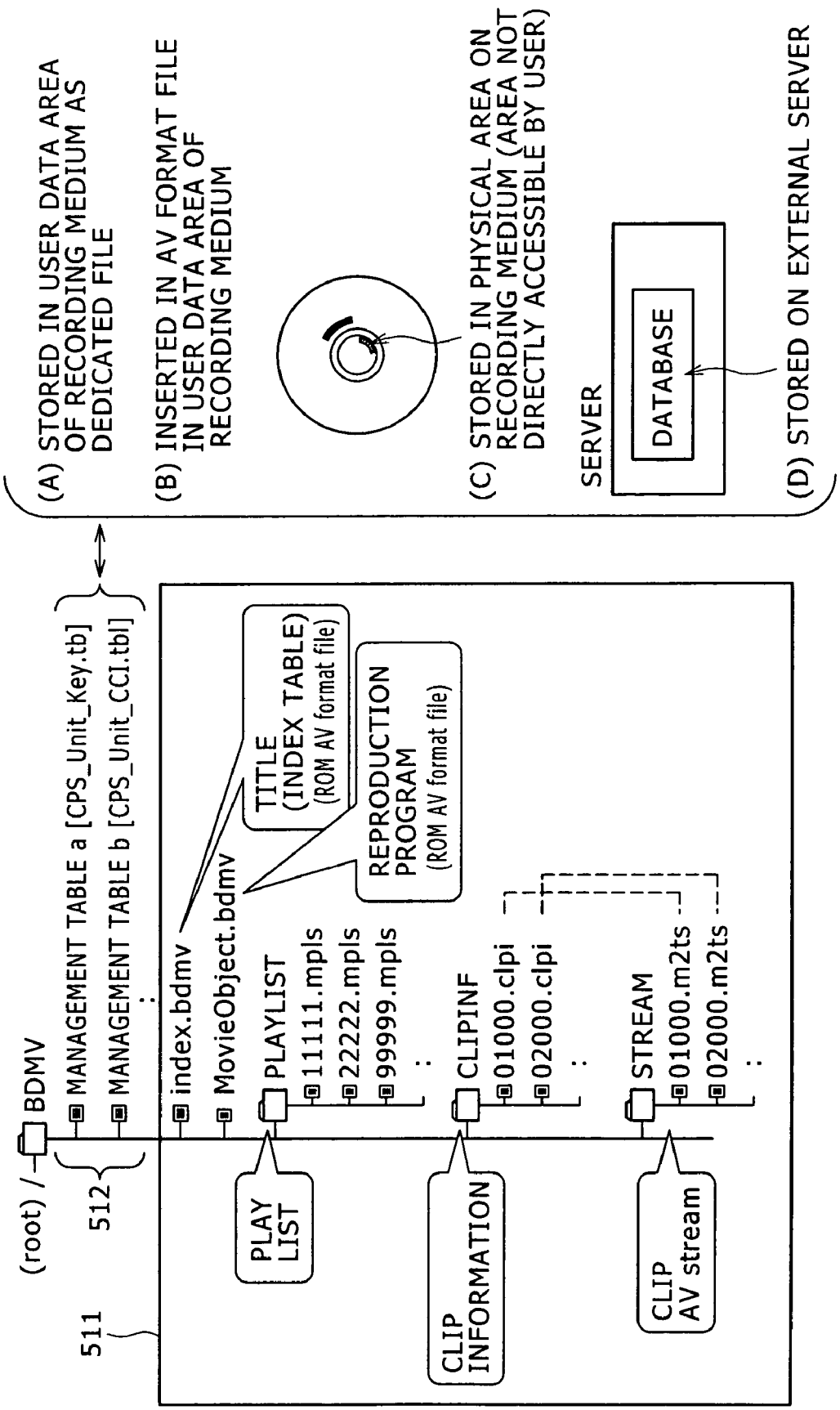

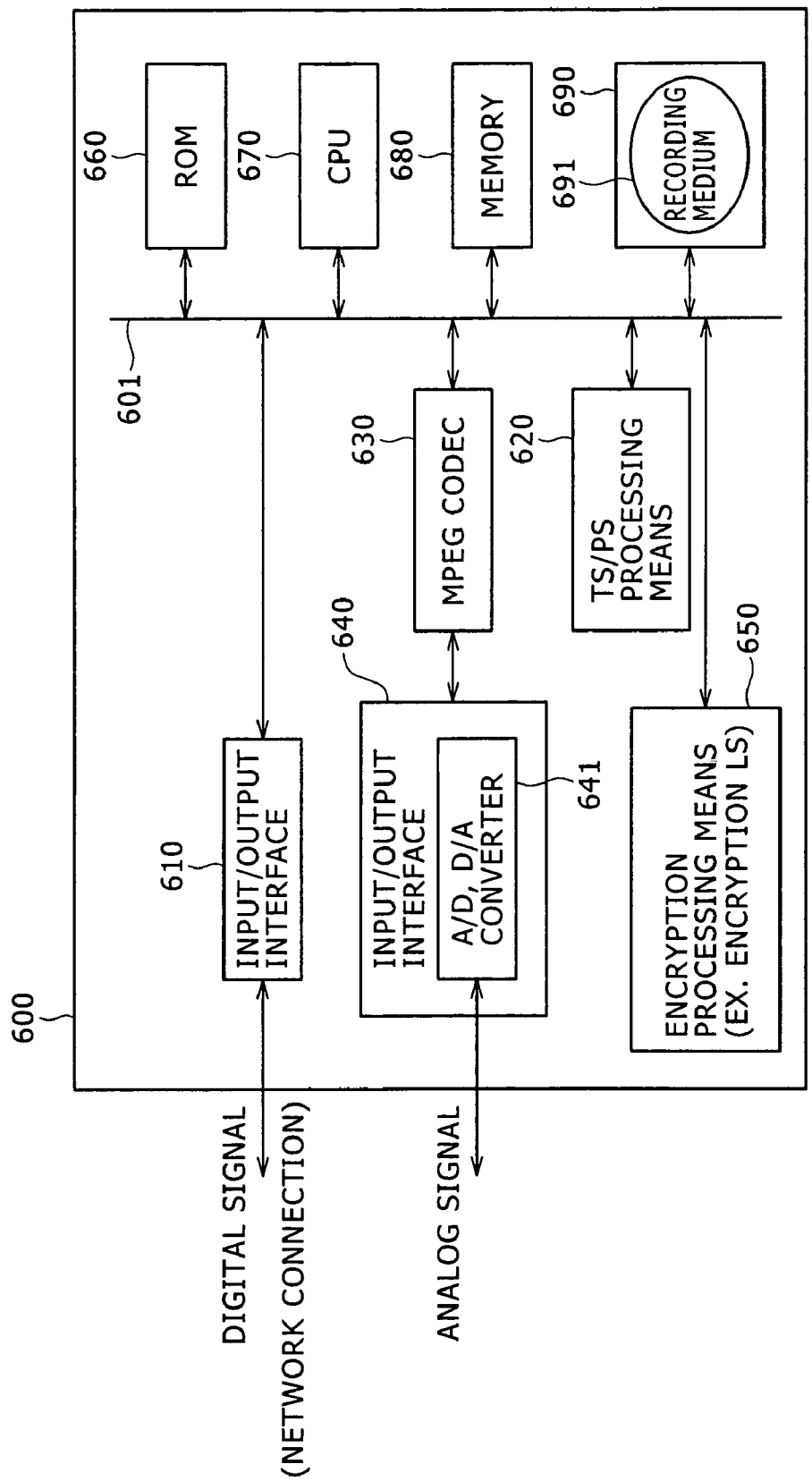

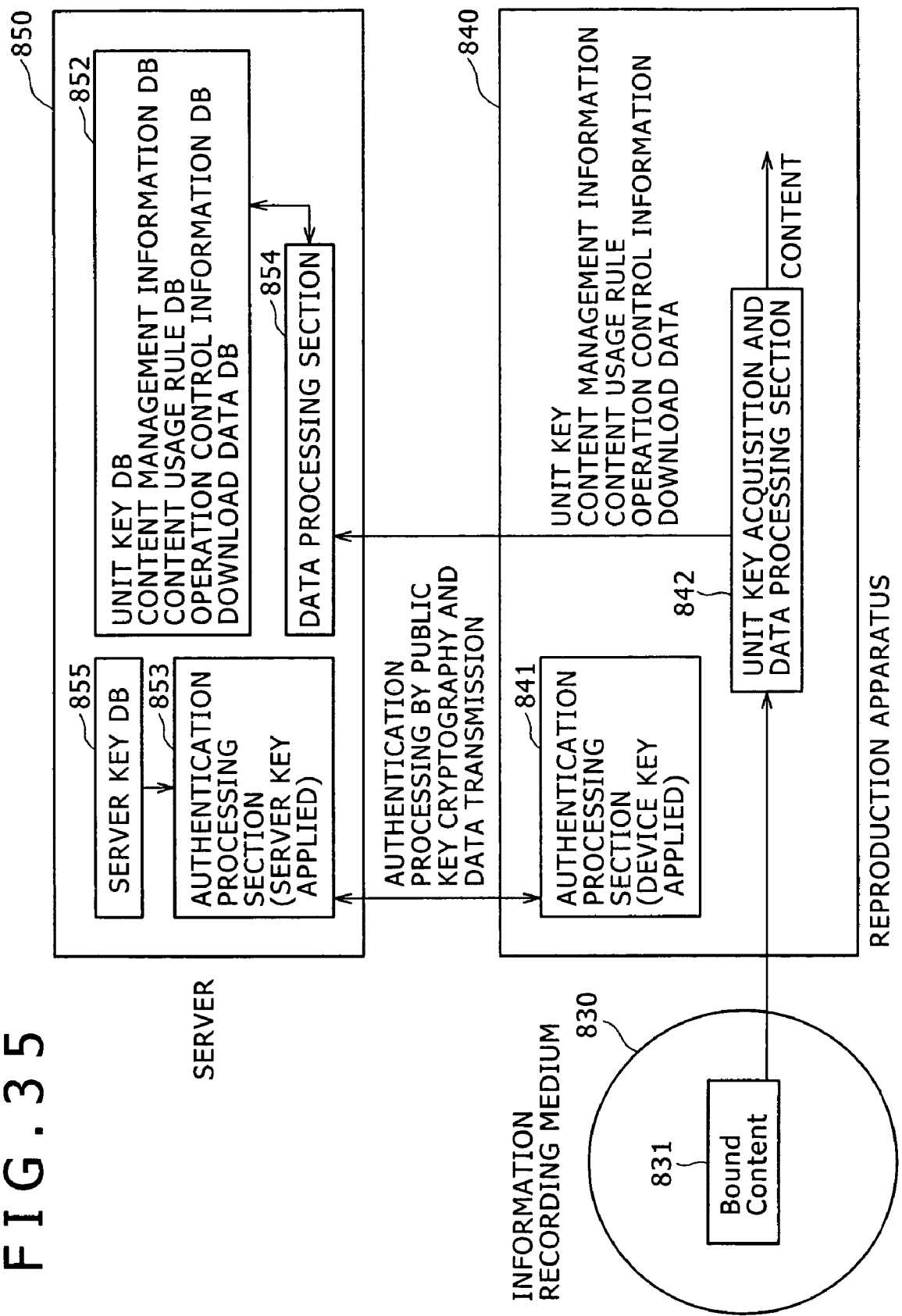

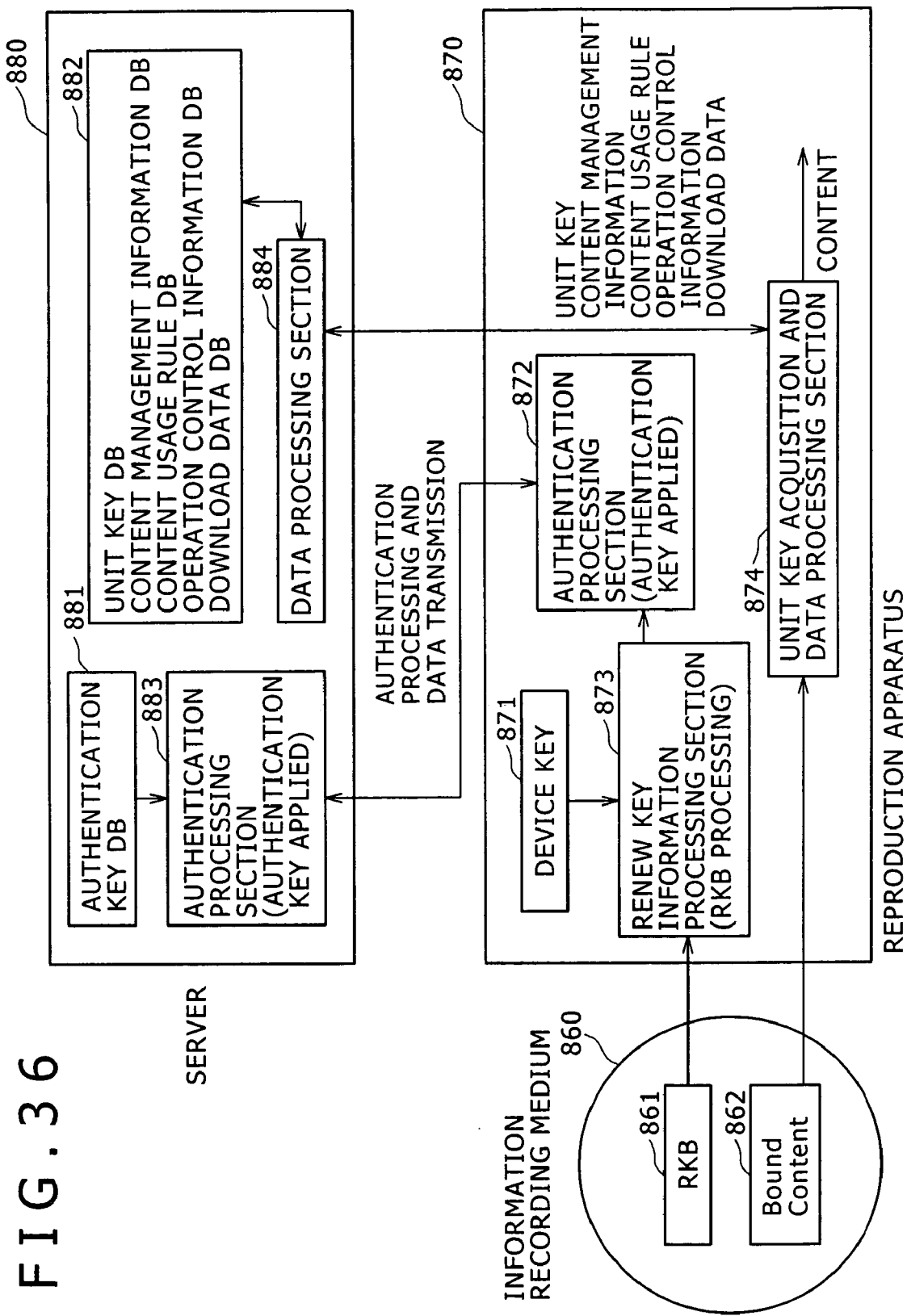

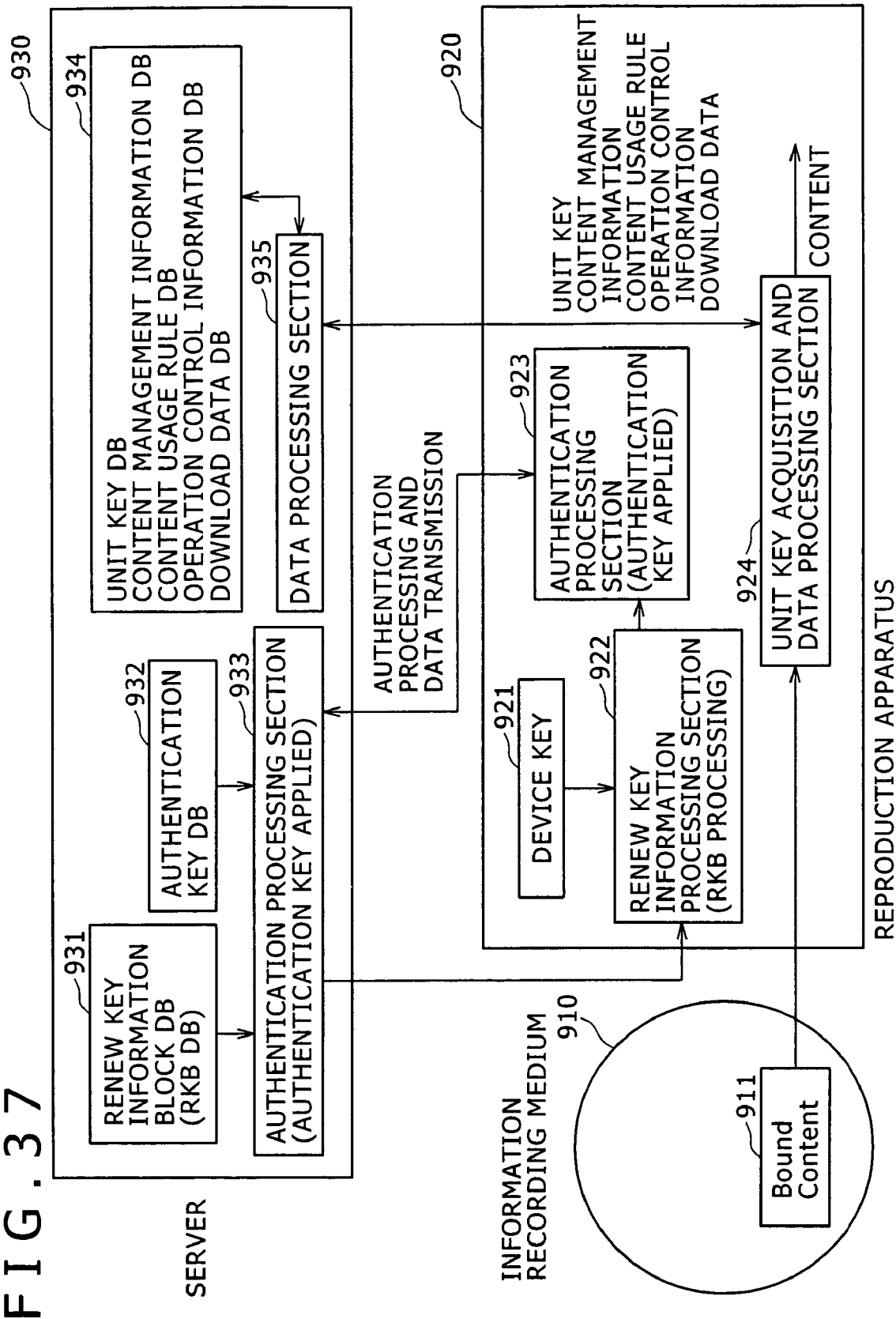

INFORMATION PROCESSING APPARATUS, INFORMATION RECORDING MEDIUM, INFORMATION PROCESSING METHOD, AND COMPUTER PROGRAM

CROSS REFERENCE TO RELATED APPLICATIONS

The present application claims priority to Japanese Patent Document Nos. P2003-293308 filed on Aug. 14, 2003 and P2003-337665 filed on Sep. 29, 2003, the disclosures of which are herein incorporated by reference.

The present invention relates to an information processing apparatus, an information recording medium, an information processing method, and a computer program. More particularly, the present invention relates to an information processing apparatus, an information recording medium, an information processing method, and a computer program that realize, in the utilization of content of information recording media storing various kinds of content requiring copyright management, copyright management and utilization management on a data unit basis that is provided by segmenting content stored in such recording media.

Audio data such as music, image data such as movies, game programs, various application programs, and other various kinds of software data (hereafter referred to as content) may be stored on recording media such as DVD (Digital Versatile Disc), MD (Mini Disc), and CD (Compact Disc) for example as digital data. Recently, discs permitting high-density recording based on blue lasers have been developed. Digital content is stored in these various kinds of information recording media for the provision to users. Users reproduce and use content by means of reproduction apparatus such as their PCs (Personal Computers) and disc players for example.

The distribution right and other rights of various kinds of content such as music data and image data are generally owned by creators or sellers thereof. Therefore, it is a general practice, in the distribution of content, to configure each piece of content such that certain usage rules are applied, namely, only authorized users are allowed to access content, thereby preventing any unauthorized duplication for example of content from occurring.

Especially, recording apparatuses and recording media for digitally recording information have recently been gaining in popularity. These digital recording apparatuses and digital recording media allow the repetition of recording and reproduction without involving the degradation of image and audio qualities for example. This in turn has been causing problems of the distribution of illegally copied content via the Internet, the circulation of so-called pirated discs in which content is illegally copied on CD-R and other types of discs, and the use of copy content stored on hard discs of PCs for example.

Mass-storage recording media such as DVDs and recording media recently developed by use of blue lasers allow one piece of recording medium to digitally store mass data like one or more movies. This capability of recording video information and so on as digital information increasingly makes it important to prevent illegal copying from practicing and to protect copyright owners. These days, various kinds of technologies have been put into practical use for this purpose.

For example, with DVD players, a content scramble system is used. In the content scramble system, video data, audio data, and/or other kinds of data are recorded on each DVD-ROM (Read Only Memory) in an encrypted manner and a key for decrypting the encrypted data is given to each licensed DVD player. The license is given only to those DVD players which are designed to comply with predetermined operation rules such as against illegal copy operations. Therefore, each licensed DVD player is able to decrypt the encrypted data recorded to each DVD-ROM by use of the given key, thereby reproducing image and audio data from the DVD-ROM.

On the other hand, unlicensed DVD players have no keys for decrypting, so that these players cannot decrypt the encrypted data recorded on DVD-ROMs. Thus, the content scramble system configuration prevents each DVD player not satisfying license conditions from reproducing the DVD-ROMs recording digital data, thereby excluding illegal copy operations.

Recently, so-called home networks have been gaining in popularity supported by the growth of data communication networks, in which household appliances, computers, and peripheral devices are interconnected by a network for communication with each other. Home networks provide users with convenience and amenity on the basis of the communication between networked devices to share the data processing capabilities of the networked devices and transferring content between these devices. For these advantages, home networks are expected to increasingly spread in the future.

The advancing networking as described above increases chances for the content stored in information storage media to be used from devices connected to a home network. The above-mentioned related-art illegal copy prevention system is based on a basic concept that content reproduction is permitted only on one licensed device for example. Therefore, this system does not fully consider a situation in which a networked device loaded with a recording medium, a home server or a player for example, is accessed by another networked device, a PC or a TV set for example, thereby reproducing content via a network.

Conventionally, the main use form of content is that one piece of content stored in a recording medium is executed by one reproduction apparatus, so that it is enough for content use management only to set a content usage right such as a license to each piece of content or to each reproducing apparatus. However, the recent rapid increase in the storage size of information recording media and the recent rapid digitization and networking of household appliances and electronic devices require different content use management configurations from the conventional ones. To be more specific, the following requirements have come up for example.

(1) Realizing a configuration that allows the recording of plural pieces of content on a recording medium and the management of use for each of the recorded content;

(2) Realizing a content use management configuration that allows the use of content within particular networks such as home networks, namely, the content reproduction by networked devices or the content copying for home servers for example; and (3) Realizing a configuration for securely distributing, to particular users, the information necessary for content reproduction such as a key to be applied to the decryption of content for example via a network.

It is required to substantialize the above-mentioned configurations (1) through (3).

SUMMARY

It is therefore an object of the present invention to provide an information processing apparatus, an information recording medium, an information processing method, and a computer program for realizing the copyright management and the use management for each piece of data obtained by segmenting the content stored in recording media in the content use of information recording media storing various kinds of content requiring copyright management.

In carrying out the invention and according to a first aspect thereof, an information recording medium storing content having a configuration in which a content management unit that is a data section area includes at least any one of:
content stored in an information recording medium;
a content reproduction section specification file;
a content reproduction processing program;
an application index file; and
an application execution file
is set; and
any one of a data file and a program file included in the content management unit is stored as encrypted data based on an individual unit key corresponding to the content management unit.

In the above-mentioned information recording medium, at least some of content management units set in the information recording medium are units set in correspondence with title information or index information of each piece of content stored in the information recording medium and a unique content management unit and a unit key corresponding thereto are determined on the basis of the selection of the title information and the index information.

In the above-mentioned information recording medium, the title information and the index information are presentable to a user.

In the above-mentioned information recording medium, at least some of content management units set in the information recording medium are units that are set in correspondence with a plurality of content reproduction processing programs stored in the information recording medium, and a unique content management unit and a unit key corresponding thereto are determined on the basis of the determination of the plurality of content reproduction processing programs to be executed on a reproducing apparatus on which the information recording medium is loaded.

In the above-mentioned information recording medium, at least some of content management units set in the information recording medium are units that are set in correspondence with a plurality of content reproduction section specification files stored in the information recording medium, and a unique content management unit and a unit key corresponding thereto are determined on the basis of the content reproduction section specification file selected by the content reproduction processing program to be executed on a reproducing apparatus on which the information recording medium is loaded.

In the above-mentioned information recording medium, at least some of content management units set in the information recording medium are units that are set in correspondence with clip files that are a plurality of content real data storage files stored in the information recording medium, and a unique content management unit and a unit key corresponding thereto are determined on the basis of a reproduction clip file selected by the content reproduction processing program to be executed on a reproducing apparatus on which the information recording medium is loaded.

In the above-mentioned information recording medium, content management units set in the information recording medium include a first unit including content real data stored in the information recording medium and a second unit not including content real data but including an application execution file corresponding to an application index file stored in the information recording medium, the first unit and the second unit including at least one of a data file and a program file encrypted by different unit keys.

In the above-mentioned information recording medium, at least some of content management units set in the information recording medium are configured as units including an application execution file and a content reproduction processing program stored in the information recording medium.

In the above-mentioned information recording medium, at least some of content management units set in the information recording medium are configured as units including an application execution file, a content reproduction processing file, and an application resource file for use in the execution of the application execution file stored in the information recording medium.

In the above-mentioned information recording medium, some of content management units set in the information recording medium are configured as units including a content reproduction section specification file, an AV stream file as content real data to be referenced from the content reproduction section specification file, an application execution file, and an application resource file for use in the execution of the application execution file stored in the information recording medium.

In the above-mentioned information recording medium, a management table in which unit setting unit information, content management unit identification information, and unit key identification information are related with each other as information forming each of the content management unit is stored.

In the above-mentioned information recording medium, the information recording medium stores a status management table in which status information indicative whether each of the content management units is in network independent status or network associated status is stored.

In the above-mentioned information recording medium, the status management table stores at least initial status information of each content management unit.

In the above-mentioned information recording medium, the status management table stores initial status information and current status information of each content management unit.

In the above-mentioned information recording medium, content use management information table storing restriction information associated with content use for each content management unit is stored.

In the above-mentioned information recording medium, the content use management information table records use restriction information indicative whether the content management unit is in network independent status or network associated status.

In the above-mentioned information recording medium, the content use management information table has information indicative that content is subject to control on the basis of externally obtainable operation control information.

In the above-mentioned information recording medium, the content use management information table includes information for specifying a server for obtaining the operation control information.

In the above-mentioned information recording medium, the information recording medium stores content for copy processing or streaming reproduction in addition to original content.

In the above-mentioned information recording medium, the content for copy processing or streaming reproduction has a different data format than that of the original content.

In carrying out the invention and according to a second aspect thereof, an information processing apparatus for executing reproduction of content stored in an information recording medium includes:

a unit key acquisition section for identifying a content management unit including a data area selected for reproduction or execution from content or a program stored in the information recording medium so as to acquire a unit key corresponding to the identified content management unit; and a data processing section for decrypting encrypted data included in the content management unit by use of the unit key selected by the unit key acquisition section.

In the above-mentioned information processing apparatus, the unit key acquisition section is configured to detect content management unit switching on the basis of a management table in which unit setting unit information, content management unit identification information, and unit key identification information are related with each other and, in accordance with the detected information, execute applicable unit key change processing.

The above-mentioned information processing apparatus further includes: a renewal key information block processing section for executing the unit key acquisition processing by decrypting a renewal key information block that may be processed only with a key stored in an information processing apparatus having a legal content use right, the key being set in correspondence with the content management unit.

In the above-mentioned information processing apparatus, the renewal key information block acquires from an information recording medium or a networked server.

The above-mentioned information processing apparatus further includes: an authentication processing section for executing authentication processing with a networked server. Upon successful authentication, the unit key acquisition section or the data processing section acquires information necessary for content reproduction including a unit key from the server.

The above-mentioned information processing apparatus further includes: a renewal key information block processing section for acquiring an authentication key to be applied to authentication processing with a networked server by decrypting a renewal key information block that may be processed only with a key set in correspondence with the content management unit and stored in an information processing apparatus having a legal content use right; and an authentication processing section for authenticating a server by applying the authentication key obtained by the processing by the renewal key information block processing section. Upon successful authentication, the unit key acquisition section or the data processing section acquires information necessary for content reproduction including a unit key from the server.

In the above-mentioned information processing apparatus, the data processing section determines whether the content management unit is in network independent status or network associated status and executes content use control in accordance with a decision.

In the above-mentioned information processing apparatus, the content use control is executed on the basis of a content use management information table storing control information associated with use of each the content management unit.

In the above-mentioned information processing apparatus, the data processing section receives operation control information corresponding to content stored in the information recording medium from the networked server and, in accordance with control based on the received operation control information, reproduces or copies the content stored in the information recording medium.

In the above-mentioned information processing apparatus, the data processing section notifies a networked server of at least one of user identifier, information processing apparatus identifier, and information recording medium identifier, receives operation control information corresponding to the notified identifier from the networked server, and, in accordance with control based on the received operation control information, reproduces or copies content stored in the information recording medium.

In carrying out the invention and according to a third aspect thereof, an information processing method for reproducing content or executing a program stored in an information recording medium, includes the steps of:

identifying a content management unit including a data area selected for reproduction or execution from the content or the program stored in the information recording medium;

selecting a unit key corresponding to the identified content management unit; and decrypting encrypted data included in the content management unit to perform content reproduction processing or program execution processing by use of the selected unit key.

The above-mentioned information processing method further includes the step of detecting content management unit switching on the basis of a management table in which unit setting unit information, content management unit identification information, and unit key identification information are related with each other and, in accordance with the detected information, executing applicable unit key change processing.

The above-mentioned information processing method further includes the step of: executing unit key acquisition processing by decrypting a renewal key information block that may be processed only with a key stored in an information processing apparatus having a legal content use right, the key being set in correspondence with the content management unit.

In the above-mentioned information processing method, the renewal key information block acquires from an information recording medium or a networked server.

The above-mentioned information processing method further includes the step of executing authentication processing with a networked server, and upon successful authentication, acquiring information necessary for content reproduction including a unit key from the server.

The above-mentioned information processing method further includes the steps of: acquiring an authentication key to be applied to authentication processing with a networked server by decrypting a renewal key information block that may be processed only with a key set in correspondence with the content management unit and stored in an information processing apparatus having a legal content use right; authenticating a server by applying the authentication key obtained by the processing by the renewal key information block processing section; and upon successful authentication, acquiring information necessary for content reproduction including a unit key from the server.

The above-mentioned information processing method further includes the step of determining whether the content management unit is in network independent status or network associated status and executing content use control in accordance with a decision.

In the above-mentioned information processing method, the content use control is executed on the basis of a content use management information table storing control information associated with use of each the content management unit.

The above-mentioned information processing method further includes the step of receiving operation control information corresponding to content stored in the information recording medium from the networked server and, in accordance with control based on the received operation control information, reproducing or copying the content stored in the information recording medium.

The above-mentioned information processing method further includes the steps of: notifying a networked server of at least one of user identifier, information processing apparatus identifier, and information recording medium identifier; receiving operation control information corresponding to the notified identifier from the networked server; and, in accordance with control based on the received operation control information, reproducing or copying content stored in the information recording medium.

In carrying out the invention and according to a fourth aspect thereof, a computer program for reproducing content or executing a program stored in an information recording medium, includes the steps of:

identifying a content management unit including a data area selected for reproduction or execution of the content or the program stored in the information recording medium;

selecting a unit key corresponding to the identified content management unit; and decrypting encrypted data included in the content management unit to perform content reproduction processing or program execution processing by use of the selected unit key.

In carrying out the invention and according to a fifth aspect thereof, a server for providing a unit key to be applied to decryption of content to a reproducing apparatus for reproducing content stored in an information recording medium, includes:

a database storing a unit key corresponding to a content management unit;

an authentication processing section for authenticating the reproducing apparatus; and a data processing section for providing the unit key upon successful authentication in the authentication processing section.

The above-mentioned server further includes: a renewal key information block database storing a renewal key information block that may be processed only with a key stored in an information processing apparatus having a legal content use right and holds an authentication key for authentication processing as encrypted information; and an authentication key database storing the authentication key. The authentication processing section provides the renewal key information block to a reproducing apparatus that executes content reproduction and executes authentication processing by applying the authentication key acquired from the authentication key database.

It should be noted that the computer program according to the present invention may be provided for computer systems on which various kinds of program codes are executable, by means of computer-readable storage media, communication media, recording media such as CD, FD, and MO, or communication media such as networks. Provision of these programs in a computer-readable form realizes the processing according to the programs on computer systems.

Many other features, advantages, and additional objects of the present invention will be detailed by following description and the accompanying sheet of drawings. It should also be noted that term "system" as used herein denotes a logical set of a plurality of apparatuses that are not always located in a same housing.

As described and according to embodiments of the invention, a plurality of content management units corresponding to title, index and other information are set as data areas obtained by partitioning stored content in an information recording medium storing content. Different unit keys that are encryption keys are allocated to different content management units. At least the content real data included in each content management unit is encrypted by use of the unit key corresponding to the content management unit and the encrypted data is stored. This novel configuration allows content use management on a unit basis; to be more specific, the novel configuration allows various kinds of content use control such as reproduction control, copy control, and so on. According to the present invention, content use control may be executed on an individual content management unit basis, so that, in an information recording medium storing many pieces of content for example, each of segmented pieces of content may be managed.

Further, according to embodiments of the invention, in an information processing apparatus for executing the reproduction of content stored in an information recording medium, a content management unit including data area selected for reproduction from the content stored in the information recording medium is identified, a unit key corresponding to the identified content management unit is selected, and encrypted data included in the content management unit is decrypted by use of the selected unit key, thereby reproducing the content. This novel configuration allows the reliable reproduction of the content in each content management unit. Also, in unit switching, content key switching is executed, thereby allowing content reproduction by the decryption based on a proper key whenever unit switching occurs.

Still further, according to embodiments of the invention, if, in an information processing apparatus for executing the reproduction of content stored in an information recording medium, a content management unit including a data area selected for reproduction from the content stored in the information recording medium is identified and content reproduction is executed by getting a unit key corresponding to the identified content management unit, a configuration in which operation control information such as copy control information and reproduction control information is acquired from an externally connected server is realized, thereby allowing the processing such as applying renewed copy control information.

Yet further, according to embodiments of the invention, if, in an information processing apparatus for reproducing content stored in an information recording medium, a content management unit including a data area selected for reproduction from the content stored in the information recording medium is identified and content reproduction is executed by getting a unit key corresponding to the identified content management unit, a configuration in which operation control information such as copy control information and reproduction control information corresponding to user identifier, reproducing apparatus identifier or information recording medium identifier is acquired from an externally connected server may be realized, thereby executing the processing on the basis of the individual operation control corresponding to each user and each reproducing apparatus.

Additional features and advantages of the present invention are described in, and will be apparent from, the following Detailed Description and the Figures.

DETAILED DESCRIPTION

This invention will be described in further detail by way of example with reference to the accompanying drawings with respect to an information processing apparatus, an information recording medium, information processing method, and a computer program according to the invention. The description will be made in the following order:

1. Configuration of data stored on information recording media
2. Exemplary configuration of stored content
3. Stored content encryption and use management configuration
4. Content use management based on network independence and connection status
5. Content copy management on network
6. Management information corresponding to each content management unit
7. Exemplary configuration of information recording medium reproduction apparatus
8. Exemplary network configuration
9. Processing execution sequences
10. Necessary information acquisition processing in content reproduction

[1. Configuration of Data Stored on Information Recording Media]

First, a configuration of data stored on information recording media will be described. Referring to FIG. 1, an exemplary information recording medium is shown on which content applicable with the processing according to the present invention is stored. Shown here is an example in which information stored on a ROM disc is stored, the ROM disc being a content stored disc.

This ROM disc is a legal content storing information recording medium manufactured at a disc manufacturing factory under the permission of a so-called content right holder having a legal content copyright or distribution right. It should be noted that, in the following embodiments, a disc-shaped recording medium is used an example of information recording media; however, it would be apparent to those skilled in the art that the present invention is applicable configurations based on various other forms of information recording media.

As shown in FIG. 1, an information recording medium 100 stores content 101 composed of one or more pieces of content (a), (b), and so on. The content includes various kinds of content such as music data, movies, still images, and other image data, game programs, and Web content, for example. These pieces of content include various forms of information, such as the information usable only on the basis of data read from the information recording medium 100 and the information usable on the basis of both the data read from the information recording medium 100 and the data provided from servers connected to networks.

For one or more pieces of stored content 101, a management configuration is provided in which each piece of content may be managed for use. Details of this use management will be described later. The information recording medium 100 also stores a disc ID 102 as the information for identifying the information recording medium 100.

[2. Exemplary Configuration of Stored Content]

The following describes an exemplary storage format in which content is stored in the information recording medium according to the invention with reference to FIG. 2. Referring to FIG. 2, there is shown a data format in which movie content is stored. The movie content is HD (High Definition) movie content that is high-definition moving image data for example.

As shown in FIG. 2, the storage format of moving image content has four layers:
(A) index (title) 210;
(B) reproduction program (movie object) 220;
(C) reproduction section specification file (play list) 230; and
(D) clip (content data file) 240.

The (D) clip (content data file) 240 has clips 241, 242, and 243 that are divided content data files, and each clip 241 has an AV (Audio Visual) stream file 261 and a clip information file 251.

The clip information file 251 is a data file storing the attribute information associated with the AV (Audio Visual) stream file 261. The AV (Audio Visual) stream file 261 provides MPEG-TS (Moving Picture Experts Group-Transport Stream) data for example and has a data structure in which video, audio, and subtitle data are multiplexed. Also, the command information for controlling a reproduction apparatus at the time of reproduction may be multiplexed.

The (C) reproduction section specification file (play list) 230 has a plurality of reproduction section specification files (play lists) 231, 232, and 233. Each of these reproduction section specification files (play lists) has a configuration for selecting one of a plurality of AV stream data files included in the clip (content data file) 240 and having one or more play items for specifying particular data parts of a selected AV stream data file as reproduction start and end points. When one reproduction section specification file (play list) is selected, a reproduction sequence is determined for reproduction in accordance with the play item of that reproduction section specification file (play list).

For example, if the reproduction section specification file (play list) 231 is selected for content reproduction, particular data areas a to b and c to d of the AV (Audio Visual) stream file 261 that is the content included in the clip 241 are reproduced because a play item 234 related with the reproduction section specification file (play list) 231 has reproduction start point a and reproduction end point b in a clip 241 and a play item 235 has reproduction start point c and reproduction end point d in the clip 241.

The (B) reproduction program (movie object) 220 has reproduction programs 221 through 224 that are movie objects. The reproduction programs 221 through 224 are content reproduction programs that programmably provide capabilities necessary for presenting reproduction content (HD movie content), such as the specification of a reproduction section specification file (play list) to be reproduced, the response to the operation information associated with content reproduction processing entered by user, the jump between titles, and the branch of reproduction sequence. The reproduction programs 221 through 224 may jump to each other. In accordance with the specification by user or a preset program, a reproduction program to be actually executed is selected and the reproduction content is selected from the clip 240 for reproduction by the reproduction section specification file (play list) 230 specified by the selected reproduction program.

The (A) index (title) 210 is a content title that is presented onto a display that executes content reproduction, for example. This index is recognizable by user and used as an index for starting the reproduction of content. In the figure, a plurality of titles 211 through 213 are shown; the user may determine a subject of reproduction by selecting any of these titles.

As shown, the titles 211 through 213 are related K with the reproduction programs (movie objects) 221, 223, and 224 respectively. When the user selects one title, the reproduction processing based on the reproduction program related with the selected title starts. It should be noted that, in addition to normal titles, there are titles that are automatically reproduced when information recording media are set and started and titles for menu display.

Referring to FIG. 3, an exemplary format is shown as an example of a format for storing content into the recording medium according to the invention, for recording game content and Web content for example. The structures of the (D) clip 240 and the (C) reproduction section specification file (play list) 230 are the same as that of the format of the HD (High Definition) movie content that is high definition moving image data described with reference to FIG. 2.

Unlike the format of HD (High Definition) movie content that is the high definition moving image data described with reference to FIG. 2, the (A') application 300 is configured as a layer in which both application index data equivalent to title and reproduction programs exist together.

The upper layer (A') application 300 contains various application indexes such as game 1 311, game 2 312, WEB 1 313, WEB 2 314, and others 315 using application execution capability and reproduction programs (objects) 321, 322, 323 and so on as application indexes representable to user. These reproduction programs include Java programs and HTML programs, for example.

The reproduction programs 321 through 323 include programs that read, from information recording media or networked servers, various data files such as image files 331 based on JPEG, PNG, and BMP, audio files 332 based on PCM and compressed audio, and various data files 333 such as texts and databases and execute processing, thereby outputting results through a display monitor or a speaker.

These reproduction programs 321 through 323 have various configurations corresponding to program categories, such as game and Web presentation for example.

[3. Stored Content Encryption and Use Management Configuration]

The following describes, with reference to FIG. 4, a content management configuration in which content stored in an information recording medium is partitioned and use control that is different for each partitioned content is realized.

In the present invention, a key (or a unit key) that is different to each partitioned content is allocated as a basic configuration for realizing the use control that is different for each partitioned content. A unit in which one unit key is allocated is referred to as a content management unit (or a CPS unit).

Content belonging to each unit is encrypted by use of each unit key and the encrypted content is decrypted by use of the key allocated to each unit when the content is reproduced for use. Each unit key may be individually managed. For example, a unit key to be allocated to unit A is set as a key that may be obtained from an information recording medium. A unit key to be allocated to unit B may be a key that is obtainable only under the condition that the user has accessed a networked server and executed a predetermined procedure, for example. Thus, the acquisition and management configuration of the key corresponding to each unit may have an independent form.

There are two or more units in which one key is allocated, namely, there are two or more content management unit (CPS unit) setting forms. The following describes these forms sequentially.

(a) Title-Based Unit Setting Configuration

First, with reference to FIG. 4, an example in which a content management unit (CPS unit) is configured on a title basis will be described. FIG. 4 shows an example corresponding to a data format of HD (High Definition) movie content that is high-definition moving image data described above with reference to FIG. 2.

The unit setting configuration on a title basis shown in FIG. 4 is an example in which content management units (CPS units) related with one or more titles are configured.

In FIG. 4, content management unit (CPS unit) 1 of 411 is a management unit that is set for title 1 of 211 and title 2 of 212 and content management unit (CPS unit) 2 of 412 is a management unit that is set for title 3 of 213.

Content management unit (CPS unit) 1 of 411 contains clip 241 and clip 242 and AV stream data files 261 and 262 that are real data of the content included in these two clips 241 and 242 are encrypted by use of encryption key Ku1 that is set for content management unit (CPS unit) 1 of 411.

In order to execute content reproduction with title 1 of 211 or title 2 of 212 specified, the user is required to get encryption key Ku1 that is set as related with content management unit (CPS unit) 1 of 411, thereby entering a status in which reproduction content may be decrypted.

Content management unit (CPS unit) 2 of 412 contains clip 243. AV stream data file 263 that is the real data of the content contained in this clip 243 is encrypted by use of encryption key Ku2 that is set for the content management unit (CPS unit) 2 of 412.

In order to execute content reproduction with title 3 of 213 specified, the user is required to get encryption key Ku2 that is set as related with content management unit (CPS unit) 2 of 412, thereby entering a status in which reproduction content may be decrypted.

The following describes restriction rules necessary in each layer for applying the above-mentioned method.

(1) The reproduction of any AV stream files not included in a content management unit (CPS unit) to which a particular title belongs is disabled. A reproduction program (movie object) that is executed by the selection of its title includes a reproduction command for only the AV stream file included in the content management unit (CPS unit) to which that title belongs.

(2) A reproduction section specification file (play list) may reference two or more different clips but these clips must be included in one content management unit (CPS unit).

Setting these restrictions will not cause a unit key change while titles belonging to one content management unit (CPS unit) are being reproduced. Consequently, seamless connection is made easier for reproducing AV streams within a title.

It should be noted that, because titles are information that is apparent to the user, the description for the user and the management of content are easy when executing key distribution and content management on a content management unit (CPS unit) basis as will be described later.

The following describes an example that a content management unit (CPS unit) is configured on a title basis to satisfy the above-mentioned restriction rules, with reference to FIG. 4. In FIG. 4, title 1 of 211 and title 2 of 212 belong to content management unit (CPS unit) 1 of 411.

When title 1 of 211 and title 2 of 212 are selected, a reproduction program (movie object) to be executed first is one of reproduction programs 221 through 223. These reproduction programs (movie objects) 221 through 223 include a command for reproducing only AV stream files belonging to content management unit (CPS unit) 1 of 411, namely a command for reproducing only AV stream files 261 and 262 included in the clips 241 and 242 in FIG. 4 and do not include a command for reproducing any AV stream files belonging to other content management units (CPS units), content management unit (CPS unit) 2 of 412 for example, namely, a command for reproducing AV stream file 263 included in clip 243.

Reproduction programs 221 through 223 are related only with reproduction section specification files (play lists) 231 and 232 belonging to the same content management unit (CPS unit) 1 of 411 and with clips 241 and 242 belonging to the same content management unit (CPS unit) 1 of 411. If a jump is made between reproduction programs (movie objects) belonging to the same content management unit (CPS unit) 1 of 411, the content becoming subject to reproduction by the execution of that reproduction program (movie object) is only clips 241 and 242 belonging to content management unit (CPS unit) 1 of 411 and, as far as the same unit key Ku1 is held, these clips may be reproduced and involve no such problems as the inability of reproduction.

However, if any of reproduction programs 221 through 223 includes a command for reproducing an AV stream file belonging to another content management unit (CPS unit), content management unit (CPS unit) 2 of 412 for example, namely AV stream file 263 included in clip 243, then different unit key Ku2 corresponding to content management unit (CPS unit) 2 of 412 becomes necessary. Therefore, if unit key Ku2 is not held, an error such as stop of reproduction would be caused.

Consequently, if a title is selected for the execution of content reproduction, no AV stream file included in a content management unit (CPS unit) to which the selected title belongs may be reproduced. Thus, any reproduction program (movie object) that is executed during the reproduction processing started by the selection of a title should not include a command for reproducing any AV stream files not included in the content management unit (CPS unit) to which that title belongs.

However, each reproduction program (movie object) may have a command for switching between titles, namely a title jump command. As indicated by arrow 413 shown in FIG. 4, reproduction program 223 belonging to content management unit (CPS unit) 1 of 411 may have a jump command for jumping to any title belonging to content management unit (CPS unit) 2 of 412.

When title switching occurs due to a title jump command for example, the reproducing apparatus determines that a title change has occurred during reproduction.

In FIG. 4, during the reproduction of title 2 of, 212, it is practicable to issue a command for jumping to title 3 of 213. In this case, after a jump has been made, a status in which the reproduction by reproduction program 224 specified by title 3 of 213 is executed is entered.

Although not shown, there is an integrated reproduction control program for totally controlling content reproduction processing. This integrated reproduction control program executes total control on content reproduction. To be more specific, this program detects the occurrence of switching between content management units (CPS units). As shown in FIG. 4, the configuration in which title-based content management units (CPS units) are set has a content management unit (CPS unit) corresponding to each title and a unit key information management table "unit configuration and unit key management table" as shown in FIG. 5 and executes management on the basis of this management table.

It should be noted that the unit configuration and unit key management table is a management table in which unit setting unit information, content management unit identification information, and unit key identification information are correlated with each other. This table is configured such that unit identifiers (CPS1, CPS2, and so on) as the identification information of a content management unit corresponding to each title are correlated with identifiers (Ku1, Ku2, and so on) of corresponding unit keys. This management table does not store actual unit key data. Each unit key for actual use in content encryption and decryption is acquired by predetermined unit key acquisition processing. This unit key acquisition processing will be described later.

Upon detection of the occurrence of content management unit (CPS unit) switching due to title switching, the integrated reproduction control program executes the switching to a key to be applied by content management unit (CPS unit) switching. Alternatively, the integrated reproduction control program executes message display processing for example, displaying a message requesting key acquisition.

If key Ku1 for content management unit (CPS unit) 1 of 411 and key Ku2 for content management unit (CPS unit) 2 of 412 have already been stored in a memory of the reproducing apparatus on which content reproduction processing is executed, the integrated reproduction control program for totally controlling content reproduction processing, upon detection of the occurrence of content management unit (CPS unit) switching due to title switching, switches between keys to be applied, from Ku1 to Ku2 for example, by content management unit (CPS unit) switching.

If only key Ku1 for content management unit (CPS unit) 1 of 411 has already been stored in a memory of the reproducing apparatus on which content reproduction processing is executed and key Ku2 for content management unit (CPS unit) 2 of 412 has not already been stored, then the integrated reproduction control program for totally controlling content reproduction processing, upon detection of the occurrence of switching to content management unit (CPS unit) 2 of 412 by title switching, executes processing such as displaying a message requesting key acquisition.

(b) Unit Setting Configuration Based on Application Index

The following describes an example in which content management units (CPS units) are configured on the basis of application index, with reference to FIG. 6.

The example described above with reference to FIG. 4 corresponds to the data format of HD (High Definition) movie content that is high-definition moving image data described before with reference to FIG. 2. FIG. 6 shows the example corresponding to game content and Web content for example described before with reference to FIG. 3.

The above-mentioned upper-layer (A') application 300 is configured as a layer in which both application index data equivalent to a title and reproduction programs exist together.

In this case, the content management unit is set as related with application index data such as game 1 of 311 and WEB 1 of 313, for example.

In FIG. 6, content management unit (CPS unit) 1 of 415 is set for game 1 of 311 and WEB 1 of 313 and content management unit (CPS unit) 1 of 416 is set for game 2 of 312, WEB 2 of 314, and others 315.

Content management unit (CPS unit) 1 of 415 includes clip 241 and clip 242 and AV stream data files 261 and 262 that are real data of the content included in these two clips 241 and 242 are encrypted by use of encryption key Ku1 set for content management unit (CPS unit) 1 of 415.

In order to reproduce the content with game 1 of 311 or WEB 1 of 313 specified as an application index, the user is required to get encryption key Ku1 set for content management unit (CPS unit) 1 of 415, thereby entering a status in which decryption of the reproduction content is enabled.

Content management unit (CPS unit) 2 of 416 includes clip 243. AV stream data file 263 that is real data of the content included in this clip 243 is encrypted by use of encryption key Ku2 set for content management unit (CPS unit) 2 of 416.

In order to reproduce the content with game 2 of 312 specified as an application index, the user is required to get encryption key Ku2 set for content management unit (CPS unit) 2 of 412, thereby entering a status in which decryption of reproduction content is enabled.

It should be noted that, as described above, reproduction programs 321 through 323 also include programs that read, from information recording media or networked servers, various data files such as image files 331 based on JPEG, PNG, and BMP, audio files 332 based on PCM and compressed audio, and various data files 333 such as texts and databases and execute processing, thereby outputting results through a display monitor or a speaker. These data files to be read, namely image file 331, audio file 332, and data file 333 are also included in content management unit (CPS unit) 2 of 412. The data file also is set as the data encrypted by unit key Ku2.

The restriction rules necessary for each layer in applying the above-mentioned method are generally the same as those for the title-based unit setting described before with reference to FIG. 4, namely the restriction rules generally the same as those in the case where title is replaced by application index. To be more specific, (1) No AV stream not included in the content management unit (CPS unit) to which an application index belongs can be reproduced. A reproduction program (object) that is executed by the selection of an application index includes only a reproduction command for the AV stream included in the content management unit (CPS unit) to which that application index belongs.

(2) Each reproduction section specification file (play list) may reference a plurality of different clips; however, the clips that may be referenced are those included in one content management unit (CPS unit).

Setting the above-mentioned restriction rules causes no unit key change during the reproduction of the corresponding data of the application index belonging to one content management unit (CPS unit). Consequently, seamless connection is made easier for reproducing AV streams within one application index.

Like a title, an application index is apparent to the user, so that there is an advantage that the description for user and content management are easy when executing key distribution and content management on a content management unit (CPS unit) basis.

As described before with reference to FIG. 4, the present example also has an integrated reproduction control program for totally controlling content reproduction processing. This integrated reproduction control program executes total control on content reproduction. To be more specific, this program detects the occurrence of switching between content management units (CPS units). As shown in FIG. 6, the configuration in which application index based content management units (CPS units) are set has a content management unit (CPS unit) corresponding to each application index and a unit key information management table "unit configuration and unit key management table" as shown in FIG. 7 and executes management on the basis of this management table.

Upon detection of the occurrence of content management unit (CPS unit) switching due to application index switching, the integrated reproduction control program executes the switching to a key to be applied by content management unit (CPS unit) switching. Alternatively, the integrated reproduction control program executes message display processing for example, displaying a message requesting key acquisition.

If key Ku1 for content management unit (CPS unit) 1 of 415 and key Ku2 for content management unit (CPS unit) 2 of 416 have already been stored in a memory of the reproducing apparatus on which content reproduction processing is executed, the integrated reproduction control program for totally controlling content reproduction processing, upon detection of the occurrence of content management unit (CPS unit) switching due to application index switching, switches between keys to be applied, from Ku1 to Ku2 for example, by content management unit (CPS unit) switching.

If only key Ku1 for content management unit (CPS unit) 1 of 415 has already been stored in a memory of the reproducing apparatus on which content reproduction processing is executed and key Ku2 for content management unit (CPS unit) 2 of 416 has not already been stored, then the integrated reproduction control program for totally controlling content reproduction processing, upon detection of the occurrence of switching to content management unit (CPS unit) 2 of 416 by application index switching, executes processing such as displaying a message requesting key acquisition.

(c) Unit Setting Configuration Based on Reproduction Program (Movie Object)

The following describes an example in which content management units (CPS units) are configured based on reproduction programs (movie objects) with reference to FIG. 8.

In this case, the content management units are set in correspondence with reproduction programs 211 through 224 for example.

In FIG. 8, content management unit (CPS unit) 1 of 421 is set in correspondence with reproduction programs 211 through 223 and content management unit (CPS unit) 2 of 422 is set in correspondence with reproduction program 224.

Content management unit (CPS unit) 1 of 421 includes clip 241 and clip 242 and AV stream data files 261 and 262 that are real data of the content included in these two clips 241 and 242 are encrypted by use of encryption key Ku1 that is set for content management unit (CPS unit) 1 of 421.

Content management unit (CPS unit) 2 of 422 includes clip 243 and AV stream data file 263 that is real data included in this clip 243 is encrypted by use of encryption key Ku2 that is set for content management unit (CPS unit) 2 of 422.

In order to execute content reproduction by selecting one of titles, the user determines a content management unit (CPS unit) in accordance with a reproduction program to be actually started and may decrypt and reproduce content only when the user has a unit key corresponding to the determined content management unit (CPS unit).

The following describes restriction rules necessary for each layer when applying the above-mentioned method. Unlike the above-mentioned title-based unit setting example, there is no relationship between title and content management unit (CPS unit). One title may be created so as to reproduce any AV stream recorded on a recording medium, provided that the following restriction rules be satisfied.

(1) A reproduction program (movie object) shall not include any commands that reproduce any AV stream files not included in the content management unit (CPS unit) to which that reproduction program (movie object) belongs.

(2) A reproduction section specification file (play list) may reference a plurality of clips; however, only those clips included in one content management unit (CPS unit) may be referenced.

As described, a content management unit (CPS unit) change is possible during title reproduction. If a change occurs, a unit key change occurs. Because no unit key change occurs during the execution of a same reproduction program (movie object), it is made easy to seamlessly connect AV streams during that period.

To be more specific, in FIG. 8, reproduction programs (movie objects) 221 through 223 included in content management unit (CPS unit) 1 of 421 may have only a command for reproducing AV streams 261 and 262 included in content management unit (CPS unit) 1 of 421 and may have no command for reproducing AV stream file 263 included in different content management unit (CPS unit) 2 of 422.

Reproduction section specification files (play lists) 231 and 232 included in content management unit (CPS unit) 1 of 421 may reference a plurality of clips; however, only those clips included in one content management unit (CPS unit) may be referenced.

However, each reproduction program (movie object) may have a transition command between reproduction programs (movie objects). As indicated by arrows 423 and 424 shown in FIG. 8, each reproduction program may have a command for effecting transition between reproduction programs (movie objects) belonging to different content management unit (CPS units).

In the present example also, there is an integrated reproduction control program for totally controlling content reproduction processing. This integrated reproduction control program executes total control on content reproduction. To be more specific, this program detects the occurrence of switching between content management units (CPS units). As shown in FIG. 8, the configuration in which reproduction program (movie object) based content management units (CPS units) are set has a content management unit (CPS unit) corresponding to each reproduction program (movie object) and a unit key information management table "unit configuration and unit key management table" as shown in FIG. 9 and executes management on the basis of this management table.

Upon detection of the occurrence of content management unit (CPS unit) switching due to reproduction program (movie object) switching, the integrated reproduction control program executes the switching to a key to be applied by content management unit (CPS unit) switching. Alternatively, the integrated reproduction control program executes message display processing for example, displaying a message requesting key acquisition.

If key Ku1 for content management unit (CPS unit) 1 of 421 and key Ku2 for content management unit (CPS unit) 2 of 422 have already been stored in a memory of the reproducing apparatus on which content reproduction processing is executed, the integrated reproduction control program for totally controlling content reproduction processing, upon detection of the occurrence of content management unit (CPS unit) switching due to reproduction program (movie object) switching, switches between keys to be applied, from Ku1 to Ku2 for example, by content management unit (CPS unit) switching.

If only key Ku1 for content management unit (CPS unit) 1 of 421 has already been stored in a memory of the reproducing apparatus on which content reproduction processing is executed and key Ku2 for content management unit (CPS unit) 2 of 422 has not already been stored, then the integrated reproduction control program for totally controlling content reproduction processing, upon detection of the occurrence of switching to content management unit (CPS unit) 2 of 422 by reproduction program (movie object) switching, executes processing such as displaying a message requesting key acquisition.

(d) Unit Setting Configuration Based on Reproduction Section Specification File (Play List)

The following describes an example in which content management units (CPS units) are configured on a reproduction section specification file (play list) basis with reference to FIG. 10.

In this case, content management units (CPS units) are set in correspondence with play lists of reproduction section specification files (play lists) 231 through 233.

In FIG. 10, content management unit (CPS unit) 1 of 431 is set in correspondence with reproduction section specification files (play lists) 231 and 232 and content management unit (CPS unit) 2 of 432 is set in correspondence with reproduction section specification file (play list) 233.

Content management unit (CPS unit) 1 of 431 includes clip 241 and clip 242. AV stream data files 261 and 262 that are real data of the content included in these two clips 241 and 242 are encrypted by use of encryption key Ku1 that is set for content management unit (CPS unit) 1 of 431.

Content management unit (CPS unit) 2 of 432 includes clip 243. AV stream data file 263 that is real data included in this clip 243 is encrypted by use of encryption key Ku2 that is set for content management unit (CPS unit) 2 of 432.

In order to execute content reproduction by selecting one of titles, the user determines a content management unit (CPS unit) by a reproduction section specification file (play list) selected in accordance with a reproduction program to be actually started and may decrypt and reproduce content only when the user has a unit key corresponding to the determined content management unit (CPS unit).

The following describes restriction rules necessary for each layer when applying the above-mentioned method. There is no relationship between title and reproduction program (movie object), and content management unit (CPS unit). Each title and reproduction program (movie object) command may be created so as to reproduce any AV stream recorded to a recording medium, provided that the following restriction rules be satisfied.

(1) Each reproduction section specification file (play list) may reference a plurality of clips; however, only those clips included in one content management unit (CPS unit) may be referenced.

This restriction rule may cause a content management unit (CPS unit) change during title reproduction. If this change occurs, a unit key change occurs. Because no unit key change occurs during the execution of a same reproduction section specification file (play list), it is made easy to seamlessly connect AV streams during that period.

To be more specific, in FIG. 10, reproduction section specification files (play lists) 231 and 232 included in content management unit (CPS unit) 1 of 421 may reference a plurality of clips; however, the clips to be referenced are only those included in one content management unit (CPS unit).

In the present configuration, each reproduction program may have a reproduction command with any play list specified as indicated by arrow 433 shown in FIG. 10.

In the present example also, there is an integrated reproduction control program for totally controlling content reproduction processing. This integrated reproduction control program executes total control on content reproduction. To be more specific, this program detects the occurrence of switching between content management units (CPS units). As shown in FIG. 10, the configuration in which content management units (CPS units) based on reproduction section specification file (play list) are set has a content management unit (CPS unit) corresponding to each reproduction section specification file (play list) and a unit key information management table "unit configuration and unit key management table" as shown in FIG. 11 and executes management on the basis of this management table.

Upon detection of the occurrence of content management unit (CPS unit) switching due to reproduction section specification file (play list) switching, the integrated reproduction control program executes the switching to a key to be applied by content management unit (CPS unit) switching. Alternatively, the integrated reproduction control program executes message display processing for example, displaying a message requesting key acquisition.

If key Ku1 for content management unit (CPS unit) 1 of 431 and key Ku2 for content management unit (CPS unit) 2 of 432 have already been stored in a memory of the reproducing apparatus on which content reproduction processing is executed, the integrated reproduction control program for totally controlling content reproduction processing, upon detection of the occurrence of content management unit (CPS unit) switching due to reproduction section specification file (play list) switching, switches between keys to be applied, from Ku1 to Ku2 for example, by content management unit (CPS unit) switching.

If only key Ku1 for content management unit (CPS unit) 1 of 431 has already been stored in a memory of the reproducing apparatus on which content reproduction processing is executed and key Ku2 for content management unit (CPS unit) 2 of 432 has not already been stored, then the integrated reproduction control program for totally controlling content reproduction processing, upon detection of the occurrence of switching to content management unit (CPS unit) 2 of 432 by reproduction section specification file (play list) switching, executes processing such as displaying a message requesting key acquisition.

(e) Unit Setting Configuration Based on AV Stream File

The following describes an example in which content management units (CPS units) are configured on an AV stream file basis with reference to FIG. 12. AV stream file basis denotes generally the same as clip unit.

In this case, content management units are set in correspondence with clips 241 through 243.

In FIG. 12, content management unit (CPS unit) 1 of 441 is a management unit set in correspondence with clips 241 and 242 and content management unit (CPS unit) 1 of 442 is a management unit set in correspondence with clip 243.

Content management unit (CPS unit) 1 of 441 includes clip 241 and clip 242. AV stream data files 261 and 262 that are real data of the content included in these two clips 241 and 242 are encrypted by use of encryption key Ku1 set in correspondence with content management unit (CPS unit) 1 of 441.

Content management unit (CPS unit) 2 of 442 includes clip 243. AV stream data file 263 that is real data of the content included in this clip 243 is encrypted by use of encryption key Ku2 set in correspondence with content management unit (CPS unit) 2 of 442.

In order to execute content reproduction by selecting one of titles, the user determines a content management unit (CPS unit) by a reproduction section specification file (play list) selected in accordance with a reproduction program to be actually started and may decrypt and reproduce content only when the user has a unit key corresponding to the determined content management unit (CPS unit).

In the application of the above-mentioned method, there is no relationship between title, reproduction program (movie object), and the reproduction section specification, and content management unit (CPS unit). This method allows the creation of titles, reproduction program (movie object) commands, and reproduction section specification files (play lists) so as to reproduce any AV stream recorded to a recording medium. Each reproduction section specification file (play list) may reference a plurality of clips and also may reference clips included in different content management units (CPS units).

However, if there is a content management unit (CPS unit) change in a reproduction section specification file (play list), the seamlessly connected reproduction of AV streams is restricted because of the occurrence of a unit key change.

In the present example also, there is an integrated reproduction control program for totally controlling content reproduction processing. This integrated reproduction control program executes total control on content reproduction. To be more specific, this program detects the occurrence of switching between content management units (CPS units). As shown in FIG. 12, the configuration in which content management units (CPS units) based on clips are set has a content management unit (CPS unit) corresponding to clips and a unit key information management table "unit configuration and unit key management table" as shown in FIG. 13 and executes management on the basis of this management table.

Upon detection of the occurrence of content management unit (CPS unit) switching due to clip switching, the integrated reproduction control program executes the switching to a key to be applied by content management unit (CPS unit) switching. Alternatively, the integrated reproduction control program executes message display processing for example, displaying a message requesting key acquisition.

If key Ku1 for content management unit (CPS unit) 1 of 441 and key Ku2 for content management unit (CPS unit) 2 of 442 have already been stored in a memory of the reproducing apparatus on which content reproduction processing is executed, the integrated reproduction control program for totally controlling content reproduction processing, upon detection of the occurrence of content management unit (CPS unit) switching due to clip switching, switches between keys to be applied, from Ku1 to Ku2 for example, by content management unit (CPS unit) switching.

If only key Ku1 for content management unit (CPS unit) 1 of 441 has already been stored in a memory of the reproducing apparatus on which content reproduction processing is executed and key Ku2 for content management unit (CPS unit) 2 of 442 has not already been stored, then the integrated reproduction control program for totally controlling content reproduction processing, upon detection of the occurrence of switching to content management unit (CPS unit) 2 of 442 by clip switching, executes processing such as displaying a message requesting key acquisition.

(f) Configuration in which Application and Content are Independent CPS Units

The following describes an exemplary configuration in which an application and content are independent CPS units with reference to FIG. 14.

As shown in FIG. 14, the above-mentioned upper-layer (A') application 300 is configured as a layer in which both application index files and reproduction program files exist together. This configuration is generally the same as that described before with reference to FIG. 6.

Content management units (CPS units) are set as individual units in upper and lower layers of upper-layer (A') application (index+reproduction program) 300 and lower-layer (C) reproduction section specification file (play list)+ (D) clip (content data file).

In FIG. 14, content management unit (CPS unit) 1 of 451 and content management unit (CPS unit) 2 of 452 are each configured by a lower-layer (C) reproduction section specification file (play list)+(D) clip (content data file). Content management unit (CPS unit) 3 of 453 and content management unit (CPS unit) 4 of 454 are each configured by upper-layer (A') application (index+reproduction program).

Content management unit (CPS unit) 1 of 451 includes play list 231, play list 232, clip 241 and clip 242 and AV stream data files 261 and 262 that are real data of the content included in these two clips 241 and 242 are encrypted by use of encryption key Ku1 set for content management unit (CPS unit) 1 of 451.

Content management unit (CPS unit) 2 of 452 includes play list 233 and clip 243 and AV stream data 263 that is real data of content included in clip 243 is encrypted by use of encryption key Ku2 set for content management unit (CPS unit) 2 of 452.

Content management unit (CPS unit) 3 of 453 is a CPS unit that is set in correspondence with an application configured by application index files included in upper-layer (A') application (index+reproduction program) 300, namely, game 1 of 311, WEB 1 of 313, and others not shown, and reproduction programs 321 and 322 related with the indexes.

The application configured by the particular application index files and reproduction programs shown is set as content management unit (CPS unit) 3 of 453 and encrypted by use of encryption key Ku3 set for content management unit (CPS unit) 3 of, 453.

Like content management unit (CPS unit) 3 of 453, content management unit (CPS unit) 4 of 454 is also a CPS unit that is set in correspondence with an application included in upper-layer (A') application (index+reproduction program) 300.

Content management unit (CPS unit) 4 of 454 is set as a unit that includes an application configured by game 2 of 312, WEB 2 of 314, and other index 315 as application index files and various data files obtainable by reproduction program 323 from information recording media or networked servers, namely data files as application source files for use at execution of application index files or application execution files for example, to be more specific, image file 331 based on JPEG, PNG, or BMP, audio file 332 based on PCM or compressed audio, and various data files 333 such as text and database files.

Content management unit (CPS unit) 4 of 454 is encrypted by use of encryption key Ku4 set for content management unit (CPS unit) 4 of 454.

For example, in order to execute an application execution file corresponding to an application corresponding to upper-layer (A') application (index+reproduction program), game 1 of 311 or WEB 1 of 313 as an application index for example, the user is required to get encryption key Ku3 set for content management unit (CPS unit) 3 of 453, thereby executing the application.

Further, in order to reproduce content data included in lower-layer (C) reproduction section specification file (play list)+(D) clip (content data file), the user is required to get a new CPS unit key because these files are set as another content management unit (CPS unit).

In order to reproduce AV stream 261, the user is required to get encryption key Ku1 set for content management unit (CPS unit) 1 of 451.

It is practicable to arrange a configuration in which to provide each data file or program file by storing only lower-layer (C) reproduction section specification file (play list)+(D) clip (content data file) into an information recording medium and receiving upper-layer (A') application (index+reproduction program) file only from a networked server without storing in an information recording medium.

For example, under the condition that the usage fee of content has been paid, it is practicable to provide the user with upper-layer (A') application (index+reproduction program) file and a CPS unit key corresponding thereto.

Conversely, it is also practicable to arrange a configuration in which only upper-layer (A') application (index+reproduction program) file is stored in an information recording medium and lower-layer (C) reproduction section specification file (play list)+(D) clip (content data file) is provided from a content server.

Restriction rules necessary when the above-mentioned method is applied are that, before executing an application index file or an application execution file included in (A') application, a unit key corresponding to a CPS unit to which the application index file or the application execution file belongs must be obtained to decrypt the file, thereby extending the decrypted file into the memory.

If an application resource file necessary for the execution of an application execution file is encrypted with a CPS unit key, the application resource file must also be decrypted by the CPS unit key.

Then, during the execution of an application, any desired play lists recorded on a recording medium may be reproduced. A play list may reference a plurality of clips, but the clips to be referenced are only those included in one CPS unit.

Setting these restrictions allows a change of CPS units associated with AV streams during application execution. If this change occurs, a unit key change occurs. Because no unit key change occurs in a same play list, it is made easy to seamlessly connect AV streams during that period.

It should be noted that, in the example shown in FIG. 14, keys (Ku1, Ku2) for encrypting AV streams are different from keys (Ku3, Ku4) for encrypting application files; it is also practicable to use same keys for encryption by including AV stream application files into a same CPS unit.

As with the above-mentioned examples, there is an integrated reproduction control program for totally controlling content reproduction processing in the present example. This integrated reproduction control program executes total control on content reproduction. To be more specific, this program detects the occurrence of switching between content management units (CPS units). As shown in FIG. 14, the configuration in which content management units (CPS units) are set by making a distinction between upper-layer application file and lower-layer data file including content has content management units (CPS units) corresponding to application index files or reproduction section specification files (play lists) and a unit key information management table (unit configuration and unit key management tables) as shown in FIG. 15, thereby executing management on the basis of these management tables.

Upon detection of the occurrence of content management unit (CPS unit) switching due to application index switching, the integrated reproduction control program executes the switching to a key to be applied by content management unit (CPS unit) switching. Alternatively, the integrated reproduction control program executes message display processing for example, displaying a message requesting key acquisition.

If key Ku3 for content management unit (CPS unit) 3 of 453 corresponding to upper-layer application file and key Ku1 for content management unit (CPS unit) 1 of 451 corresponding to lower-layer real content have already been stored in the reproducing apparatus on which content reproduction processing is executed, the integrated reproduction control program for totally controlling content reproduction processing, upon detection of a content file reproduction request during execution of the upper-layer application file, switches between keys to be applied, from Ku3 to Ku1 for example, by content management unit (CPS unit) switching.

If key Ku3 for content management unit (CPS unit) 3 of 453 corresponding to an upper-layer application file has already been stored in the reproduction apparatus on which content reproduction is executed, but key Ku1 for content management unit (CPS unit) 1 of 451 corresponding to lower-layer real content has not, then the integrated reproduction control program for totally controlling content reproduction processing, upon detection of a content file reproduction request during the execution of the upper-layer application file, detects switching to content management unit (CPS unit) 1 of 451 and executes the processing such as message display for requiring key acquisition.

(g) Layer Structure for Concurrently Handling Titles for Use for Movie Content and Applications such as Game Content and Web Content The following describes a layer structure for concurrently handling titles for use for movie content and applications such as game content and Web content and an exemplary configuration of each content management unit (CPS unit) set in this layer structure.

An exemplary moving image content storage format was described above with reference to FIGS. 2 and 3. The layer structure shown in FIG. 2 has:

(A) index (title);
(B) reproduction program (movie object);
(C) reproduction section specification file (play list); and
(D) clip (content data file).

The layer structure shown in FIG. 3 has:

(A') application (index+reproduction program);
(C) reproduction section specification file (play list); and
(D) clip (content data file).

Referring to FIG. 16, there is shown an exemplary layer configuration for concurrently handling titles for use for movie content for example and applications such as game content and Web content.

The lower-layer configuration made up of
(D) reproduction section specification file (play list) and
(D) clip (content data file)
is substantially the same as the configurations shown in FIGS. 2 and 3. The configuration shown in FIG. 16 has the upper layer that is (A") application 370. (A") application 370 is set a layer having a. a combination of application index files 371 and 372 and reproduction programs 381 and 382 or b. a combination of application execution files 373 and 374 such as game content and Web content, programs, and reproduction programs 383 and 384 or one of the above-mentioned combinations a and b.

It should be noted that application execution files 373 and 374 and application index file 371 may include an application resource file for use in application execution. Also, various data files capable of acquiring from information recording media or network connection servers such as image files 331 based on JPEG, PNG, and BMP for example, audio files 332 based on PCM and compressed audio, and various data files 333 such as text and database may be applied as application resource files.

a. The configuration of index and reproduction program is substantially the same as that described before with reference to FIG. 3; namely, the configuration is provided as a layer in which both application index file data equivalent to title and reproduction programs exist together.

b. A specific example of a combination of application execution programs such as game content and Web content and reproduction programs is a configuration including game content having application execution capabilities and Web content such as HTML; to be more specific, a configuration that enables the starting of a reproduction program by the execution of a program included in game content or Web content such as HTML.

Programs configuring an application execution file included in application 370 are various programs set for referencing lower-layers of play list and clip and independent set not for referencing the play list layer and the clip layer, for example.

FIG. 17 shows a setting example of content management units (CPS units) in the layer configuration shown in FIG. 16.

As shown in FIG. 17, in the setting configuration of content management units (CPS units) in the present configuration, CPS units including application index files such as one or more titles 1 of 371 and 2 of 372 included in application 370 or application execution files such as application execution files 373 and 374 are set.

As with CPS unit 1 of 461 shown in FIG. 17, application index files, reproduction program files, play lists, and AV stream files that are content real data may be configured into one unit. As with CPS unit 2 of 462, an application execution file, a reproduction program file, a play list, and AV stream files that are content real data may be configured into one unit.

As with CPS unit 3 of 463 shown in FIG. 17, application execution files, a reproduction program file, and data files obtainable from information recording media or networked servers may be configured into one unit.

Each of the above-mentioned units is encrypted by use of same keys (CPS unit keys: Ku1, Ku2, and Ku3 shown in FIG. 17) for storage.

In FIG. 17, each of content management unit (CPS unit) 1 of 461 and content management unit (CPS unit) 2 of 462 is configured by upper-layer (A") application and lower-layer (C) reproduction section specification file (play list)+(D) clip (content data file). Content management unit (CPS unit) 3 of 463 is configured by upper-layer (A") application layer and various data files obtainable from information recording media and networked servers, without lower-layer (C) reproduction section specification file (play list)+(D) clip (content data file).

Content management unit (CPS unit) 1 of 461 includes title 1 of 371 and title 2 of 372, reproduction programs 381 and 382, play lists 231 and 323, and clips 241 and 242. AV stream data files 261 and 262 that are content real data included in these two clips 241 and 242 are encrypted by use of encryption key Ku1 set for content management unit (CPS unit) 1 of 461.

Content management unit (CPS unit) 2 of 462 includes application file 373 configured by game content and Web content, reproduction program 383, play list 233, and clip 243. AV stream data file 263 that is content real data included in clip 243 is encrypted by use of encryption key Ku2 set for content management unit (CPS unit) 2 of 452. Application file 373 may also be encrypted by use of encryption key Ku2.

Content management unit (CPS unit) 3 of 463 is set as a unit that includes application files 374 and 375 included in upper-layer (A"), reproduction program 383, and various data files obtainable by reproduction program 383 from information recording media and networked servers such as image file 331 based on JPEG, PNG, and BMP, audio file 332 based on PCM and compressed audio, and various data files 333 such as text and database.

Content management unit (CPS unit) 3 of 463 is encrypted by use of encryption key Ku3 set for content management unit (CPS unit) 3 of 463.

For example, in order to execute application file or content reproduction processing for content management unit 1 of 461, the user is required to get encryption key Ku1 set for content management unit (CPS unit) 1 of 461 to execute the application, thereby reproducing content.

For example, in order to use application files corresponding to content management unit 3 of 463 or image file 331 associated with the reproduction program 383, audio file 332 based on PCM and compressed audio, and various data files 333 such as text and database associated with reproduction program 383, the user is required to get encryption key Ku3 set for content management unit (CPS unit) 3 of 463, thereby executing the application or various files.

Restriction rules in the execution of processing with the above-mentioned method applied are that, while a particular title is being reproduced, any AV stream files not included in the CPS unit to which that title belongs may not be reproduced. A movie object that is executed during title reproduction shall not include any commands for reproducing any AV streams not included in the CPS unit to which that title belongs. It should be noted that each movie object may have a command for title switching and the reproducing apparatus determines a change taking place on the title being reproduced when title switching is caused by a title jump command for example. It is practicable to execute a command for causing jump to title 3 during reproduction of title 2 in FIG. 17. In this case, after jump, title 3 is being reproduced.

A play list may reference a plurality of clips, but the clips to be referenced are only those included in one CPS unit.

These restrictions prevent a unit key change from occurring while titles belonging to one CPS unit are reproduced. This makes it easy to seamlessly connect AV streams in each title.

It should be noted that, because each title is information apparent to the user, the above-mentioned configuration is advantageous in that, in the execution of key distribution and content management on a CPS unit basis, the description for the user and content management may be executed with ease.

As with title reproduction, seamless connection is made easy while AV streams belonging to one CPS unit are reproduced when referencing a play list during application execution. Encrypting, by use of a same encryption key, resource files to be used during the execution of one application prevents an encryption key (CPS unit key) change from occurring during application execution, thereby allowing smooth encryption processing.

As with the above-mentioned examples, there is an integrated reproduction control program for totally controlling content reproduction processing in the present example. This integrated reproduction control program executes total control on content reproduction. To be more specific, this program detects the occurrence of switching between content management units (CPS units). As shown in FIG. 18, the configuration has content management units (CPS units) corresponding to application-layer index files or application files and a unit key information management table (unit configuration and unit key management tables), thereby executing management on the basis of these management tables.

Upon detection of the occurrence of content management unit (CPS unit) switching due to application index switching, the integrated reproduction control program executes the switching to a key to be applied by content management unit (CPS unit) switching. Alternatively, the integrated reproduction control program executes message display processing for example, displaying a message requesting key acquisition.

If key Ku1 for content management unit (CPS unit) 1 of 461 and key Ku2 for content management unit (CPS unit) 2 of 462 have already been stored in the reproducing apparatus on which content reproduction processing is executed, the integrated reproduction control program for totally controlling content reproduction processing, upon detection of application unit switching or content switching, switches between keys to be applied, from Ku1 to Ku2 for example, by content management unit (CPS unit) switching.

If key Ku1 for content management unit (CPS unit) 1 of 461 has already been stored in the reproduction apparatus on which content reproduction is executed, but key Ku2 for content management unit (CPS unit) 2 of 462 has not, then the integrated reproduction control program for totally controlling content reproduction processing, upon detection of application unit switching or content switching, executes the processing such as message display for requiring key acquisition.

[4. Content Use Management Based on Network Independence and Connection Status]

The following describes a configuration in which content use management is executed depending on whether content is in network independent status or network connected status when content is reproduced for use by loading, on a reproducing apparatus that is a device connected to a network such as a home network, an information recording medium containing content encrypted by use of a unit key that is an encryption key on a unit basis, the content being partitioned into the above-mentioned content management units.

As shown in (A) of FIG. 19, each content management unit (CPS unit) recorded on a recording medium is one of two statuses; status independent of network (or network discrete status) and status associated with network (or network bound status).

If two or more pieces of content (content management units) are recorded on a recording medium, the status in which each content management unit (CPS unit) is kept is managed. Management information about the discrete or bound status for each content management unit (CPS unit) is recorded to an information recording medium, a player (an information reproduction apparatus) loaded with an information recording medium or a management server on a home network executing an information management process.

Content 1 through content 6 shown in FIG. 19 correspond to content management units (CPS units), respectively.

The following describes a content reproduction method.

Each piece of content partitioned into content management units (CPS units) stored in an information recording medium may or may not be reproduced in network independent status (discrete status).

Content 1 through content 4 shown in FIG. 19 are reproducible in network independent status (discrete status) and content 5 and content 6 are not reproducible in network independent status (discrete status).

Each piece of content (content management unit) recorded on a recording medium may enter network associated status (bound status) by a user operation or processing by the reproducing apparatus. It should be noted that there is also content that is disabled to enter network associated status (bound status) as content 1 shown in (a) of FIG. 19.

These pieces of information are determined as attribute of each piece of content (content management unit) stored in an information recording medium and stored in an information recording medium as attribute information corresponding to each content management unit.

The processing form in which each piece of content (content management unit) may be executed is predetermined:

(1) executable in network independent status (discrete status); or (2) executable in network associated status (bound status).

The information indicative which of these processing forms each piece of content is executable is recorded on an information recording medium or a management server holding management information as the attribute information corresponding to each piece of content (content management unit).

For example, there are pieces of content (content management units) shown in (a) through (f) of FIG. 19.

(a) Content 1 is content (content management unit) reproducible in network independent status (discrete status) and disabled to move to network associated status (bound status).

(b) Content 2 is content (content management unit) reproducible in network independent status (discrete status) and reproducible in streaming reproduction using network connection in network associated status (bound status). Streaming reproduction denotes content reproduction processing in which data recorded to a recording medium or digital data obtained by converting data recorded on a recording medium is transmitted via network and the transmitted data is decoded and displayed on a receiver device.

(c) Content 3 is content reproducible in network independent status (discrete status) and remotely reproducible content (content management unit) by use of network connection in network associated status (bound status). Remote reproduction denotes content reproduction processing in which a sender device executes processing including a response to user operations as found in DVD-video interactive content, transmitting only video to be displayed on screen and audio to be reproduced in a data format displayable on a receiver device. Remote reproduction requires user operation commands to be received by the receiver device and to be sent to the transmitting reproduction apparatus via network.

Content 4 is content reproducible in network independent status (discrete status) and content (content management unit) that realizes content reproduction for reproducing both content recorded on a recording medium and data downloaded via network.

The data to be downloaded may include subtitles, audio data, and menu data of languages not stored on a recording medium, and the latest version of data for use in content reproduction, for example. Content 4 is an example of content in which content reproducible also in network independent status (discrete status) is reproduced along with downloaded data in network associated status (bound status).

(e) Content 5 is content (content management unit) that is not reproducible in network associated status (bound status) and only reproducible in network associated status (bound status).

The reproduction is enabled when a key necessary for reproduction via network, namely, a unit key corresponding to a content management unit defined as content 5 is obtained. This reproduction enabling configuration under the condition of unit key acquisition allows the distribution and sale of content that is not reproducible in network independent status (discrete status), thereby realizing services of a form in which key information is sold by charging at the reproduction of the content.

(f) Content 6 is content (content management unit) that is not reproducible in network independent status (discrete status) and reproducible only in network associated status (bound status) and content (content management unit) that realizes content reproduction in which both content recorded on a recording medium and data downloaded via network are reproduced.

It should be noted that, with (d) content 4 through (f) content 6, network connection is executed for the processing of acquiring download data or a unit key; for the premises of this data and unit key acquisition, authentication processing is executed to make a confirmation that a data request is by an authorized device or user and, if the authentication is successful, the download data and unit key are provided from the server. It should also be noted that the transfer data via network is encrypted before being provided to the user device. These processing operations will be described later.

[5. Content Copy Management on Network]

The following describes a configuration in which content copy management is executed depending on whether content is in network independent status or network connected status when content is reproduced for use by loading, on a reproducing apparatus that is a device connected to a network such as a home network, an information recording medium containing content encrypted by use of a unit key that is an encryption key on a unit basis, the content being partitioned into the above-mentioned content management units.

As shown in (A) of FIG. 20, each content management unit (CPS unit) recorded on a recording medium is one of two statuses; status independent of network (or network discrete status) and status associated with network (or network bound status).

If two or more pieces of content (content management units) are recorded on a recording medium, the status in which each content management unit (CPS unit) is kept is managed. Management information about the discrete or bound status for each content management unit (CPS unit) is recorded to an information recording medium, a player (an information reproduction apparatus) loaded with an information recording medium or a management server on a home network.

Content 1 through content 6 shown in FIG. 20 correspond to content management units (CPS units), respectively. Each piece of content (content management unit) recorded on a recording medium may enter network associated status (bound status) by a user operation or processing by the reproducing apparatus. It should be noted that there is also content that is disabled to enter network associated status (bound status) as content 1 shown in (a) of FIG. 20.

These pieces of information are determined as attribute of each piece of content (content management unit) stored in an information recording medium and stored in an information recording medium or a management server holding management information as attribute information corresponding to each content management unit.

The processing form in which each piece of content (content management unit) may be executed is predetermined:

(1) executable in network independent status (discrete status); or (2) executable in network associated status (bound status).

The information indicative which of these processing forms each piece of content is executable is recorded on an information recording medium or a management server holding management information as the attribute information corresponding to each piece of content (content management unit).

For example, there are pieces of content (content management units) shown in (a) through (f) of FIG. 20.

(a) Content 1 is content (content management unit) reproducible in network independent status (discrete status) and disabled to move to network associated status (bound status).

(b) Content 2 is content reproducible in network independent status (discrete status) and content (content management unit) reproducible but not copyable in network associated status (bound status).

(c) Content 3 is reproducible in network independent status (discrete status) and in network associated status (bound status). Further, content 3 is content (content management unit) that may be copied to a recording medium of the same type of copy source only in network associated status (bound status).

Copy destinations may be:

recording media of the same type as copy source;

different recording media (within network); and portable devices.

Content 3 is content that may be copied to only recording media of the same type as copy source. Only when the copy destination is found to be a recording medium of the same type as the copy source, the copy source may send the data recorded on the recording medium to the copy destination.

(d) Content 4 is content reproducible in network independent status (discrete status) and reproducible also in network associated status (bound status). Further, content 4 is content (content management unit) that is enabled for copy to a recording medium of a different type from the copy source only in network associated status (bound status).

In the case of content 4, copy to recording media of different types is enabled and it is required for the copy source or destination device to execute data conversion to record converted copy data as necessary.

(e) Content 5 is not reproducible in network independent status (discrete status) and is reproducible also in network associated status (bound status). Further, content 5 is content that is enabled for copy to portable devices only in network associated status (bound status). Portable devices may be taken out of a home network; therefore, it is necessary for copy management to take this portability into account.

It is necessary to specify the processing to be executed if the restrictions associated with copying are applied, such as copy count, copy expiration date, and nonexistence of an original recording medium from network associated status (bound status) for example. It is desirable for these pieces of information to be specified separately for the above-mentioned three copy forms. It should be noted that the processing to be executed when an original recording medium gets out of network associated status (bound status) may be that the copy data be invalidated, the copy data be invalided after a certain period of time, or the copy data be deleted, for example. The data not deleted may be used without change when the recording medium is put in network associated status (bound status) again. Consequently, if a recording medium is lend to a friend for example, the copy data may only become unavailable to the owner for a while and becomes available upon returning.

(f) Content 6 is content not reproducible in network independent status (discrete status) and content (content management unit) reproducible only in network associated status (bound status). Further, content 6 is content (content management unit) with data for copy stored on a recording medium in advance, assuming that the data for copy be copied on a home network.

This data for copy may have a format no reproducible on the copy source device or have a configuration in which, as a result of copying to another device, this data becomes reproducible. For example, the data for copy of the same contents may stored in advance on a recording medium storing data of the multi-layer format described before with reference to FIGS. 2 and 3 for example, in a data format reproducible on general networked devices (for example, a file format such as AVI reproducible by a personal computer or MPEG-PS format) and the data for copy thus stored is transmitted for copying via network to be reproduced by these devices.

It should be noted that, before copying content, authentication or key acquisition via network is preferably executed. Also, with systems in which billing is executed every time content is copied or a key is required for copying, content management processing is preferably executed such that the number of times content may be copied is restricted by the number of times the key is distributed.

[6. Management Information Corresponding to Each Content Management Unit]

The following describes management information corresponding to content management units recorded to information recording media that stores content encrypted by use of a unit key that is an encryption key on a unit basis, the content being partitioned into content management units as described before.

As described above, each content management unit (CPS unit) is configured in correspondence with any one of:
title;
application index;
reproduction program;
play list; and
clip.

One unit key is set for each content management unit (CPS unit).

The content management unit (CPS unit) configuration and the key management table have already been described before as set as the unit key information management table "unit configuration and unit key management table" with reference to FIGS. 5, 7, 9, 11, and 13.

Further, as described before, there is status information associated with each content management unit (CPS unit), indicative which of the statuses each content management unit (CPS unit) is in:
a. network independent status (discrete status) and
b. network associated status (bound status).

It should be noted that, with information recording media to which data cannot be written, the above-mentioned status information is written only in the initial status.

For information recording media enabled for data writing, two kinds of information, initial status and current status, are recorded. The writing of current status information to recording media is executed by an information processing apparatus that is a reproducing apparatus loaded with an information recording medium or by a networked management server.

Referring to FIG. 21, there is shown an exemplary configuration of "status management table" with initial status and current status recorded to an information recording medium enabled for data writing. In this table, the initial status and current status corresponding to each content management unit (CPS unit) are written in one of (a) network independent status (discrete status) and (b) network associated status (bound status).

It should be noted that the status management table shown in FIG. 21 is recorded to information recording media and an information processing apparatus that is a reproducing apparatus loaded with an information recording medium or an external apparatus such as networked management server.

In the case of recording media disabled for data writing, only initial status data is written and a status management table recorded with initial status and current status is written to an information processing apparatus that is a reproducing apparatus loaded with an information recording medium or an external apparatus such as a networked management server.

For the initial status to be set to the status management table, one of the following four statuses is used:
a. discrete only;
b. discrete initially;
c. bound only; and
d. bound initially.

"a. discrete only" denotes that content (content management unit) is allowed only in network independent status (discrete status) and not allowed to shift to network associated status (bound status).

"b. discrete initially" denotes that content (content management unit) is initially in network independent status (discrete status) and allowed to shift to network associated status (bound status).

"c. bound only" denotes that content (content management unit) is allowed only in network associated status (bound status) and now allowed to shift to network independent status (discrete status).

"b. bound initially" denotes that content (content management unit) is initially in network associated status (bound status) and allowed to shift to network independent status (discrete status).

The initially network associated status (bound status) assumes a situation in which content is distributed as associated with information found on network in advance. For example, this content includes content that is assumed to be reproduced along with the information found on network.

For the current status, one of network independent status (discrete status) and network associated status (bound status) is set.

The current status may bet set for each content management unit. Two status management methods are possible for the forms of content use management. In the first method, the status of each recording medium is always returned to initial status before the recording medium is put outside a home network.

For example, if removable media that are detachable from a reproducing apparatus are used for content storage recording media, the status of each piece of content is returned to initial status upon unloading the removable medium from the reproducing apparatus. In this case, the status management table stored outside the recording medium is also initialized.

In the second method, the status of each recording medium is registered in an outside management server for example. In this case, it is unnecessary to initialize the status management table stored outside recording media only when the removable medium is unloaded.

An attempt to load a removable medium storing content put in network associated status (bound status) on a reproducing apparatus of home network (A) onto a reproducing apparatus connected to home network (B) built for another home for example and put this removable medium into network associated status (bound status) causes a management server to detect, on the basis of the status management table, that content in network associated status (bound status) in home network (A) is to enter network associated status (bound status) also redundantly in home network (B), thereby preventing the content from being set to network associated status (bound status) on home network (B).

The above-mentioned management prevents the same piece of content from being used in plural in parallel.

It should be noted that a management server and so on may be configured to have a status management table as shown in FIG. 21, thereby allowing reference to the current status after unloading of a removal medium from a reproducing apparatus for the use management of content on the basis of the referenced status.

It should also be noted that, if an information recording medium is a recordable medium to which the current status is recorded, it is practicable to read the current status directly from the recording medium without checking whether the recording medium is in network associated status (bound status) via server because the current status is recorded to the recording medium, thereby executing the use management content on the basis of read information.

It should also be noted that, in a configuration in which the status management information such as mentioned above is written in the case of ROM media that does not allow repetitive writing to normal data areas, it is preferable to form a partially writable area on ROM media and use these ROM media having this configuration.

Alternatively, it is preferable to provide a configuration in which rewritable optical disc media or cartridge media containing an IC memory are used.

It should be noted again that the status management table shown in FIG. 21 may be configured as an information table integrated with a table "unit configuration and unit key management table" managing the content management unit (CPS unit) configuration and the unit key shown in FIGS. 5, 7, 9, 11, and 13 or as an independent management table.

The management information corresponding to content management units also include the content reproduction and use restriction information when content is in network independent status (discrete status) and the content reproduction and use restriction information when content is in network associated status (bound status).

These pieces of content management information are written as the attribute information corresponding to content onto an information recording medium or recorded in a management server that executes content management processing. It should be noted that, for the content that is allowed for use only in network associated status (bound status), a content use management configuration may be taken on the basis of only the content management information recorded in a management server.

The following describes exemplary data of content management information with reference to FIG. 22. FIG. 22 shows an exemplary configuration of a content use management information table with content management information recorded in fixed-length data indicative of the status of content, namely, whether content is in network independent status (discrete status) or network associated status (bound status).

With content use in a home network taken into consideration, the setting of content management information of fixed-length as shown in FIG. 22 is preferable. For the management information of network independent status (discrete status) for example, whether reproduction in network independent status (discrete status) is enabled or disabled is written. For the content not reproducible in network independent status (discrete status), a method of reproducing the content is written. For example, this method specifies the connection to a key distribution server and the acquisition of key data distributed by another medium (a memory card for example) and provides the URL and telephone number for example for specifying the server or an index value pointing a list that stores these pieces of information.

The management information of network associated status (bound status) includes whether copy, streaming, and remote reproduction in network are allowed or not, the copy count, expiration date, availability of copy streaming data, data conversion scheme, and handling of copy data to be executed when content gets out of network associated status (bound status), for example.

It should be noted that, because FIG. 22 assumes that a part or all of these pieces of information be stored in fixed-length fields, the data consisting of many characters such as URLs and data position (path information) is stored in a separate file and an index to a list stored in the separate file is stored in each fixed-length field.

In order to get operation control information at the time of reproduction from a server to operate accordingly without using the reproduction control information recorded on recording media, a configuration may be provided in which a flag indicative of data acquisition from a server and information indicative of server access method may be stored as indicated by content management information configuration data 501 as shown in FIG. 22.

Setting the above-mentioned information as content management information allows the change of control methods for example after the sale of complex control and recording media that cannot be expressed in fixed-length data.

It should be noted that the content use management information table shown in FIG. 22 may be configured as content management units (CPS units) shown in FIGS. 5, 7, 9, 11, and 13, an information table integrated with a unit key management table, or independent management tables. Alternatively, the content use management information table may be integrated with the status management table shown in FIG. 21 or may be a separate table.

Referring to FIG. 23, there is shown an exemplary configuration of a content use management information table with content management information according to content status recorded in variable-length data.

The contents of the information to be set are the same as those shown in FIG. 22. Because variable-length information may be entered, data containing many characters such as URLs and data positions (path information) may be written directly to the content management information. In addition, because of a loop structure and a type (CCI_and_other_info_type in the figure) is defined for each type of content management information, the later addition of a new copy control method may be handled with ease only by defining the type and the information accompanying thereto (CCI_and_other_info_value and Additional_info in the figure). In this case, any devices sold in the past may not execute the processing for unknown types.

It should be noted that any one of two structures may be set in which the content management information associated with network independent status (discrete status) and network associated status (bound status) is not separated as shown in FIG. 23(A) and content management information loops are provided for these two statuses as shown in FIG. 23(B).

This information table may be stored as a same file as above-mentioned another management table or as a different file.

In order to get operation control information at the time of reproduction from a server to operate accordingly without using the reproduction control information recorded on recording media, a configuration may be provided in which a flag indicative of data acquisition from a server and information indicative of server access method may be stored as indicated by content management information configuration data 502 as shown in FIG. 23.

Setting the above-mentioned information as content management information allows the change of control methods for example after the sale of complex control and recording media that cannot be expressed in fixed-length data.

Further, a configuration in which user defined information as content management information configuration data 503 shown in FIG. 23 is set and a type of user definable control information for example is set to this user defined information allows the content reproduction control corresponding to each individual user; for example, this configuration allows the reproduction processing only for member users by making distinction between member numbers and non-member users or sets the definition of copy control information (CCI information) independent of recording medium standards for example, thereby realizing a control method exceeding the scope of standards of recording media and a control method that each content distributor may define as desired.

Examples of using copy control information (CCI information) based on user definitions include an example in which the definitions of copy control information (CCI information) independent of recording medium standards are set.

The parameters for example of copy control information (CCI information) are standardized for each of particular recording systems (DVD standards for example), so that it is difficult to extend copy control information (CCI information) after the popularization of the reproducing apparatuses compliant with these parameters.

Consequently, desired control information not included in the copy control information (CCI information) determined by each recording system is set as user defined information and each content owner or manager sets unique copy control information (CCI information).

Because the interpretation of the copy control information (CCI information) uniquely set by each content owner or manager cannot be done only by standard compliant reproducing apparatuses, an application (a Java program for example) for interpreting the copy control information (CCI information) is stored on a recording medium or downloaded from a server or other external devices. Thus, execution of the obtained application allows the interpretation of uniquely defined copy control information (CCI information) and the operation control according to the CCI information on each reproducing apparatus.

The following describes examples of a directory configuration for storing the management information corresponding to the above-mentioned types of content management units (CPS units) and the management information storage setting, with reference to FIG. 24. A BDMV directory is a directory for storing application files in Blu-ray disc ROM format.

In FIG. 24, content data section 511 includes data files such as content data files of multiple layer configurations as described before with reference to FIGS. 2 and 3, namely, title, application index, reproduction program, play list, and clip. These data files are stored in a user data area of each information recording medium. It should be noted that an AV stream included in each clip is a data file encrypted with a unit key that is set for each content management unit (CPS unit).

A management data section 512 includes content management units (CPS units) described before with reference to FIGS. 5, 7, 9, 11, and 13 and unit key managed tables, namely, "unit configuration and key management table", "status management table" for managing network independent status (discrete status) and network associated status (bound status) of each content management unit described with reference to FIG. 21, and "content use management information table" storing the information about content use and copy control in each of these statuses described with reference to FIG. 23.

These management tables are stored in one of several forms.

(A) Management tables are stored in user data areas of recording media as dedicated files.

(B) Management tables are inserted in AV format files stored in user data areas of recording media. For example, these management tables are stored by inserting them titles, index data files and AV format files such as play lists.

(C) Management tables are stored in the physical area of each recording medium, namely, an area that the user cannot directly access.

(D) Management tables are stored in external servers.

It should be noted that each of the following tables:
"unit configuration and key management table";
"status management table"; and
"content use management information table"
may be managed individually or two or more of these tables may be managed together.

In example (B) shown above, the above-mentioned three tables are stored in an application file that is stored in a user data area of each recording medium. Only one of these tables may exist on each recording medium, so that the storage position is either a title index table file (index.bdmv in the figure) or a reproduction program (movie object) file (MovieObject.bdmv in the figure).

In example (C) shown above, the above-mentioned three pieces of information are stored in the physical area (that the user cannot directly access) on each recording medium. In example (D) shown in above, the three pieces of information are stored not on a recording medium but on an external server for example. In this case, the reproducing apparatus must get the information corresponding to the three tables always from an external server before starting reproduction of the recording medium.

[7. Exemplary Configuration of Information Recording Medium Reproduction Apparatus]

The following describes an exemplary configuration of an information processing apparatus for reproducing content stored on the above-mentioned information recording medium with reference to FIG. 25.

First, a configuration of a recording and reproducing apparatus 600 will be described. Component blocks are connected to bus 601. In the reproduction of AV stream data consisting of MPEG-TS data, a data read from information recording medium 691 in a drive 690 is decrypted by an encryption processing means 650 as necessary to be separated into video, audio, and subtitle data for example by a TS (Transport Stream)/PS (Program Stream) processing means 620.

The digital data decoded by an MPEG codec 630 is converted by a D/A converter 641 in an input and output I/F 640 into an analog signal to be outputted. In digital outputting, the MPEG-TS data decrypted by the encryption processing means 650 is outputted through an input and output I/F 610 as digital data. The output in this case is directed to an digital interface such as IEEE 1394, Ethernet cable, or wireless LAN, for example. It should be noted that, if network connection capabilities are provided, the input and output I/F 610 has network connection capabilities. Also, if the reproducing apparatus executes data conversion into a format receivable by each output destination device and outputs the converted data, the MPEG codec 630 executes rate conversion and codec conversion-on the video, audio, and subtitle data obtained by the TS/PS processing means 620, which multiplexes the processed data with MPEG-TS or MPEG-PS again, the resultant data being outputted through the input and output I/F 610. Alternatively, it is practicable to convert the data into a codec and multiplexed file other than MPEG by use of a CPU 670 and output the resultant data through the input and output I/F 610.

If the above-mentioned management tables, namely,
"unit configuration and key management table";
"status management table"; and
"content use management information table"
are stored in the information recording medium 691, then these tables are read therefrom and stored in a memory 680. Key information for each content management unit (CPS unit) necessary for reproduction may be obtained from the data stored in the memory 680. It should be noted that if the management tables and unit keys are not stored in an information recording medium, they may be obtained from a networked server through a predetermined procedure. This procedure will be described later.

As described before, each content management unit (CPS unit) is configured as related with any one of
title;
application index;
reproduction program;
play list; and
clip.

To one content management unit (CPS unit), one unit key is related. The integrated reproduction control program for totally executing control of content reproduction detects the occurrence of content management unit (CPS unit) switching and executes the switching between keys to be applied in accordance with the detected content management unit (CPS unit) switching. If no key has been obtained, this program executes processing for presenting a message prompting the user for key acquisition.

The following describes an operation to be executed at data recording if the information recording medium 691 has a data recordable configuration. Digital signal input and analog signal input are assumed as data to be recorded.

In the case of a digital signal, it is inputted through the digital signal input and output I/F 610 and appropriately encrypted by the encryption processing means 650 to be stored in the information recording medium 691. If the data format of the inputted digital signal is converted and stored, the MPEG codec 630, the CPU 670, and TS/PS processing means 620 convert the data format into a storage data format. Then, the encryption processing means 650 executes appropriate encryption processing on the storage data format to be stored in the information recording medium 691.

In the case of an analog signal, an analog signal inputted in the input and output I/F 640 is converted by the D/A converter 641 into a digital signal, which is then converted into codec by the MPEG codec 630 to be used at recording. Then, the codec is converted by the TS/PS processing means 620 into AV multiplexed data that is a recording data format. The AV multiplexed data is appropriately encrypted by the encryption processing means 650 as required to be stored in the information recording medium 691. The above-mentioned management tables, namely,
"unit configuration and key management table";
"status management table"; and
"content use management information table" are also created or updated from time to time to be stored in the information recording medium 691.

If the recording and reproducing apparatus gets necessary information via an external network, the obtained data is stored in the memory 680 in the recording and reproducing apparatus. The stored data includes key information necessary for content reproduction, subtitle and audio information to be reproduced along with content reproduction, data such as still image, content management information, and operation rules (usage rules) of the reproducing apparatus corresponding to content management information, for example.

It should be noted that programs for executing reproduction processing and recording processing are stored in a ROM 660, and the memory 680 is used as the storage area of parameters and data and the work area during the execution of these programs as required. With reference to FIG. 25, the device configuration permitting data recording and reproduction has been described above; it is also practicable to configure an apparatus having only reproduction capabilities or recording capabilities, to which the present invention is also applicable.

[8. Exemplary Network Configuration]

The following describes an exemplary configuration in which an information processing apparatus (recording and reproducing apparatus) for reproducing content by loading the above-mentioned information recording medium is connected to a network such as a home network, with reference to FIG. 26.

A recording and reproducing apparatus 711 is connected to a home network 710 via a digital I/F. The digital I/F is based on IEEE 1394, Ethernet, or wireless LAN, for example. Use of content at in home includes the following forms for example.

Reproduced content from an information recording medium loaded on the recording and reproducing apparatus 711 is transmitted to a home server 712 having recording means such as a hard disc to be stored therein as copy content.

The reproduced content is transmitted from the information recording medium loaded on the recording and reproducing apparatus 711 to such a content reproducing device 714 having output means like a display monitor as a TV or a PC, or copy content of the home server 712 is transmitted for streaming reproduction.

A content reproducing device 713 such as a PC having remote control capability remotely operates the recording and reproducing apparatus 711 or the home server 712 to transmit and output the reproduced content from the information recording medium loaded on the recording and reproducing apparatus 711 or the copy content of the home server 712.

The reproduced content from the information recording medium loaded on the recording and reproducing apparatus 711 or the copy content of the home server 712 is transmitted and outputted to a portable device 715.

Data outputted from each networked device is recorded to a recording medium by the recording and reproducing apparatus 711.

Further, if the information necessary for content reproduction must be obtained in the recording and reproducing apparatus 711 from a home server 720 via network of outside home for example outside home, the recording and reproducing apparatus 711 is connected to the home server 720 to get the necessary information.

These processing operations may be executed.

[9. Processing Execution Sequences]

The following describes the sequences of reproducing content stored in the above-mentioned information recording medium, namely, the information recording medium storing the content encrypted with a unit key unique to each content management unit (CPS unit) and the sequences of other processing, with reference to flowcharts.

(1) Content Reproduction Processing

First, a sequence of reproducing content from an information recording medium storing encrypted content on a content management unit (CPS unit) basis will be described with reference to the flowchart shown in FIG. 27.

The processing shown in FIG. 27 is executed by an integrated reproduction control program for totally controlling the reproduction of content stored in an information processing apparatus (a reproducing apparatus) on which an information recording medium is loaded.

In step S301, the information processing apparatus selects content subject to reproduction from content stored in an information recording medium, namely, from content management units (CPS units). This processing is executed on the basis of the user input through an input means connected to the information processing apparatus or the input of information specifying content from a networked device, for example. To be more specific, a reproduction program starts on the basis of the specification information of a user-specified title or application index in a layer configuration of content described before with reference to FIGS. 2 and 3. In accordance with the reproduction program, any one of the play lists is selected and, on the basis of the selected play list, a clip is selected to start reproduction.

In step S302, the content management unit (CPS unit) that includes the content subject to reproduction is identified. As described before, each content management unit (CPS unit) is related with any one of
  title;
  application index;
  reproduction program;
  play list; and
  clip.
On the basis of any one of the above-mentioned settings, the integrated reproduction control program for totally controlling content reproduction identifies the content management unit to be reproduced.

In step S303, a decision is made whether the reproducing apparatus itself has the information necessary for the reproduction of the content management unit to be reproduced, namely, a unit key. That is, the memory of the reproducing apparatus is checked for the unit key that is the key corresponding to the content management unit selected as the content subject to reproduction. If the unit key is found, then, the content, namely, an AV stream in the content management unit is decrypted by use of the unit key for reproduction processing in step S306. It should be noted that "information necessary for reproduction" includes not only the unit key for content decryption but also, sometimes, download data for use in content reproduction and operation rules (usage rules) of the reproducing apparatus for content management information. The information processing apparatus checks the holding of these pieces of information for reproduction, as required.

If the unit key and other necessary information are not held, then, in step S304, necessary information such as the unit key, download data for use in content reproduction, and operation rules (usage rules) of the reproducing apparatus for content management information are obtained from the outside. For example, the unit key and other necessary information are obtained by following a predetermined procedure from a networked server for example. This processing will be described later.

If the acquisition of the information (the unit key) is found successful in step S305, then the content, namely, an AV stream in the content management unit is decrypted by use of the unit key to execute reproduction processing in step S306. If the acquisition of the information (the unit key) is found unsuccessful, the processing is ended without executing content reproduction.

The following describes a sequence of content copy processing with reference to FIG. 28. This processing stores a content management unit read from an information recording medium in a reproducing apparatus loaded with the information recording medium storing content encrypted on a content management unit basis into an information recording medium such as a server for example connected to a network (for example, a home network). The processing shown in FIG. 28 is executed in the information processing apparatus (the reproducing apparatus) on which an information recording medium is loaded.

In step S311, the information processing apparatus selects content subject to copy processing from content stored in an information recording medium, namely, content management units. This processing is executed on the basis of the user input through an input means connected to the information processing apparatus or on the basis of the input of content specification information from a networked device, for example.

In step S312, a content management unit (CPS unit) to be copied is selected.

For each content management unit set for any one of the above, ability of copy is set to "content use management information table" described with reference to FIG. 22; if copy is permitted, the number of times copy is permitted may be specified.

In step S313, a decision is made whether copy specified content is copyable and, in step S314, a decision is made whether copy count is within limit count on the basis of "content use management information table". It should be noted that, for this "copyable" decision, not only copyability is checked by use of "content use management information table" on recording media, but also copyability information is obtained from an external server via a network if "content use management information table" is held in the external server for example. It is also practicable to purchase the right for copy from a server to get a content copy permission.

For content not enabled for copying or content of which copy permission count limit has already been reached, the processing is ended without executing the copy processing. For content enabled for copying and of which copy permission count limit has not yet been reached, the procedure goes to step S315 to check the information about copy destination device compatibility. A copy destination device denotes a device such as a home server connected the present information processing apparatus via a network, for example. In checking for compatibility, it is determined whether, if MPEG-TS data that is content stored in an information recording medium for example is copied directly by a device such as a home server, the server is capable of processing the MPEG-TS data.

In step S316, if the content stored in the information recording medium is found copyable, then the procedure goes to step S319 to execute copy processing.

If the content stored in the information recording medium is found not copyable in step S316, then the procedure goes to step S317 to determine whether the information recording medium stores other content for copy than the original content. If other content for copy is found, the data for copy is read from the information recording medium in step S320 to be copied to the copy destination device. If other data for copy is not found, then the procedure goes to step S318 to determine whether the data conversion of the original content, namely, the conversion to a data format reproducible on the copy destination device is enabled. If the data conversion is enabled, then the content is read from the information recording medium in step S321 to execute data conversion, the converted data being copied to the copy destination device. If the conversion to a data format reproducible on the copy destination device is not enabled, the processing is ended without executing content copy processing.

The following describes a sequence of content streaming reproduction processing with reference to FIG. 29. In streaming reproduction processing, a content management unit is outputted to such a reproducing device connected to a network (for example, a home network) as a TV or a PC having an output means like a display monitor or a speaker for example. The content management unit is read from an information recording medium in a reproducing apparatus, which loaded the information recording medium storing content encrypted on a content management unit basis. The processing shown in FIG. 29 is executed in an information processing apparatus (a reproducing apparatus) on which an information recording medium is loaded.

In step S331, the information processing apparatus selects content subject to streaming reproduction processing from content, namely, content management units stored in the information recording medium. This processing is executed on the basis of the user input through an input means connected to the information processing apparatus or on the basis of the input of content specification information from a networked device, for example.

In step S332, the content management unit (CPS unit) to be copied is identified. As described before, each content management unit is related with any one of:
title;
application index;
reproduction program;
play list; and
clip.

For each content management unit set for any one of the above, streaming reproducibility is set in "content use management information table" described with reference to FIG. 22. If streaming reproduction is enabled, streaming reproduction enabled device information may be set in this table.

In step S333, a decision is made whether streaming reproduction is enabled on the basis of "content use management information table". It should be noted that this decision of "streaming enabled?" is executed by not only checking the streaming reproduction permission information based "content use management information table" recorded on recording media. If "content use management information table" is held in an external server, the permission information is acquired from the server by connecting thereto via a network. It is also practicable to purchase the right of streaming reproduction from a server.

For the content not enabled for streaming reproduction, the processing is ended without executing the streaming processing. For the content enabled for streaming reproduction, the procedure goes to step S334 to check the information about streaming data receiver device compatibility. A streaming data receiver device denotes a TV or a PC for example connected with a home network. The compatibility is determined by checking whether MPEG-TS data that is the content stored in an information recording medium may be processed by a streaming data receiver device, namely, the streaming data receiver device has TS (Transport Stream) processing means and MPEG codec capabilities, for example.

If the content stored in the information recording medium is found transmittable in step S335, then the content is read from the information recording medium in step S338, thereby starting the processing of transmitting the content to the streaming data receiver device.

If the content stored in the information recording medium is found not transmittable in step S335, then the procedure goes to step S336 to determine whether the information recording medium stores other content to be transmitted for streaming reproduction than the original content. If the content to be transmitted for streaming reproduction is found, then this content is read from the information recording medium to be transmitted to the streaming data receiver device in step S339. If the content to be transmitted for streaming reproduction is not found, the procedure goes to step S337 to determine whether the data conversion of the original content, namely, the conversion to a data format reproducible on the streaming data receiver device is enabled. If the conversion is found enabled, then the procedure goes to step S340, in which the content is read from the information recording medium and the content is data-converted to be transmitted to the streaming data receiver device. If the conversion to a data format reproducible on the streaming data receiver device is found disabled, then the processing is ended without executing content transmission.

The following describes a sequence of content remote reproduction processing with reference to FIG. 30. In processing, a content management unit is reproduced on such a reproducing device connected to a network (for example, a home network) as a TV or a PC having output means like a display monitor or a speaker, in a remote control manner. The content management unit is read from an information recording medium in a reproduction apparatus, which loaded the information recording medium storing content encrypted on a content management unit basis. The processing shown in FIG. 30 is executed in an information processing apparatus (a reproducing apparatus) on which an information recording medium is loaded.

In step S351, the information processing apparatus selects content subject to remote reproduction processing from content stored in an information recording medium, namely, content management units. This processing is executed on the basis of the input of content specification information from a networked device.

In step S352, the content management unit (CPS unit) to be copied is identified. As described before, each content management unit is related with any one of:
title;
application index;
reproduction program;
play list; and
clip.

For each content management unit set for any one of the above, remote reproducibility is set in "content use management information table" described with reference to FIG. 22. If remote reproduction is enabled, remote reproduction enabled device information may be set in this table.

In step S353, a decision is made whether remote reproduction is enabled on the basis of "content use management information table". It should be noted that this decision of "remote reproduction enabled?" is executed by not only checking the remote reproduction permission information based "content use management information table" recorded on recording media. If "content use management information table" is held in an external server, the permission information is acquired from the server by connecting thereto via a network. It is also practicable to purchase the right of remote reproduction from a server.

For the content not enabled for remote reproduction, the processing is ended without executing the remote processing. For the content enabled for remote reproduction, the procedure goes to step S354 to check the information about remote reproduction content receiver device compatibility. A remote reproduction content receiver device denotes a TV or a PC for example connected with a home network. The compatibility is determined by checking whether MPEG-TS data that is the content stored in an information recording medium may be processed by a streaming data receiver device, namely, the remote reproduction content receiver device has TS (Transport Stream) processing means and MPEG codec capabilities, for example.

If the content stored in the information recording medium is found transmittable as it is in step S355, then the content is read from the information recording medium in step S356, thereby starting the processing of transmitting the content to the remote reproduction content receiver device.

If the content stored in the information recording medium is found not transmittable as it is in step S356, then the processing is ended without executing content transmission.

[10. Necessary Information Acquisition Processing in Content Reproduction]

The following describes the processing of acquiring information from an information recording medium or externally. The information becomes necessary for executing reproduction processing of content read from an information recording medium storing content encrypted by use of a unit key unique to each piece of content, namely, each content management unit (CPS unit) stored in the information recording medium and other processing. The information to be acquired includes the unit key, the download data for use in content reproduction, and operations rules (usage rules) of a reproducing apparatus for content management information. These pieces of information are acquired from the data recorded to the information recording medium or a networked server in a predetermined procedure.

The following describes an example of acquiring a unit key from the information recording medium with reference to FIG. 31. FIG. 31 shows an exemplary configuration in which unit key generation information allocated to each renewal key information block (RKB: Renewal Key Block) that may get media key Km unique to an information recording medium necessary for generating a content key that is a unit key is stored in the information recording medium along with content, and a reproducing apparatus gets the renewal key information block (RKB) from the information recording medium to get the unit key on the basis of media key Km obtained from the renewal key information block (RKB) and unit key generation processing using the unit key generation information obtained from the information recording medium.

The renewal key information block (RKB) is an encryption key information block that is able to get media key Km unique to recording media only by the decryption processing based on a device key stored in the reproducing apparatus having the legal content usage right. Because a key necessary for content decryption, namely, a unit key, must be generated by use of media key Km, only the reproducing apparatus having a legal content usage right is able to get the unit key.

The following describes an RKB configuration and key acquisition processing with reference to FIGS. 32 and 33. Numbers 0 through 15 shown at the bottom of FIG. 32 are indicative of user devices that are information processing apparatuses for using content, for example. Each leaf in a layer tree structure shown in FIG. 32 corresponds to one device.

At the time of manufacture or shipment, devices 0 through 15 stores in a memory thereof a key set (device keys (DNK: Device Node Key)) composed of keys (node keys) allocated to nodes extending from own leaf to the root and a leaf key of each leaf. K000 through K1111 at the bottom of FIG. 32 are indicative of leaf keys allocated to devices 0 through 15 and the keys including KR (root key) on top down to the node second from the bottom, namely KR through K111, are node keys.

In the tree structure shown in FIG. 32, device 0 has leaf key K0000, node keys K000, K00, K0, and KR as device keys, for example. Device 5 has K0101, K010, K01, K0, and KR. Device 15 has K1111, K111, K11, K1, and KR. It should be noted that the tree shown in FIG. 32 has only 16 devices 0 through 15 and a symmetric structure having four layers; it is also practicable for the tree to have more devices and the number of layers other than four.

For example, a portion enclosed by a dashed-line circle, namely, devices 0, 1, 2, and 3 are assumed to be set as one group. For example, it is assumed that only the devices included in this group have the legal usage right, namely a license to use the encrypted content stored in the information recording medium. In this case, only devices 0, 1, 2, and 3 set RKB that enables the acquisition of the keys applicable to content decryption, thereby storing RKB into the information recording medium in which the encrypted content is stored.

As seen from FIG. 32, three devices 0, 1, 2, and 3 included in one group share common keys K00, K0, and KR as device keys (DNK: Device Node Key) stored in each device.

At this moment, an RKB configuration permitting only devices 0, 1, and 2 to get media key Km for use in generating unit keys (Ku1, Ku2, and so on) applicable to the decryption of content is as shown in FIG. 33, for example. RKB is set as

| index | encrypted data |
|-------|----------------|
| 000   | Enc(K000, Km)  |
| 0010  | Enc(K0010, Km). |

It should be noted that Enc(Kx, Ky) denotes encrypted data obtained by encrypting data Ky with key Kx. At this moment, devices 0 and 1 is able to decrypt the encrypted data of index [000] by use of device key [K000] owned by themselves. Device 2 is able to decrypt the encrypted data of index [0010] of the above-mentioned RKB by use of device key [K0010]. The encryption processing of each of these pieces of encrypted data allows the acquisition of media key Km. After the acquisition of media key Km, devices 0 and 1 are able to get unit keys (Ku1, Ku2, and so on) by the unit key generation information allocated to each content management unit and the unit key generation processing using media key Km. Other devices have none of device keys [K000] and [K0010] and therefore are unable to get media key Km by the decryption by RKB if RKB having the configuration shown in FIG. 4 is received, so that other devices cannot generate unit keys (Ku1, Ku2, and so on).

Thus, by providing the configuration data corresponding to each device having a license, RKB is configured as a renewal key information block that is able to provide private information such as unit keys only to particular devices only on which the private information may be processed. Key information (RKB) is changeable in configuration thereof as desired as RKB that may be processed only on devices that allow content use.

Returning to FIG. 31, the processing to be executed in the reproducing apparatus will be described. A reproducing apparatus 820 reads renewal key information block (RKB) 811 from an information recording medium 810 and, in a Renewal key information block processing section 822, applies a device key 821 stored in the reproducing apparatus 820 to decrypt the renewal key information block (RKB) 811, thereby obtaining media key Km. In addition, in a Unit key acquisition section 823, the reproducing apparatus 820 executes unit key generation processing by use of unit key generation information 812 obtained from the information recording medium and the media key to obtain a content key, namely, a unit key. The unit key generation information 812 includes "unit configuration and unit key management table" described before with reference to FIG. 5. "Unit configuration and unit key management table" is a management table in which unit setting unit information, content management unit identification information, and unit key identification information are related with each other. This table is configured as relating unit identifiers (CPS1, CPS2, and so on) as the identification information of a content management unit corresponding to each title with identifiers (Ku1, Ku2, and so on) of each corresponding unit key.

Further, a Data processing section 824 decrypts the content read from the information recording medium 810, namely the encrypted content of AV stream for example in the content management unit, by applying a unit key, thereby getting and reproducing the content. It should be noted that the Unit key acquisition section 823 detects content management unit switching on the basis of the management table in which unit setting unit information, content management unit identification information, and unit key identification information are related with each other, there executing the processing of changing applied unit keys in accordance with the detected information.

FIG. 34 shows the processing of acquiring various kinds of information necessary for content reproduction not from the information recording medium but from a networked server. In acquiring necessary information such as keys from a server 850, content 831 stored in an information recording medium 830 should be in network associated status (bound status) in advance.

In the example shown in FIG. 34, a reproducing apparatus 840 gets, as the acquired information necessary for content reproduction from the server, content use conditions (usage rules) and download data. The content use conditions include unit keys, content management information, and content usage right information. The download data includes such as operation control information, subtitle data, and audio data that allow the operation control at the time of reproduction on the basis of the control information to be acquired from the server, not the reproduction control information recorded to recording media. The server 850 has a database 852 in which these pieces of information are stored.

In the example shown in FIG. 34, the reproducing apparatus 840 has an Authentication processing section 841 for executing authentication processing by applying a device key. The server 850 has a device key database 851 that stores a device key allocated to the reproducing apparatus that is a user device. The Authentication processing section 841 of the reproducing apparatus 840 and an Authentication processing section 853 of the server 850 execute the authentication processing by use of a shared device key, an authentication sequence on the basis of common key encryption method for example (the processing specified by ISO 9798 for example) to confirm mutual validity and generate a session key that is a key for encrypting transfer data.

Upon successful authentication, a Data processing section 854 of the server 850 gets, under the condition that the reproducing apparatus 840 is a legal device having a legal device key, the information necessary for content reproduction from the database 852, content use conditions (usage rules) and download data. The content use conditions include unit keys, content management information, and content usage right information. The download data includes such as operation control information, subtitle data, and audio data that allow the operation control at the time of reproduction the basis of the control information to be acquired from the server, not the reproduction control information recorded to recording media and transmits the acquired data to the reproducing apparatus 840. It should be noted that the data to be transmitted is encrypted with the session key.

A unit key acquisition and data processing section 842 of the reproducing apparatus 840 applies the unit key received from the server to decrypt the encrypted data in the content management units configuring the content 831 read from the information recording medium 830, thereby executing content reproduction. It should be noted that, at the time of reproduction, the control and reproduction processing is executed on the basis of the download data such as the content management information, content use conditions (usage rules), subtitle data, and audio data obtained from the server 850. The unit key acquisition and data processing section 842 of the reproducing apparatus 840 notifies the Data processing section 854 of the server 850 of any one of user identifier, information processing apparatus identifier, and information recording medium identifier, receives the operation control information corresponding to a notification identifier, and executes the reproduction or copy of the content stored in the above-mentioned information recording medium in accordance with the control processing based on the reception operation control information.

It should be noted that, upon acquisition of operation control information from the server 850, the reproducing apparatus 840 is able to execute operation control at the time of reproduction not only the basis of the reproduction control information recorded to recording media but on the basis of the control information acquired from a server.

The following describes examples of operation control information to be acquired from a server.

(Operation Control Information Use Example 1)

Updated copy control information (CCI information) is handled as operation control information that may be acquired from a server.

In principle, the reproducing apparatus 840 executes control on the basis of the copy control information (CCI information) recorded on recording media as default but gets new copy control information (CCI information) from the reproducing apparatus 840 as operation control information. If the reproducing apparatus 840 got the update copy control information (CCI information) from the server 850, then the reproducing apparatus 840 executes the processing on the basis of the copy control information (CCI information) obtained from the server 850.

This configuration allows changing and updating of copy control information corresponding to various kinds of content after the sale of recording media with various timings, thereby allowing the reproducing apparatus to execute copy processing on the basis of changed and updated copy control information (CCI information).

For example, as default copy control information (CCI information), copy control information (CCI information) disabled for copy to particular devices is set to an information recording medium storing the content. The reproducing apparatus 840 is connected to the server 850 to execute the processing such as user registration for example, thereby getting new copy control information (CCI information) from the server. The copy control information (CCI information) provided by the server 850 is the copy control information enabled for copy to particular devices, so that a configuration may be provided in which only the reproducing apparatus 840 having copy permission on the basis of server connection processing is able to copy the content not allowed for the default copy control information (CCI information).

(Operation Control Information Use Example 2)

All copy control information (CCI information) is acquired from the server 850.

It is specified that the reproducing apparatus 840 should acquire copy control information (CCI information) from the server 850 without recording copy control information (CI information) on recording media. This configuration allows copy control for the content to be stored on recording media always on the side of the server 850 and allows the management of user and reproducing apparatus as an owner of recording media.

(Operation Control Information Use Example 3)

Applications such as Java are provided from the server 850 as operation control information. The reproducing apparatus 840 downloads applications such as Java from the server 850 and executes the downloaded applications. A subject range of Java applications is not only simple reproduction control but also the execution of advertisement display, services for particular recording media buyers, and user registration and billing as content use conditions.

As described above, providing application programs such as Java from the server 850 as operation control information to execute provided programs as content reproduction conditions may realize a configuration in which the reproducing apparatus 840 is necessarily made execute such processing as advertisement presentation, user registration, and usage fee billing, for example.

(Operation Control Information Use Example 4)

Operation control management including copy control management is executed for each user, each reproducing apparatus, and each piece of recording media on the side of server 850.

In getting, by the reproducing apparatus 840, the information necessary for content reproduction, for example, various kinds of information such as unit keys and operation control information, the server 850 requires the reproducing apparatus 840 for the transmission of user identification information, reproducing apparatus identification information, recording medium unique identification information. The server 850 relates these kinds of identification information with the operation control information including copy control information (CCI information) provided to the user and registers the related information. The registration processing allows the operation control and management for each user, each reproducing apparatus, and each piece of recording medium on the side of the server 850.

On the basis of the registered data, the server 850 is able to individually allow the user, reproducing apparatus, and recording medium to update and change the operation control information including copy control information (CCI information). The server generates operation control information appropriately corresponding to the identification information received from the user, reproducing apparatus, and the recording medium and transmits the generated information to the reproducing apparatus. On the basis of the operation control information received from the server, the reproducing apparatus uses content.

One embodiment of the operation control management including the copy control information (CCI information) for each user, each reproducing apparatus, and each recording medium may also be configured in which, as described above in the description of content management information with reference to FIG. 23, any control information that is not included in the copy control information (CCI information) specified by a recording system is set on the side of the server to be provided for the reproducing apparatus.

As described before, the parameters and so on of copy control information (CCI information) are standardized for each particular recording system (DVD standards for example); once reproducing apparatuses compliant these standards have been propagated, it is difficult to extend copy control information (CCI information).

To overcome this difficulty, any control information not included in the copy control information (CCI information) specified by a recording system is set as user defined information and the content owner or administrator on the side of the server 850 sets unique copy control information (CCI information).

The copy control information (CCI information) uniquely set by the server 850 (content owner or administrator) is provided to the reproducing apparatus 840 and applications (Java for example) for interpreting the copy control information (CCI information) to the reproducing apparatus 840. Executing the applications obtained from the server 850, the reproducing apparatus 840 interprets the uniquely defined copy control information (CCI information) obtained from the server 850 to execute copy control in accordance with the uniquely defined copy control information (CCI information).

It should be noted that, in the above-mentioned example, content management information, content use conditions (usage rules), operation control information, subtitle data, audio data, and other download data are shown in addition to unit keys as the transfer data from the server 850; these pieces of data are obtained as required in accordance with the reproduction of content and therefore not always required.

As with FIG. 34, FIG. 35 shows the processing of obtaining various kinds of information necessary for content reproduction from a server connected to a network. In FIG. 35, the reproducing apparatus 840 and the server 850 have authentication private keys and public key certificates. In FIG. 35, the device key of the reproducing apparatus 840 and the server key of the server 850 are set as the private key for authentication and the public key certificates storing the public keys corresponding to these private keys are set.

When the reproducing apparatus 840 gets necessary information such as keys, it is supposed that the content 831 stored in the information recording medium 830 be kept in network associated status (bound status).

In the example shown in FIG. 35, the reproducing apparatus 840 gets, as the acquired information necessary for content reproduction from a server, content use conditions (usage rules) including unit keys, content management information, and content usage right information, and download data such as operation control information, subtitle data, and audio data for enabling the operation control at the time of reproduction on the basis of not the reproduction control information recorded on recording media but the control information obtained from the server. The server 850 has a database 852 that stores these pieces of information.

In the example shown in FIG. 35, the reproducing apparatus 840 has a device key and the server 850 stores the server key in a server key database 855. The Authentication processing section 841 of the reproducing apparatus 840 and the Authentication processing section 853 of the server 850 execute authentication processing by use of device key and server key, and an authentication sequence based on public key encryption processing method for example, thereby confirming mutual validity and generating a session key as a key for encrypting transfer data.

Upon successful authentication, the Data processing section 854 of the server 850 gets, under the condition that the reproducing apparatus 840 is a legal device having a legal device key, the information necessary for content reproduction, namely, download data such as unit keys, content management information, content use conditions (usage rules), operation control information, subtitle data, audio data, and still image data for example from the database 852 and transmits these pieces of obtained information to the reproducing apparatus 840. It should be noted that the data to be transmitted is encrypted with the session key.

The unit key acquisition and data processing section 842 of the reproducing apparatus 840 decrypts the encrypted data in the content management units configuring the content 831 read from the information recording medium 830 by use of the unit key obtained from the server, thereby executing content reproduction. It should be noted that, in this reproduction, control and reproduction are executed by applying the download information such as content use conditions (usage rules) including content management information and content usage right information, subtitle data, audio data, and still image data obtained from the server 850.

It should be noted that if operation control information is obtained from a server, the reproducing apparatus 840 is able to execute operation control at the time of reproduction on the basis of not the reproduction control information recorded on recording media but the control information obtained from a server.

For specific use forms of the operation control information obtained from a server, above-mentioned operation control information use examples 1 through 4 described with reference to FIG. 34 are applicable.

It should be noted that, in the above-mentioned example, the transfer data from the server 850 include content management information, content usage conditions (usage rules), operation control information, subtitle data, audio data, still image data, and other download data in addition to unit keys. These pieces of data are obtained as required in accordance with the reproduction of content and therefore not always obtained.

FIG. 36 shows a processing example in which a reproduction apparatus 870 obtains an authentication key from a renewal key information block (RKB) 861 stored in an information recording medium 860 and authenticates a server 880 by application of an obtained authentication key 872.

A Renewal key information block processing section 873 of the reproduction apparatus 870 reads the renewal key information block (RKB) 861 from the information recording medium 860 and decrypts the renewal key information block (RKB) 861 by use of a device key 871 stored in the reproduction apparatus 870, thereby obtaining an authentication key. A renewal key information block (RKB) may be decrypted only by a device key of a reproducing apparatus not revoked (invalidated), thereby obtaining an authentication key.

The server 880 has an authentication key database 881 storing an authentication key allocated to a reproducing apparatus that is a user device having a legal content reproduction right. Between an Authentication processing section 883 of the server 880 and the Authentication processing section 883 of the reproduction apparatus 870, authentication processing based on a common key method is executed by use of a shared authentication key.

Upon successful authentication, a Data processing section 884 of the server 880 gets, from a database 882, under the condition that the reproducing apparatus 870 is a legal device having a legal device key, the information necessary for content reproduction, namely content use conditions (usage rules) including unit keys, content management information, and content usage right information and download data such as operation control information, subtitle data, audio data, and still data that allow the operation control at the time of reproduction the basis of the control information to be acquired from the server, not the reproduction control information recorded to recording media and transmits the acquired data to the reproducing apparatus 870. It should be noted that the data to be transmitted is encrypted with the session key.

A Unit key acquisition and data processing section 874 of the reproducing apparatus 870 decrypts the encrypted data in the content management units configuring content 861 read from the information recording medium 860 by use of a unit key received from the server 880, thereby executing content reproduction. It should be noted that, control and reproduction are executed by applying the download data such as content management information, content use conditions (usage rules), operation control information, subtitle data, audio data, and still image data obtained from the server 880.

It should be noted that if operation control information is obtained from the server, the reproducing apparatus 870 is able to execute operation control at the time of reproduction on the basis of not the reproduction control information recorded on recording media but the control information obtained from a server.

For specific use forms of the operation control information obtained from a server, above-mentioned operation control information use examples 1 through 4 described with reference to FIG. 34 are applicable.

It should be noted that, in the above-mentioned example, the transfer data from the server 880 include content management information, content usage conditions (usage rules) including content use right information, operation control information, subtitle data, audio data, still image data, and other download data in addition to unit keys. These pieces of data are obtained as required in accordance with the reproduction of content and therefore not always obtained.

FIG. 37 shows an example in which a server provides a renewal key block (RKB) corresponding to content (content management unit), namely, a renewal key block (RKB) that is able to get an authentication key only by the decryption processing by applying a device key of a reproducing apparatus having a legal content usage right, to the reproducing apparatus, which gets the authentication key from the renewal key block (RKB) to authenticate the server by use of the obtained authentication key, thereby executing the processing of acquiring necessary information from the server upon successful authentication.

The RKB to be transmitted from the server to the reproducing apparatus is selected as each piece of content or an RKB that corresponds to the transmission point of time. If the RKB corresponds to each content, the RKB for that content is used for the acquisition of a unit key to be applied for the decryption of a given content management unit. If the RKB is an RKB of the version specified in correspondence with the time of RKB transmission, the most recent RKB of that version is used. If there is a device revoked at that moment, the unprocessible RKB of the most recent version is transmitted to the reproducing apparatus in the revoked device.

Another configuration may also be provided in which the RKB that was most recent at the time of content creation. In addition, a combination of the most recent version for that content may be configured. When the reproducing apparatus accesses the server, the server transmits an appropriate RKB to the reproducing apparatus. At this moment, the server may transmit the entire RKB or only a necessary part of the RKB for that reproducing apparatus.

A Renewal key information block processing section 922 of an reproducing apparatus 920 gets an authentication key by decrypting a renewal key information block (RKB) read from a renewal key information block (RKB) database 931 and transmitted to the reproducing apparatus by a authentication processing section 933 of a server 930, by use of a device key 921 stored in the reproducing apparatus 920. The decryption of each renewal key information block (RKB) may be executed only by the device key of the reproducing apparatus not revoked (invalidated), which is able to be get an authentication key.

The server 930 has an authentication key database 932 storing the authentication key corresponding to RKB. Between the authentication processing section 933 of the server 930 and an authentication processing section 923 of the reproducing apparatus 920, authentication processing based on a common key method is executed by use of a shared authentication key.

Upon successful authentication, a data processing section 935 of the server 930 gets, from a database 934, under the condition that the reproducing apparatus 870 is a legal device having a legal authentication key, the information necessary for content reproduction such as content use conditions (usage rules) including unit keys, content management information, and content usage right information, and download data such as operation control information, subtitle data, audio data, and still data that allow the operation control at the time of reproduction on the basis of the control information to be acquired from the server, not the reproduction control information recorded to recording media and transmits the acquired data to the reproducing apparatus 920. It should be noted that the data to be transmitted is encrypted with the session key.

A unit key acquisition and data processing section 924 of the reproducing apparatus 920 decrypts the encrypted data in the content management units configuring content 911 read from the information recording medium 910 by use of a unit key received from the server 930, thereby executing content reproduction. It should be noted that, control and reproduction are executed by applying the download information such as content management information, content use conditions (usage rules), operation control information, subtitle data, audio data, and still image data obtained from the server 930.

It should be noted that if operation control information is obtained from the server 930, the reproducing apparatus 920 is able to execute operation control at the time of reproduction on the basis of not the reproduction control information recorded on recording media but the control information obtained from a server.

For specific use forms of the operation control information obtained from a server, above-mentioned operation control information use examples 1 through 4 described with reference to FIG. 34 are applicable.

It should be noted that, in the above-mentioned example, the transfer data from the server 930 include content management information, content usage conditions (usage rules) including content use right information, subtitle data, audio data, still image data, and other download data in addition to unit keys. These pieces of data are obtained as required in accordance with the reproduction of content and therefore not always obtained.

While preferred embodiments of the present invention have been described using specific terms, it is to be understood that modifications and variations will be apparent to those skilled in the art without departing from the spirit of the invention. Therefore, the scope of the invention is to be determined solely by the claims described above.

The above-mentioned sequence of processing operations may be executed by software, hardware, or the combination thereof. When the above-mentioned sequence of processing operations is executed by software, the programs constituting the processing sequence are installed in a memory of a computer which is built in dedicated hardware equipment or installed, into a general-purpose personal computer for example in which various programs may be installed for the execution of various functions.

For example, programs may be recorded to a hard disk and a ROM (Read Only Memory) that are recording media in advance. Alternatively, programs may be temporarily or permanently stored (or recorded) in removable recording media such as flexible disc, CD-ROM (Compact Disc Read Only Memory), MO (Magneto Optical) disc, DVD (Digital Versatile Disc), magnetic disc, and semiconductor memory. These removal recording media may be provided as so-called package software.

It should be noted that, in addition to the installation from removable recording media such as mentioned above into a computer, programs may be downloaded from a download site into a computer in a wireless manner or via a network such as LAN (Local Area Network) or the Internet in a wired manner. The computer receives downloaded programs and records them into incorporated recording media such as a hard disc.

It should be noted herein that the steps for describing each program include not only the processing operations which are sequentially executed in a time-dependent manner but also the processing operations which are executed concurrently or discretely.

It should also be noted that term "system" as used herein denotes a logical set of a plurality of component units that are not always located in a same housing.

[Industrial Applicability]

As described and according to embodiments of the invention, a plurality of content management units corresponding to title, index and other information are set as data areas obtained by partitioning stored content in an information recording medium storing content. Different unit keys that are encryption keys are allocated to different content management units. At least the content real data included in each content management unit is encrypted by use of the unit key and the encrypted data is stored. This novel configuration allows content use management on a unit basis; to be more specific, the novel configuration allows various kinds of content use control such as reproduction control, copy control, and so on. According to the present invention, content use control may be executed on an individual content management unit basis, so that, in an information recording medium storing many pieces of content for example, each of segmented pieces of content may be managed. This management method is applicable to a configuration that requires segmented copyright management or use management in storing content in mass capacity content recording media such as DVD and blue laser disc for example.

Further, according to embodiments of the invention, in an information processing apparatus for executing the reproduction of content stored in an information recording medium, a content management unit including data area selected for reproduction from the content stored in the information recording medium is identified, a unit key corresponding to the identified content management unit is selected, and encrypted data included in the content management unit is decrypted by use of the selected unit key, thereby reproducing the content. This novel configuration allows the reliable reproduction of the content in each content management unit. Also, in unit switching, content key switching is executed, thereby allowing content reproduction by the decryption based on a proper key whenever unit switching occurs. Consequently, the present invention is applicable to information processing apparatuses for reproducing the information recording media on which encryption is executed on a content management unit basis.

Still further, according to embodiments of the invention, if, in an information processing apparatus for executing the reproduction of content stored in an information recording medium, a content management unit including a data area selected for reproduction from the content stored in the information recording medium is identified and content reproduction is executed by getting a unit key corresponding to the identified content management unit, a configuration in which operation control information such as copy control information and reproduction control information is acquired from an externally connected server is realized, thereby allowing the processing such as applying renewed copy control information. Also, the novel configuration realizes a configuration in which copy control information corresponding to user identifier, reproducing apparatus identifier or information recording medium identifier and operation control information such as reproduction control information may be obtained from externally connected servers, thereby executing the processing on the basis of individual operation control corresponding to each user and reproducing apparatus. Consequently, the present invention is applicable to any apparatuses and methods that execute reproduction control or copy control corresponding to each user or each reproducing apparatus or content.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

BRIEF DESCRIPTION OF THE FIGURES

FIG. 1 is a schematic diagram illustrating a configuration of data stored in an information recording medium.

FIG. 2 is a schematic diagram illustrating an exemplary format of content stored in an information recording medium.

FIG. 3 is a schematic diagram illustrating another exemplary format of content stored in an information recording medium.

FIG. 4 is a schematic diagram illustrating an example in which content management units to be set for content stored in an information recording medium are arranged by title.

[FIG. 5]

FIG. 5 is a diagram showing an exemplary unit configuration and an exemplary unit key management table in a content management unit configuration corresponding to titles.

FIG. 6 is a schematic diagram illustrating an example in which content management units to be set for content stored in an information recording medium are arranged by application index.

[FIG. 7]

FIG. 7 is a diagram showing an exemplary unit configuration and an exemplary unit key management table in a content management unit configuration corresponding to application indexes.

FIG. 8 is a schematic diagram illustrating an example in which content management units to be set for content stored in an information recording medium are arranged by reproduction program.

[FIG. 9]

FIG. 9 is a diagram showing an exemplary unit configuration and an exemplary unit key management table in a content management unit configuration corresponding to reproduction programs.

FIG. 10 is a schematic diagram illustrating an example in which content management units to be set for content stored in an information recording medium are arranged by play list.

[FIG. 11]

FIG. 11 is a diagram showing an exemplary unit configuration and an exemplary unit key management table in a content management unit configuration corresponding to play lists.

FIG. 12 is a schematic diagram illustrating an example in which content management units to be set for content stored in an information recording medium are arranged by clip.

[FIG. 13]

FIG. 13 is a diagram showing an exemplary unit configuration and an exemplary unit key management table in a content management unit configuration corresponding to clips.

FIG. 14 is a schematic diagram illustrating an exemplary configuration in which applications and content are independent CPS units.

[FIG. 15]

FIG. 15 is a diagram showing an exemplary unit configuration and an exemplary unit key management table in a configuration in which applications and content are independent CPS units.

FIG. 16 is a schematic diagram illustrating an exemplary layer configuration in which titles for use in movie content for example and applications such as game content and Web content for example are handled in parallel.

FIG. 17 is a schematic diagram illustrating an exemplary CPS unit setting in which titles for use in movie content for example and applications such as game content and Web content for example are handled in parallel.

[FIG. 18]

FIG. 18 is a diagram showing an exemplary unit configuration and an exemplary unit key management table in CPS unit setting in a layer configuration in which titles for use in movie content for example and applications such as game content and Web content for example are handled in parallel.

FIG. 19 is a schematic diagram illustrating content network independence and content use forms and usage rules in network-associated status.

FIG. 20 is a schematic diagram illustrating content network independence and content copy rules in network-associated status.

[FIG. 21]

FIG. 21 is a diagram showing exemplary data in a content status management table.

[FIG. 22]

FIG. 22 is a diagram showing exemplary data in a content use management information table.

[FIG. 23]

FIG. 23 is a diagram showing an exemplary content use management information table with content management information corresponding to content status recorded in variable-length data.

[FIG. 24]

FIG. 24 is a schematic diagram illustrating locations of data storage directories and management tables on an information recording medium.

[FIG. 25]

FIG. 25 is a block diagram illustrating an exemplary configuration of an information processing apparatus for reproducing an information recording medium loaded thereon.

FIG. 26 is a block diagram illustrating an exemplary network configuration for using content stored in an information recording medium.

FIG. 27 is a flowchart indicative of a content reproduction processing sequence.

FIG. 28 is a flowchart indicative of a content copy processing sequence.

FIG. 29 is a flowchart indicative of content streaming reproduction processing sequence.

FIG. 30 is a flowchart indicative of content remote reproduction processing sequence.

FIG. 31 is a block diagram illustrating an exemplary information acquisition processing for acquiring a unit key and other information necessary for content reproduction.

FIG. 32 is a tree structure diagram illustrating an layer tree structure applicable to the encryption and distribution of keys and data.

FIG. 33 is a block diagram illustrating exemplary distribution and exemplary decryption based on RKB (Renewal Key Block) of unit key.

FIG. 34 is a block diagram illustrating an exemplary information acquisition processing for acquiring a unit key and other information necessary for content reproduction.

[FIG. 35]

FIG. 35 is a block diagram illustrating another exemplary information acquisition processing for acquiring a unit key and other information necessary for content reproduction.

[FIG. 36]

FIG. 36 a block diagram illustrating still another exemplary information acquisition processing for acquiring a unit key and other information necessary for content reproduction.

[FIG. 37]

FIG. 37 is a block diagram illustrating yet another exemplary information acquisition processing for acquiring a unit key and other information necessary for content reproduction.

[Description of Reference Symbols]

Figure 1:
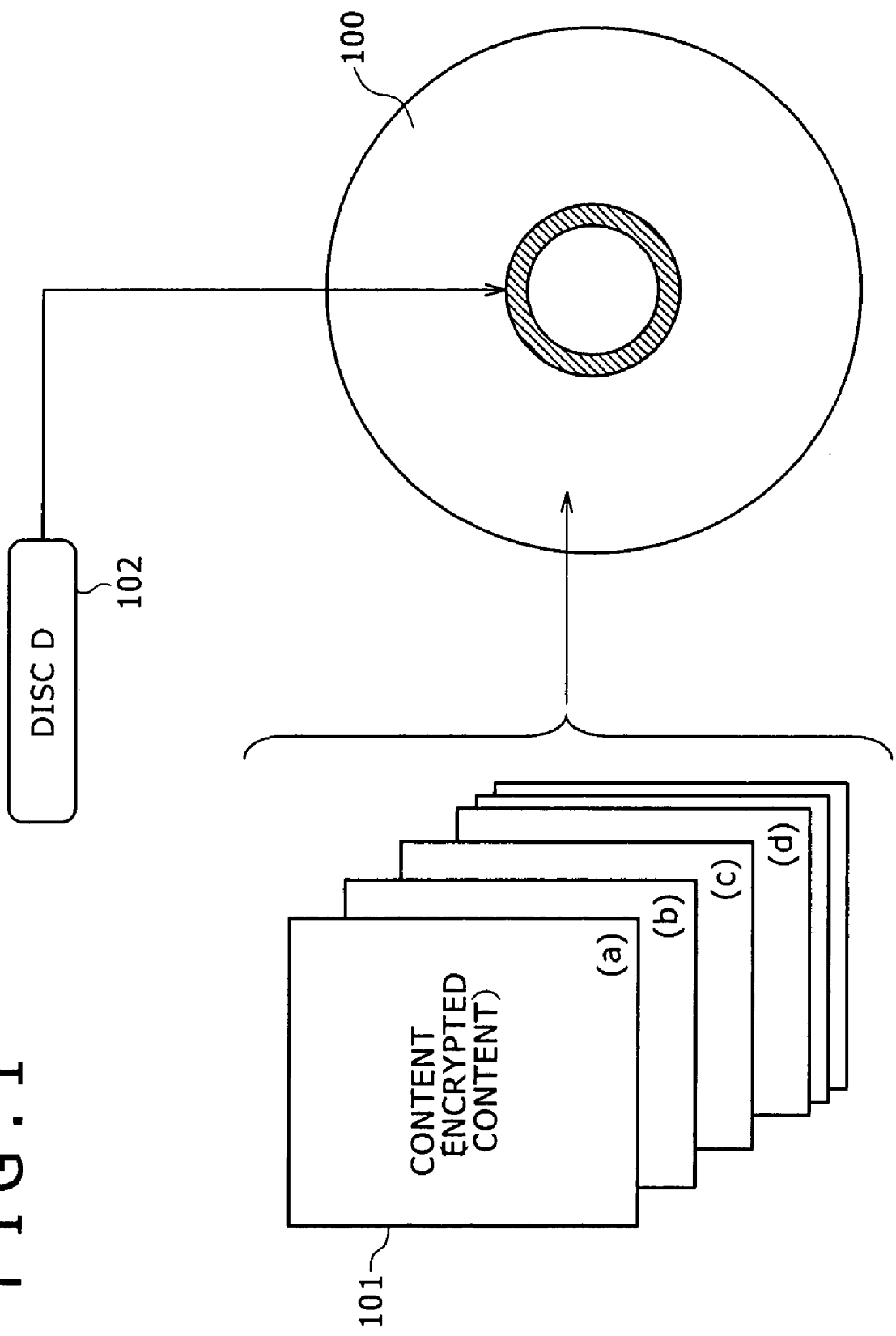
[FIG. 1]
Figure 2:
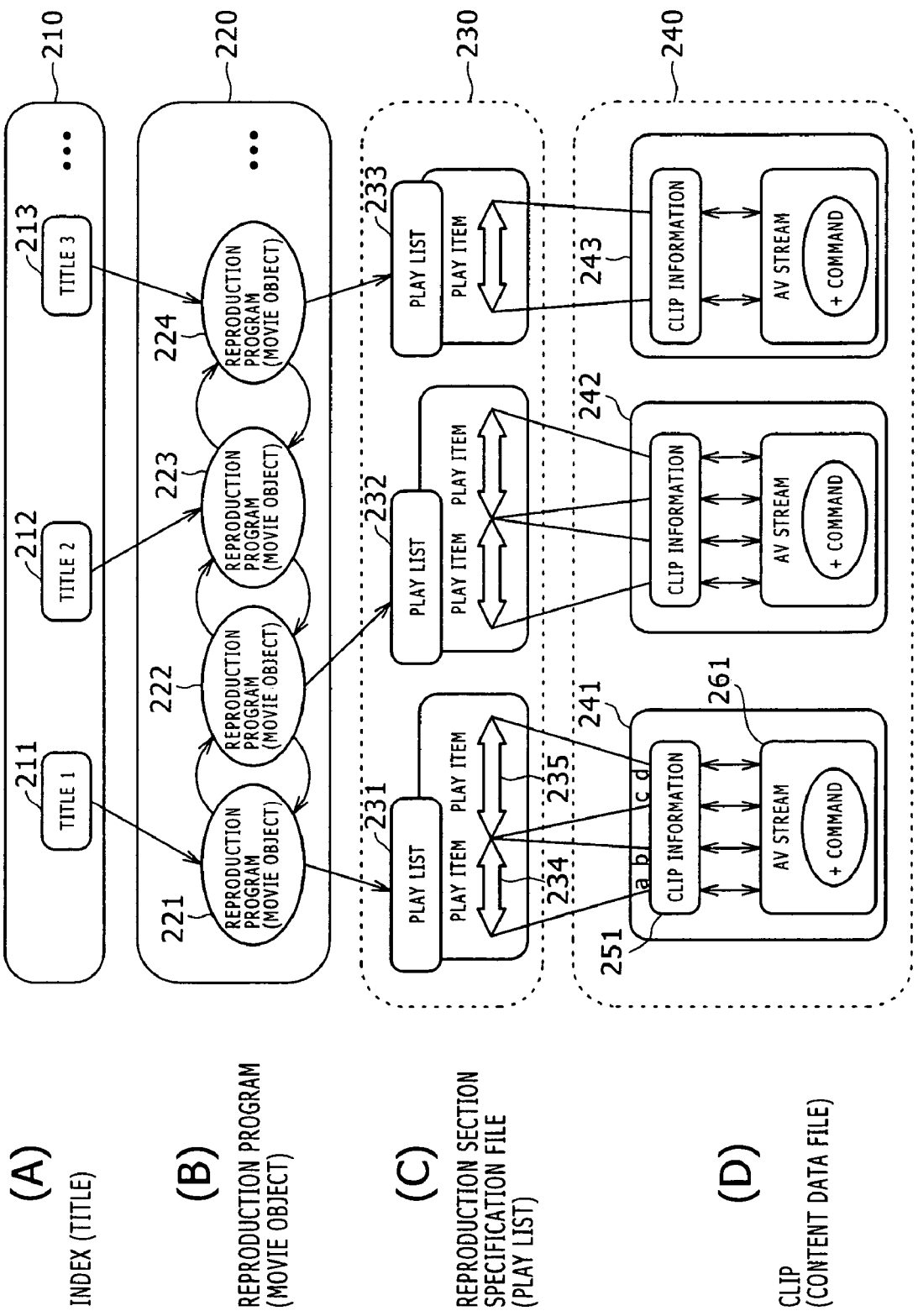
[FIG. 2]
Figure 3:
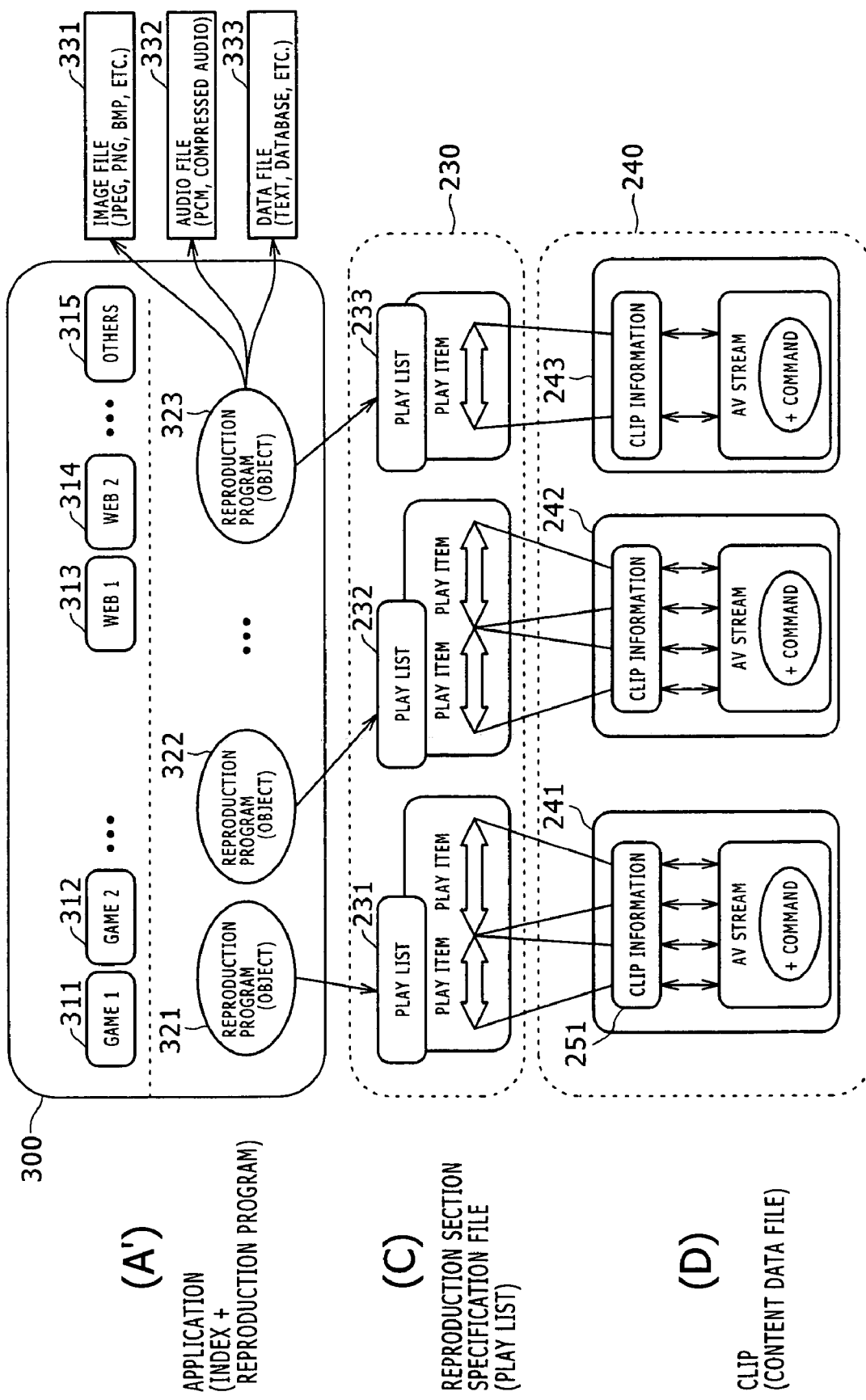
[FIG. 3]
Figure 4:
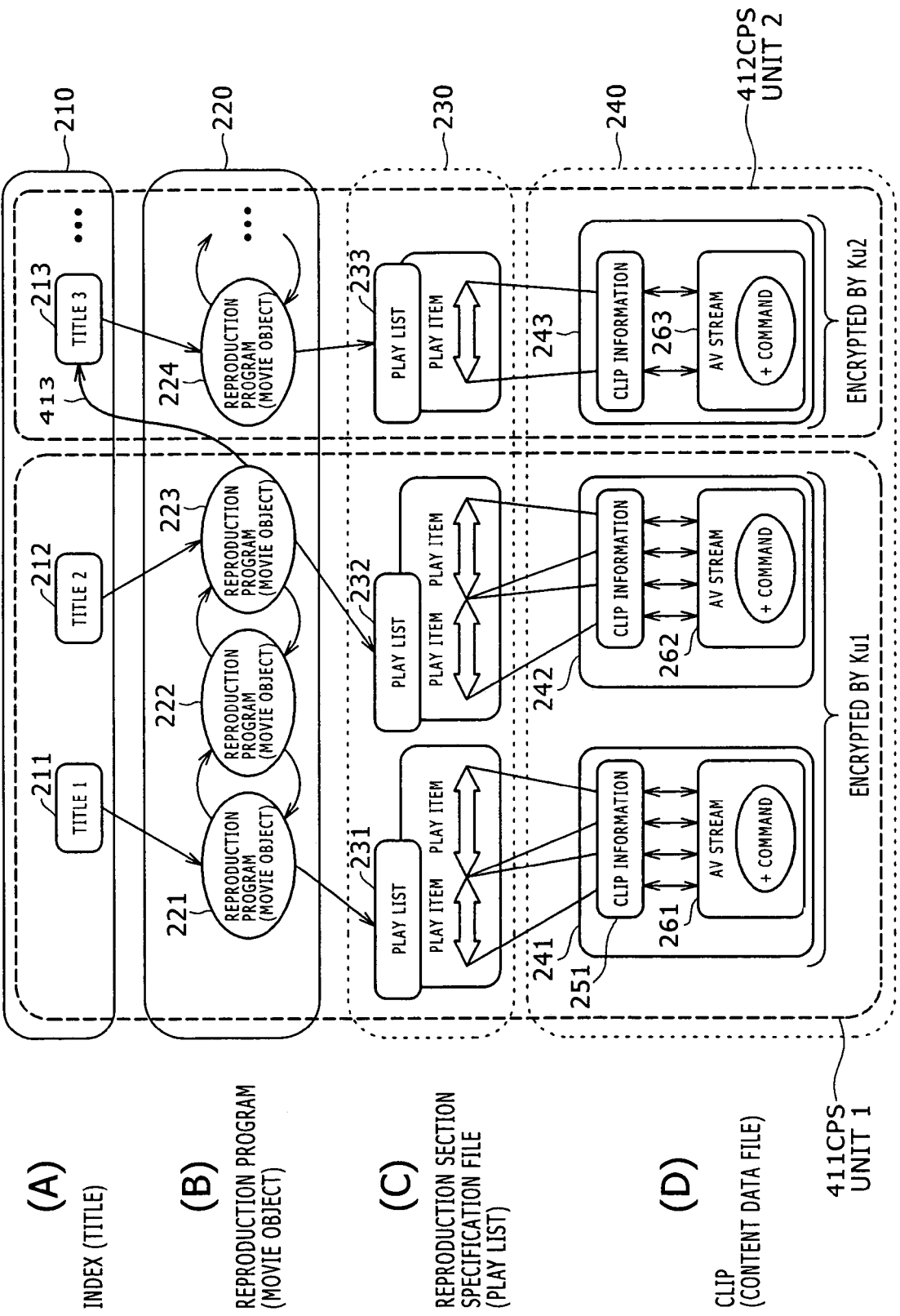
[FIG. 4]
Figure 6:
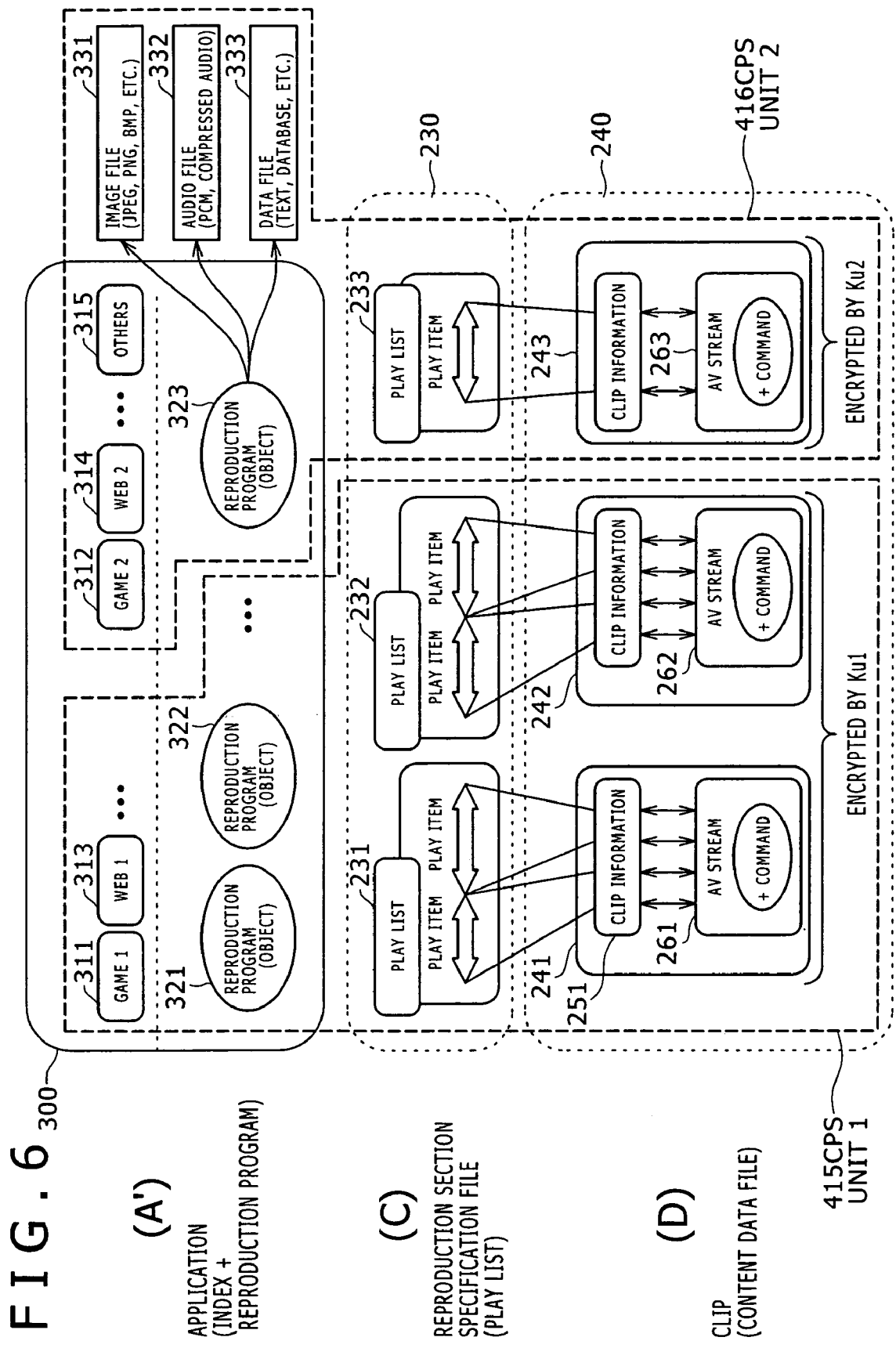
[FIG. 6]
Figure 8:
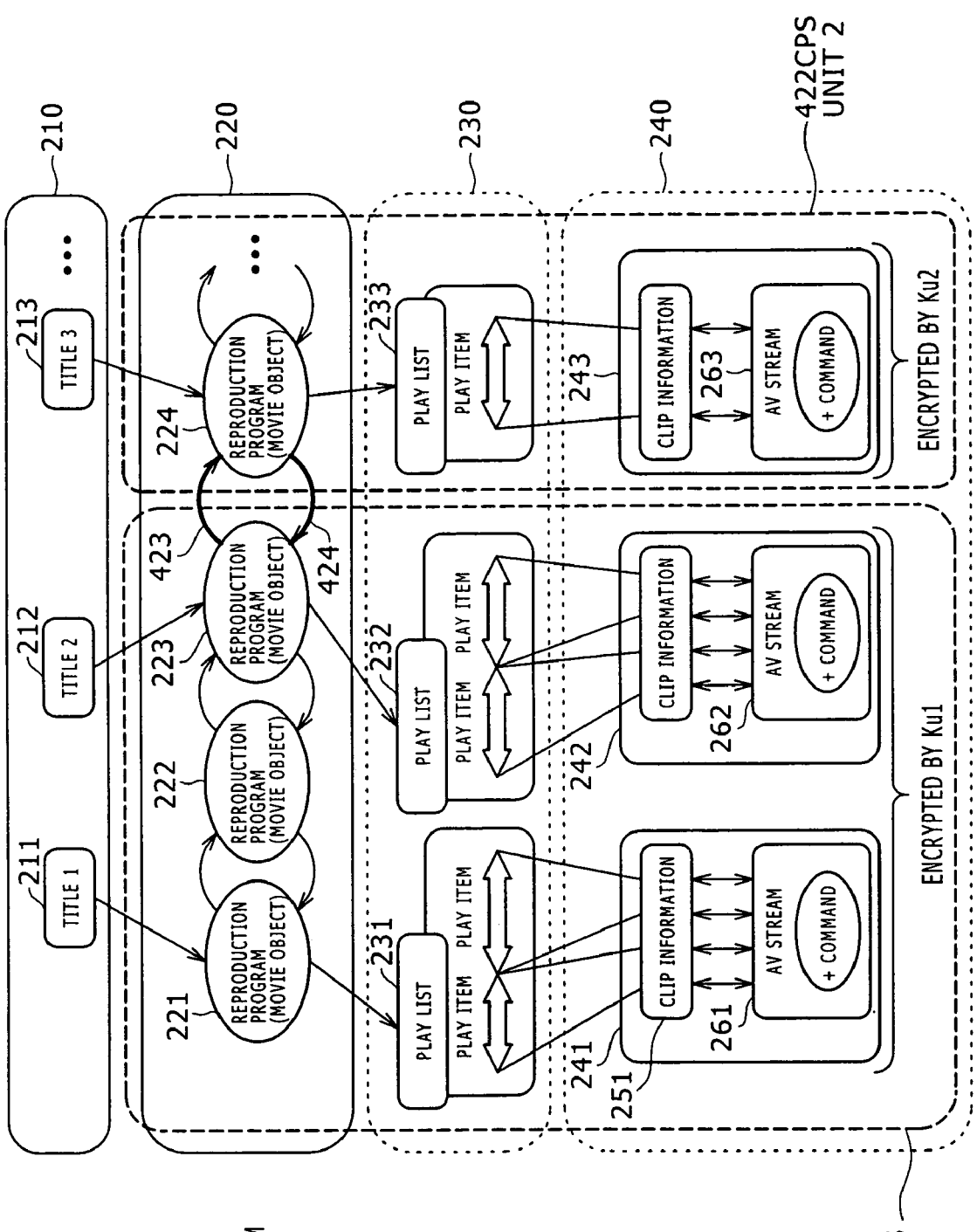
[FIG. 8]
Figure 10:
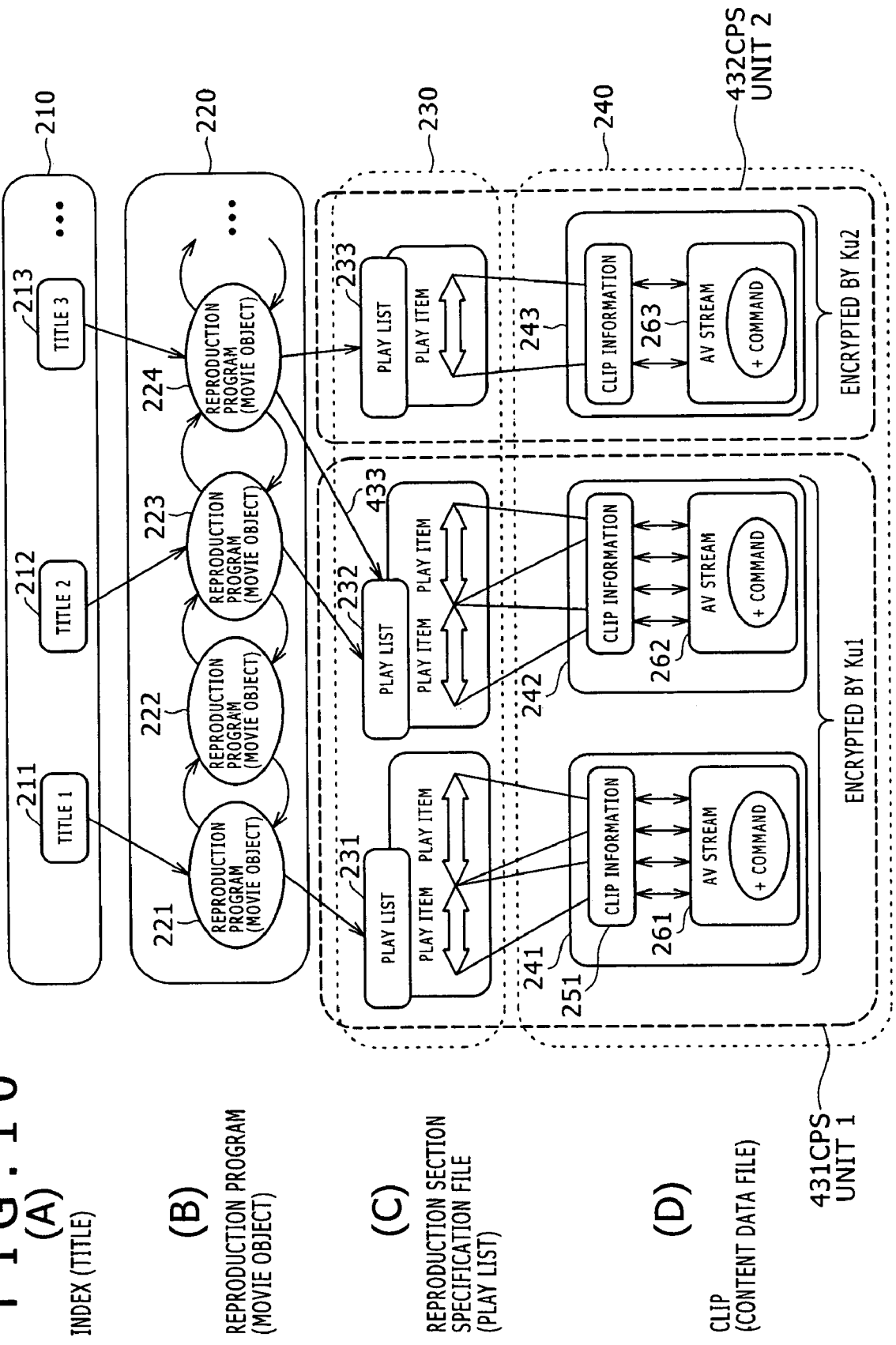
[FIG. 10]
Figure 12:
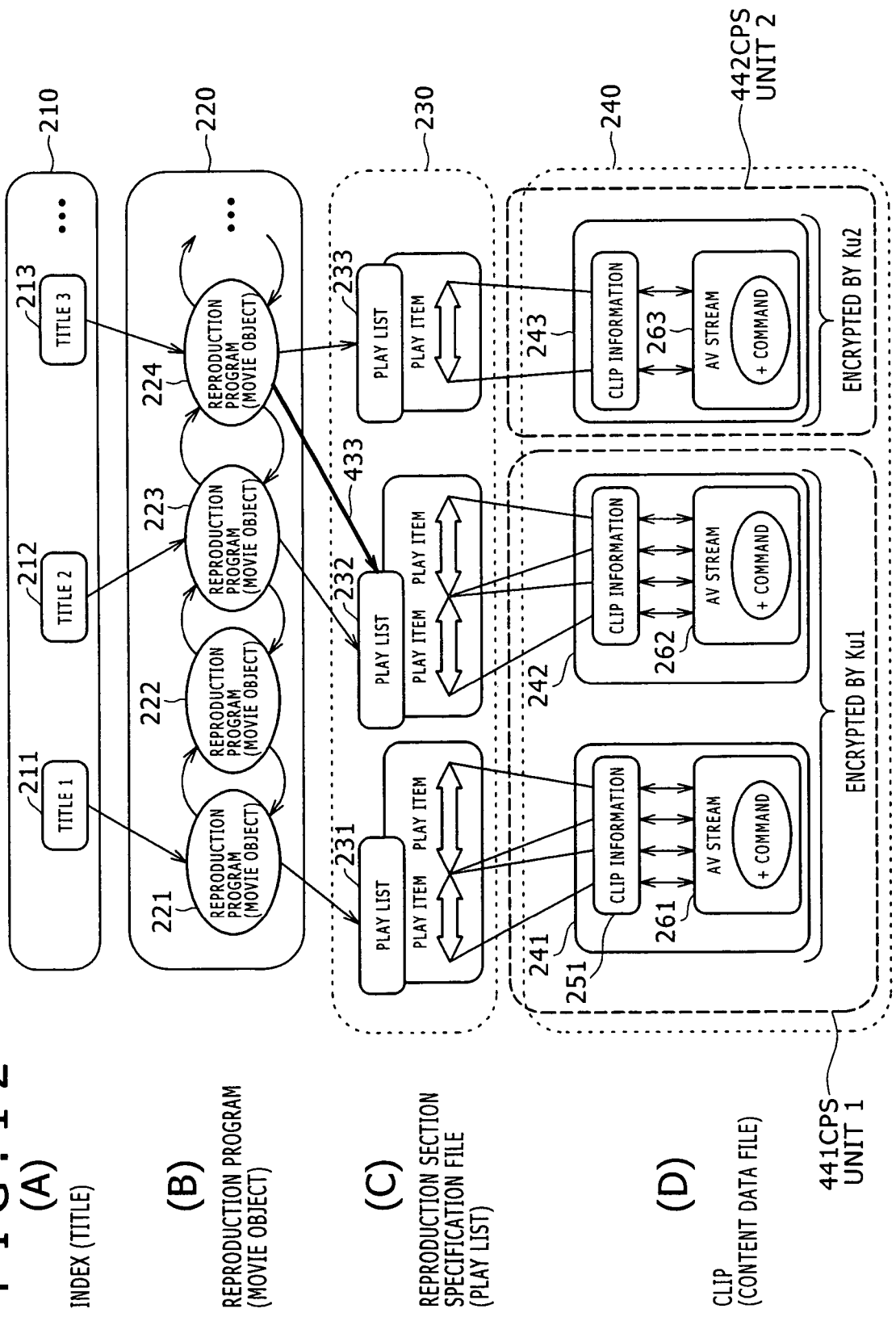
[FIG. 12]
Figure 14:
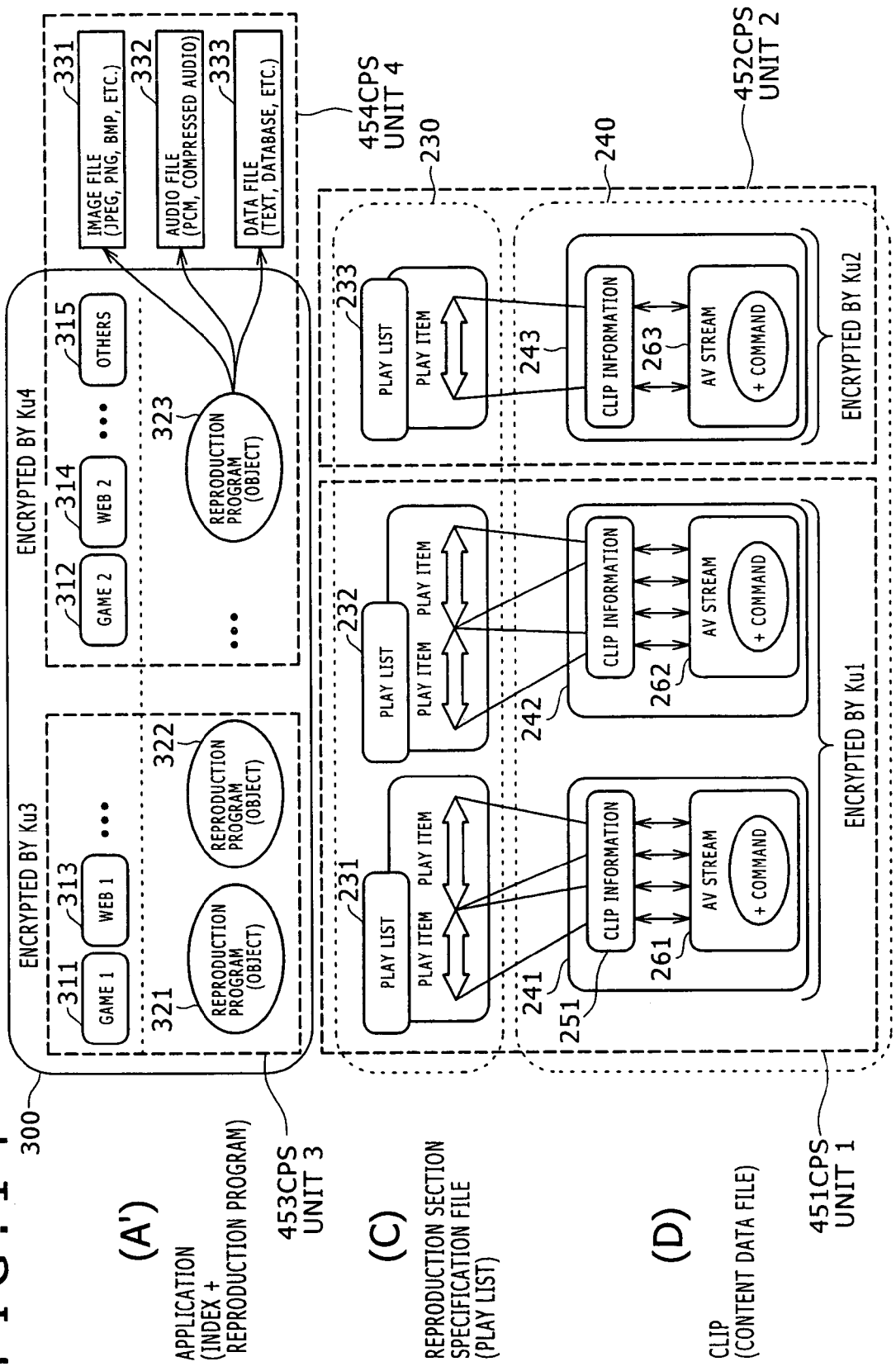
[FIG. 14]
Figure 16:
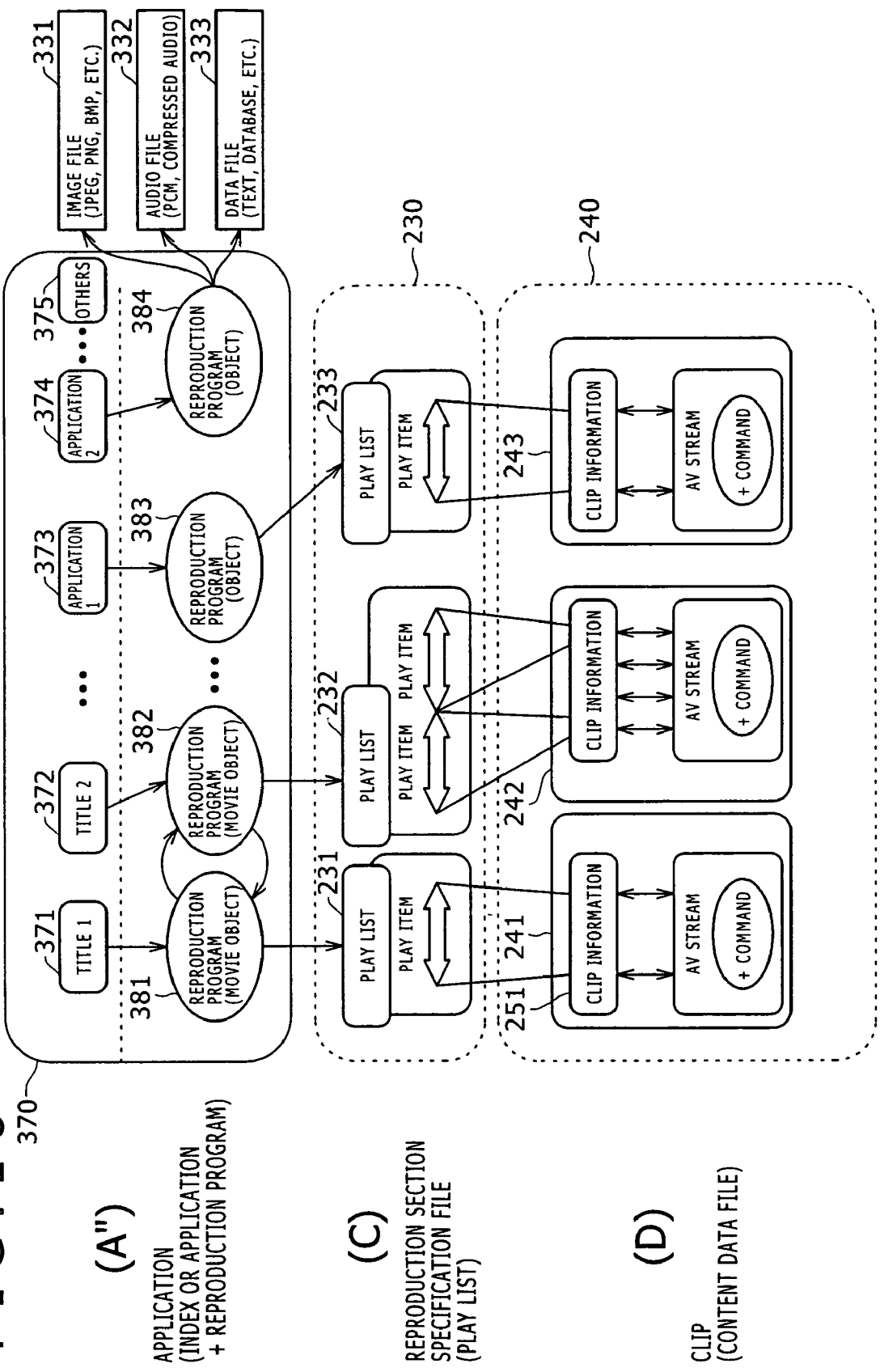
[FIG. 16]
Figure 17:
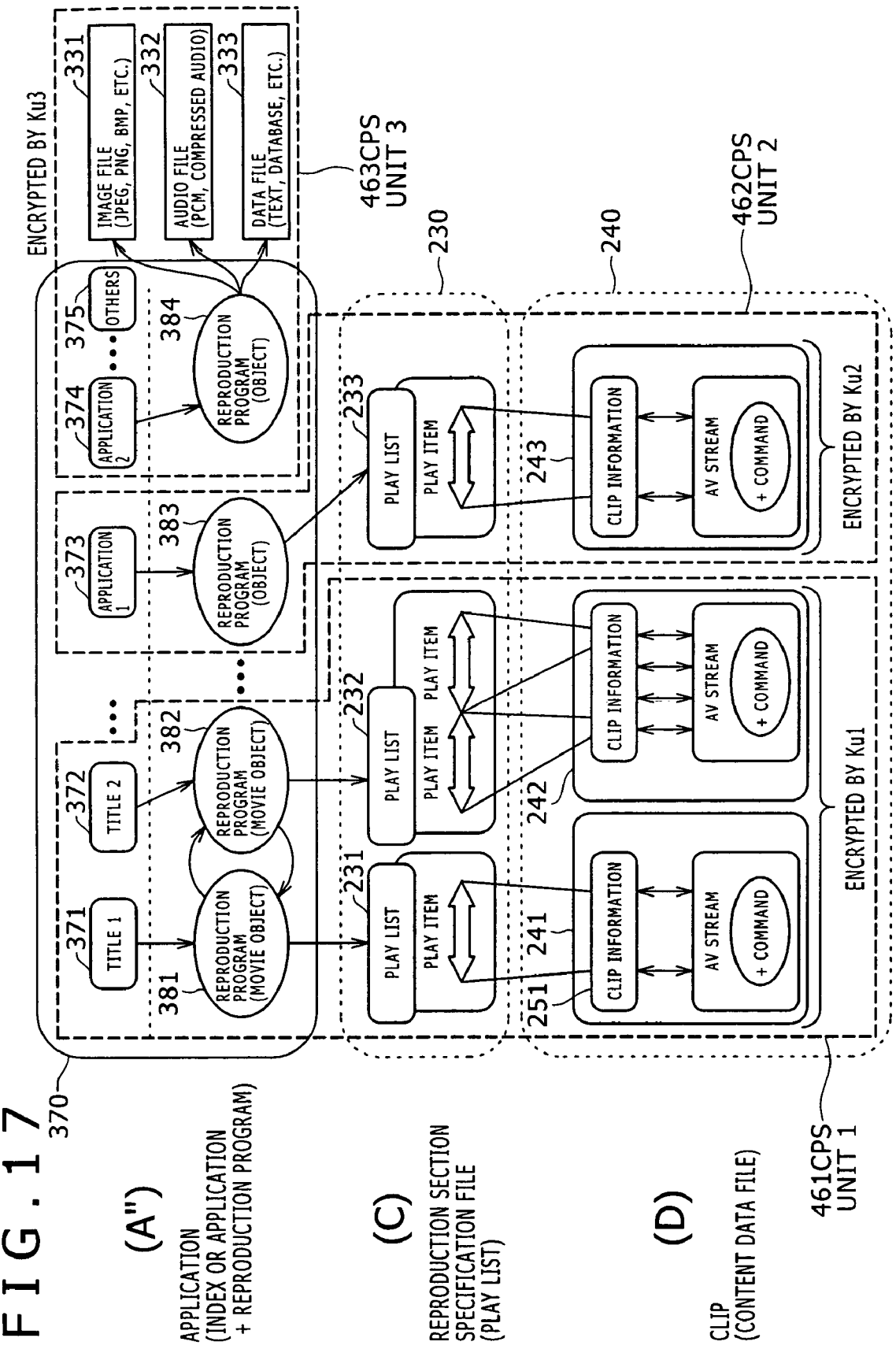
[FIG. 17]
Figure 19:
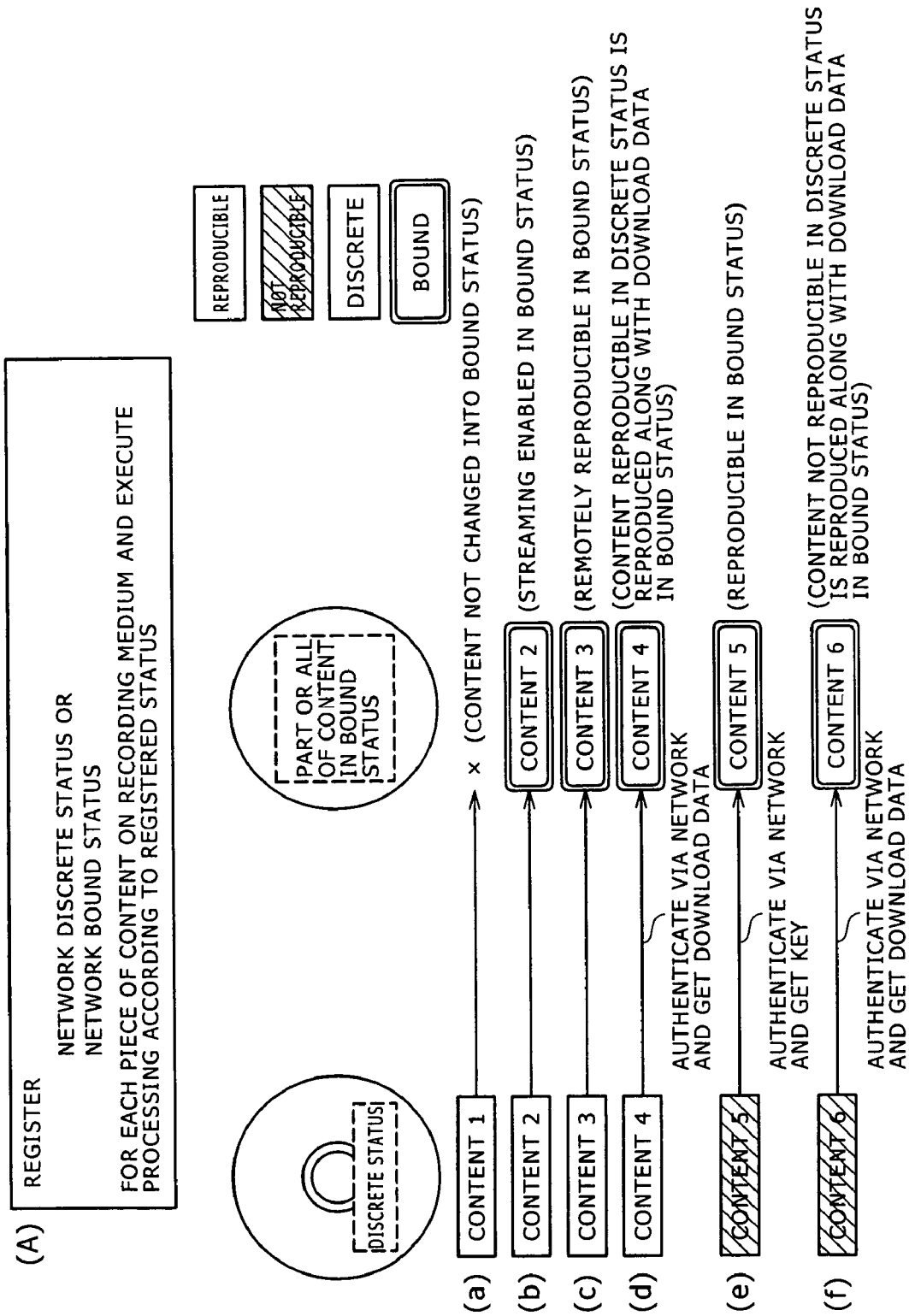
[FIG. 19]
Figure 20:
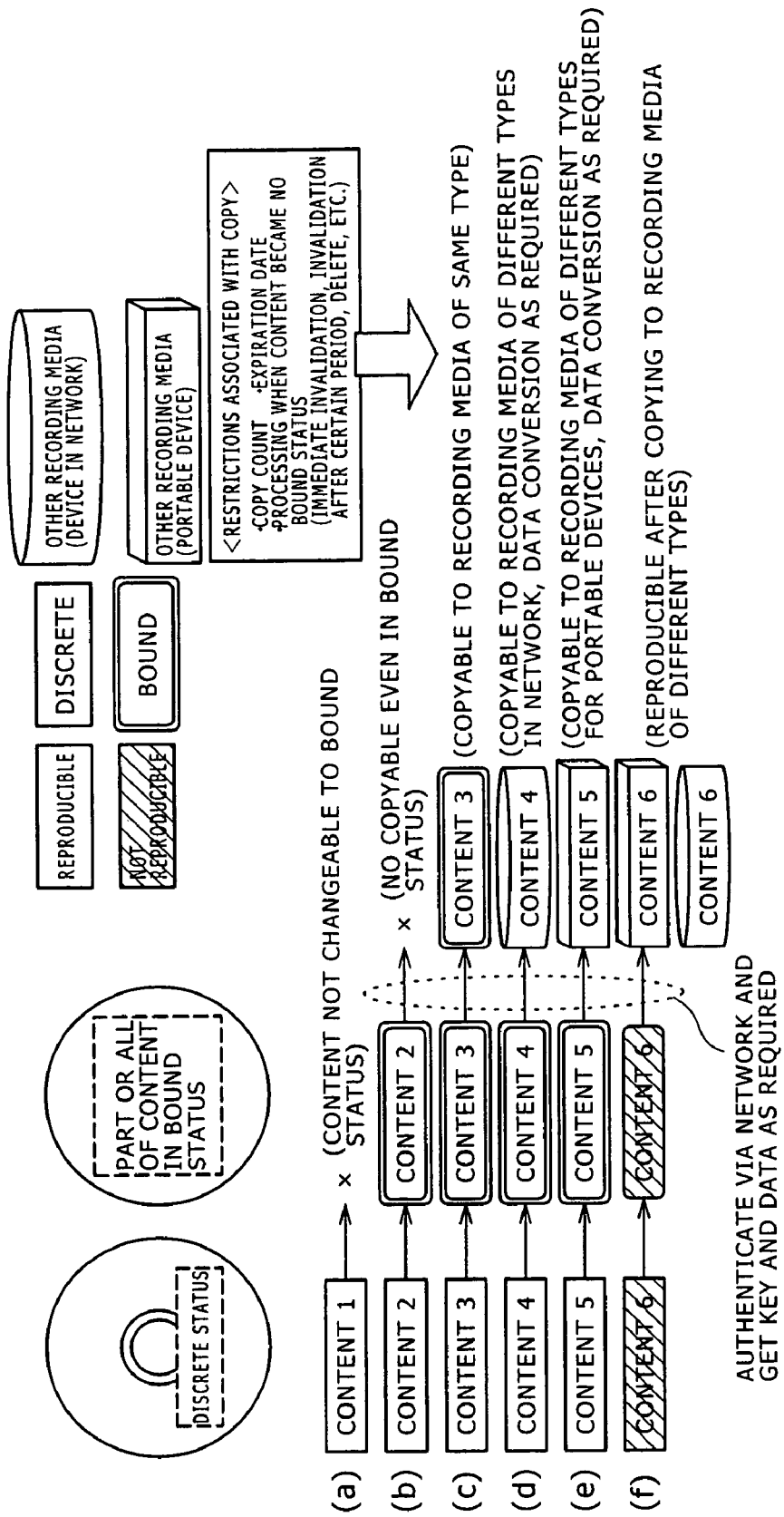
[FIG. 20]
Figure 26:
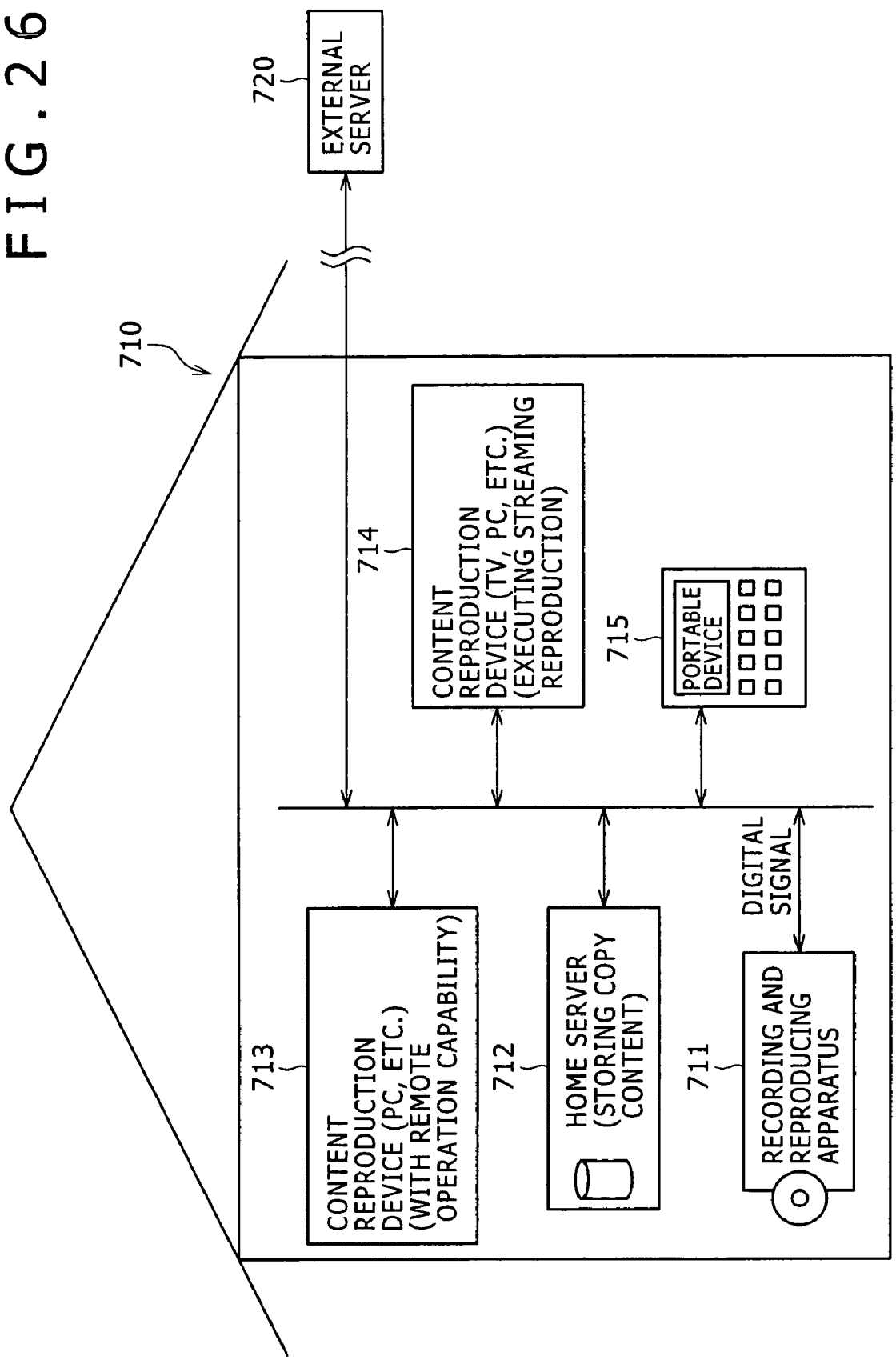
[FIG. 26]
Figure 27:
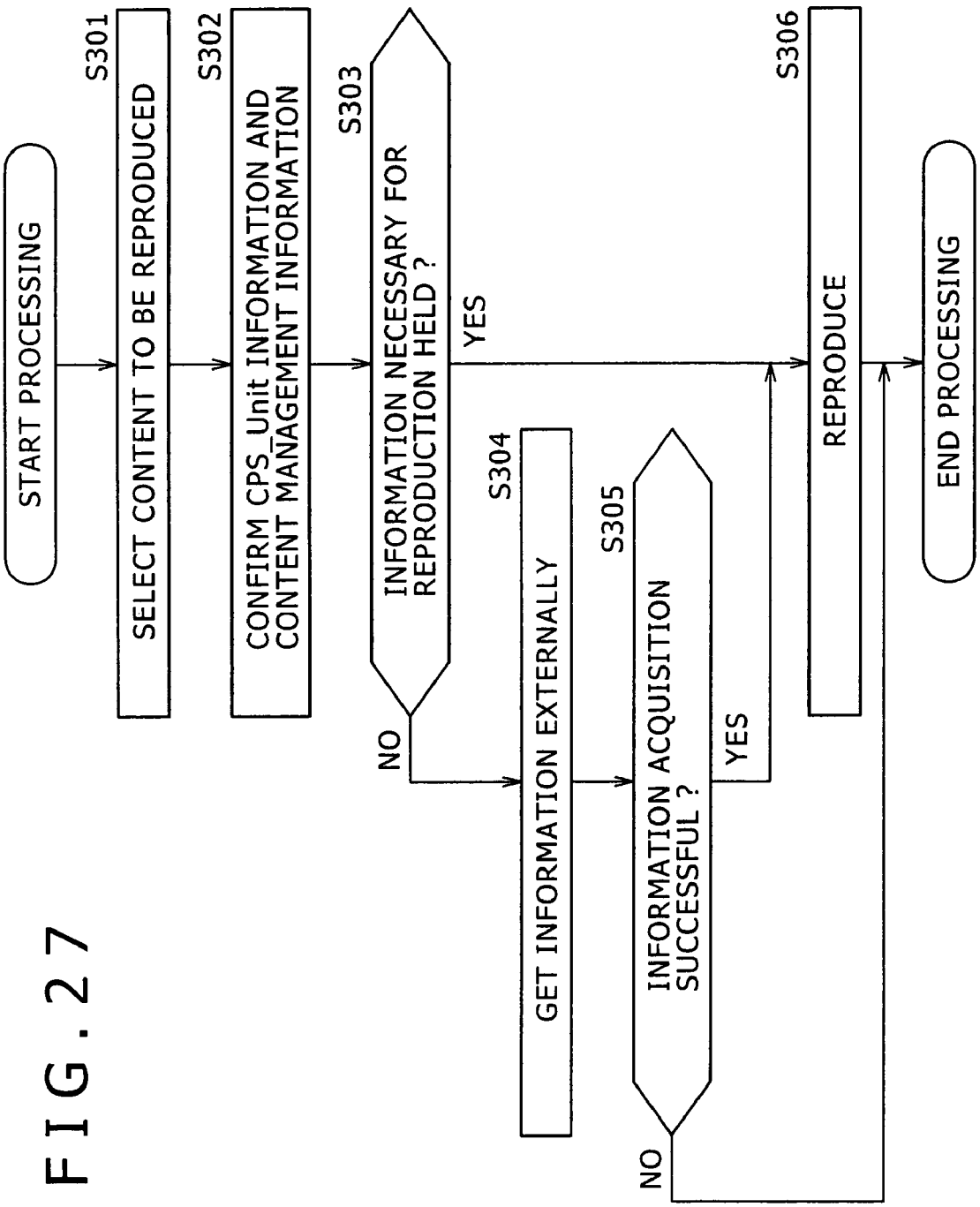
[FIG. 27]
Figure 28:
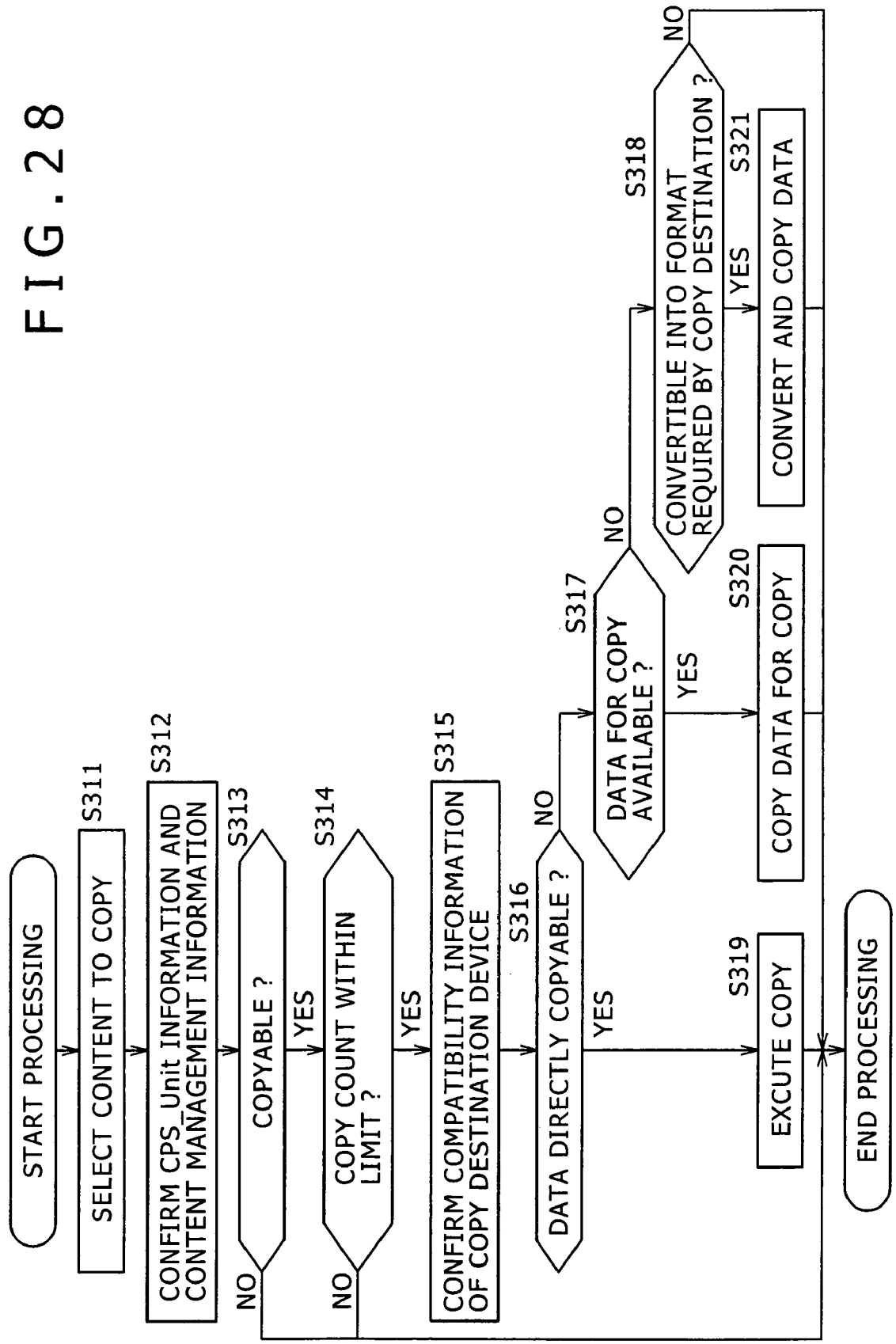
[FIG. 28]
Figure 29:
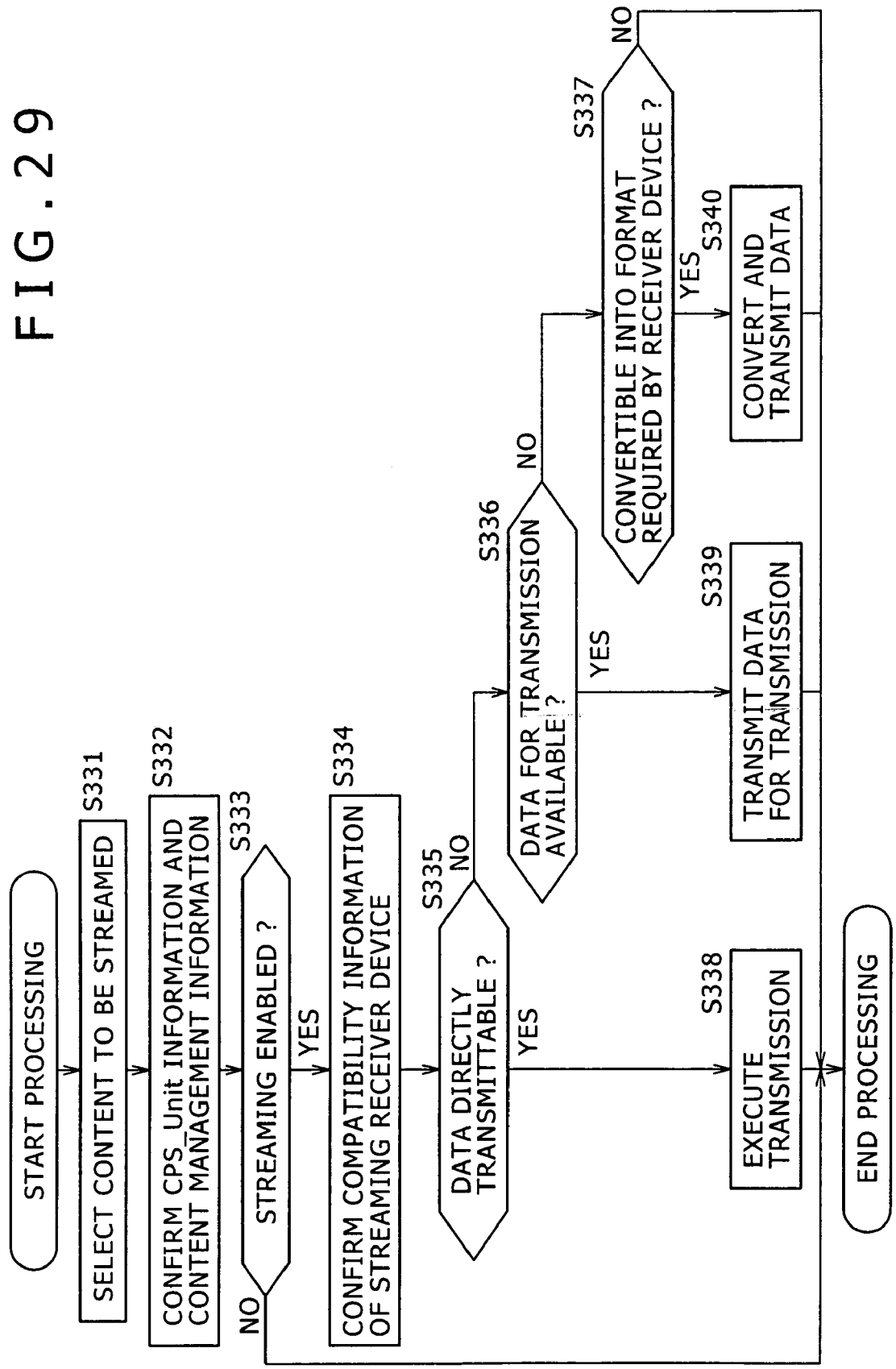
[FIG. 29]
Figure 30:
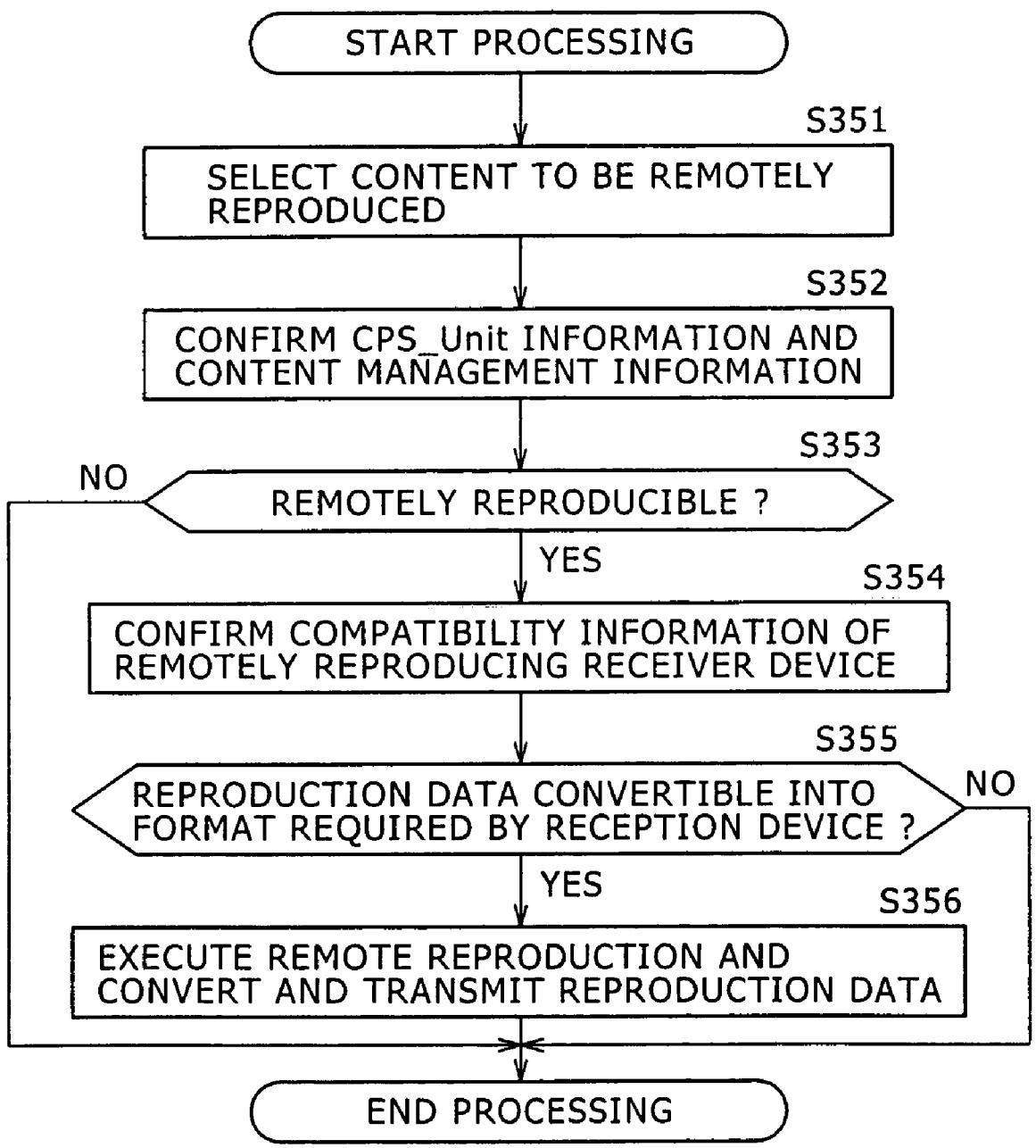
[FIG. 30]
Figure 31:
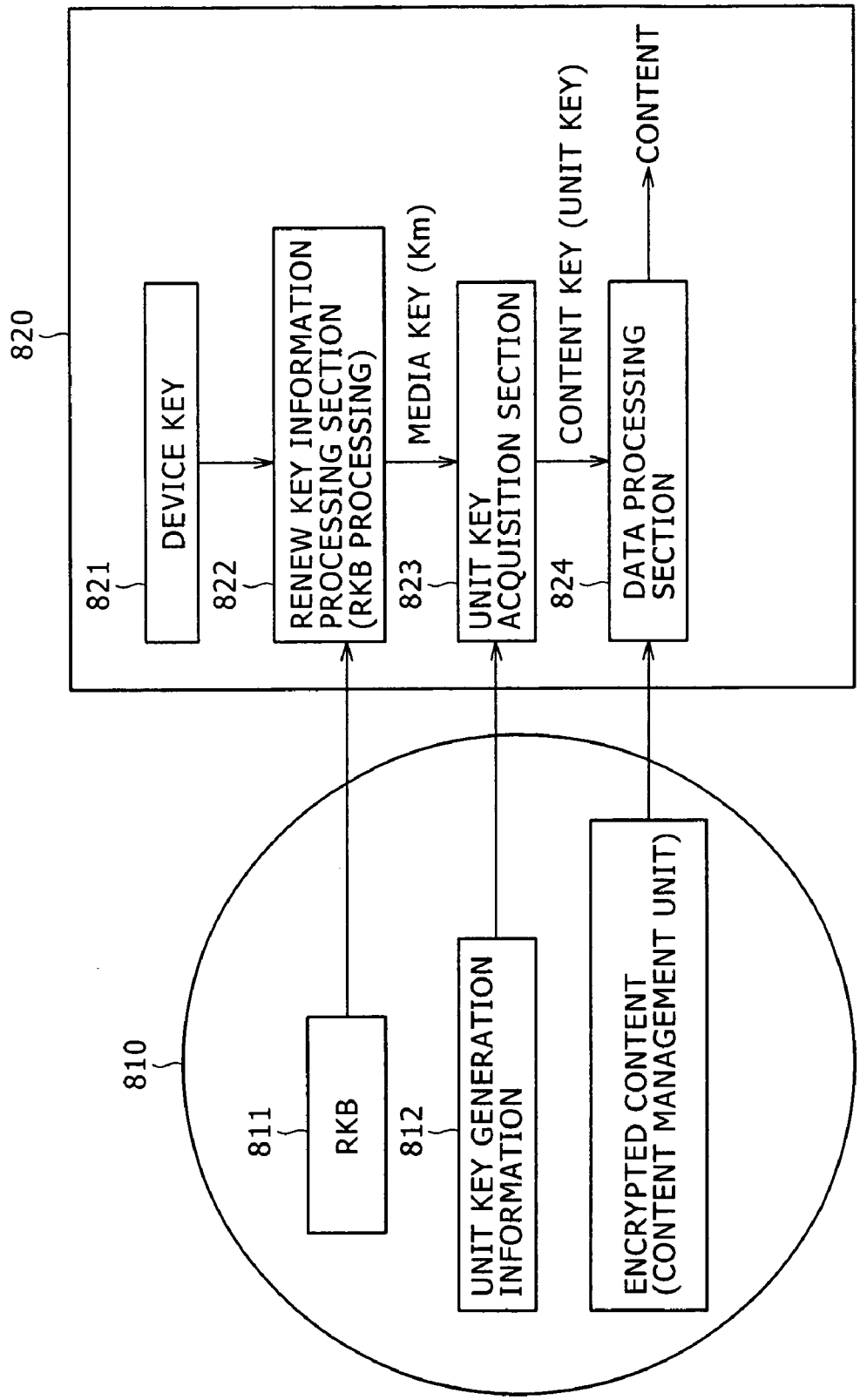
[FIG. 31]
Figure 32:
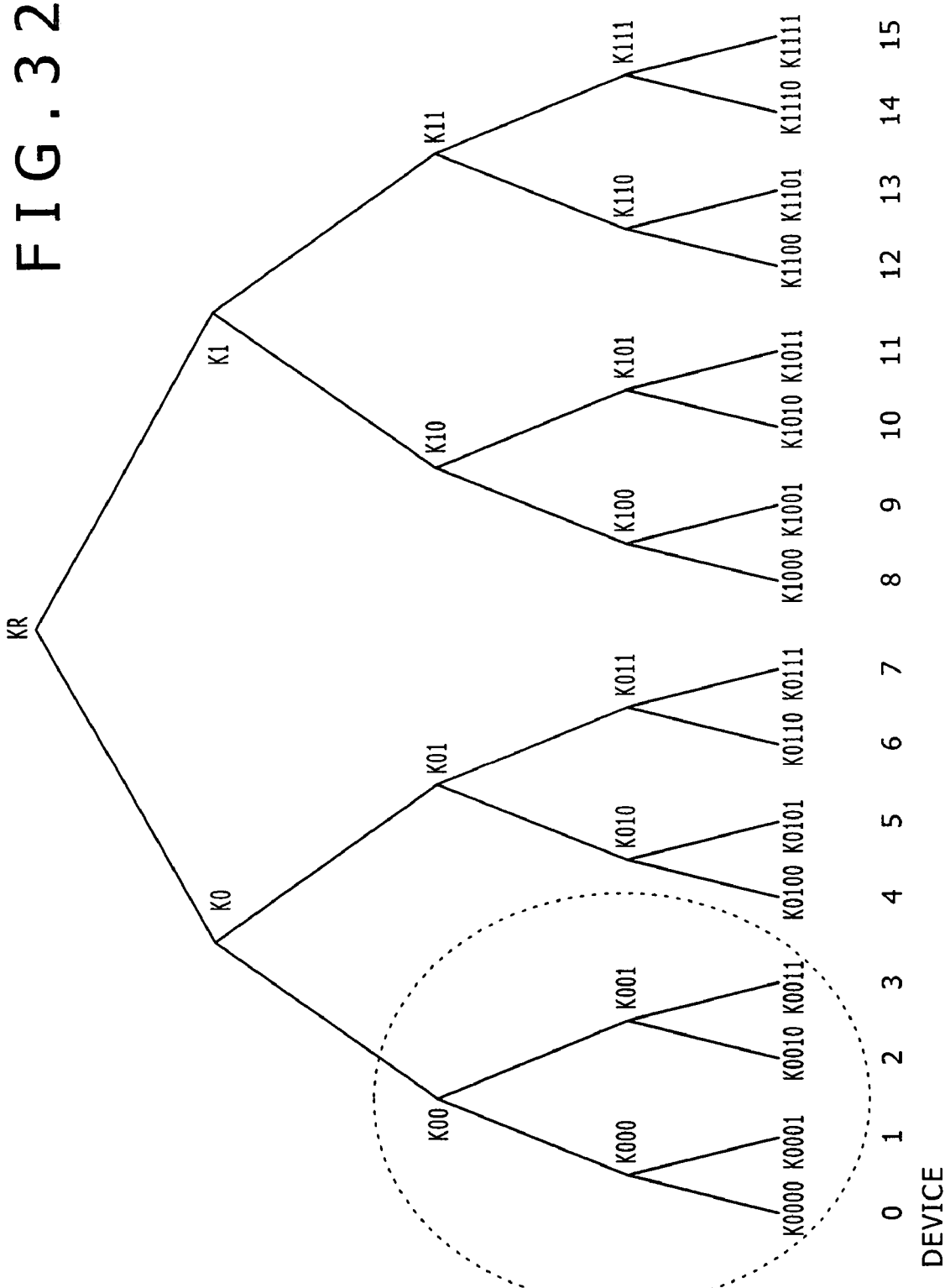
[FIG. 32]
Figure 33:
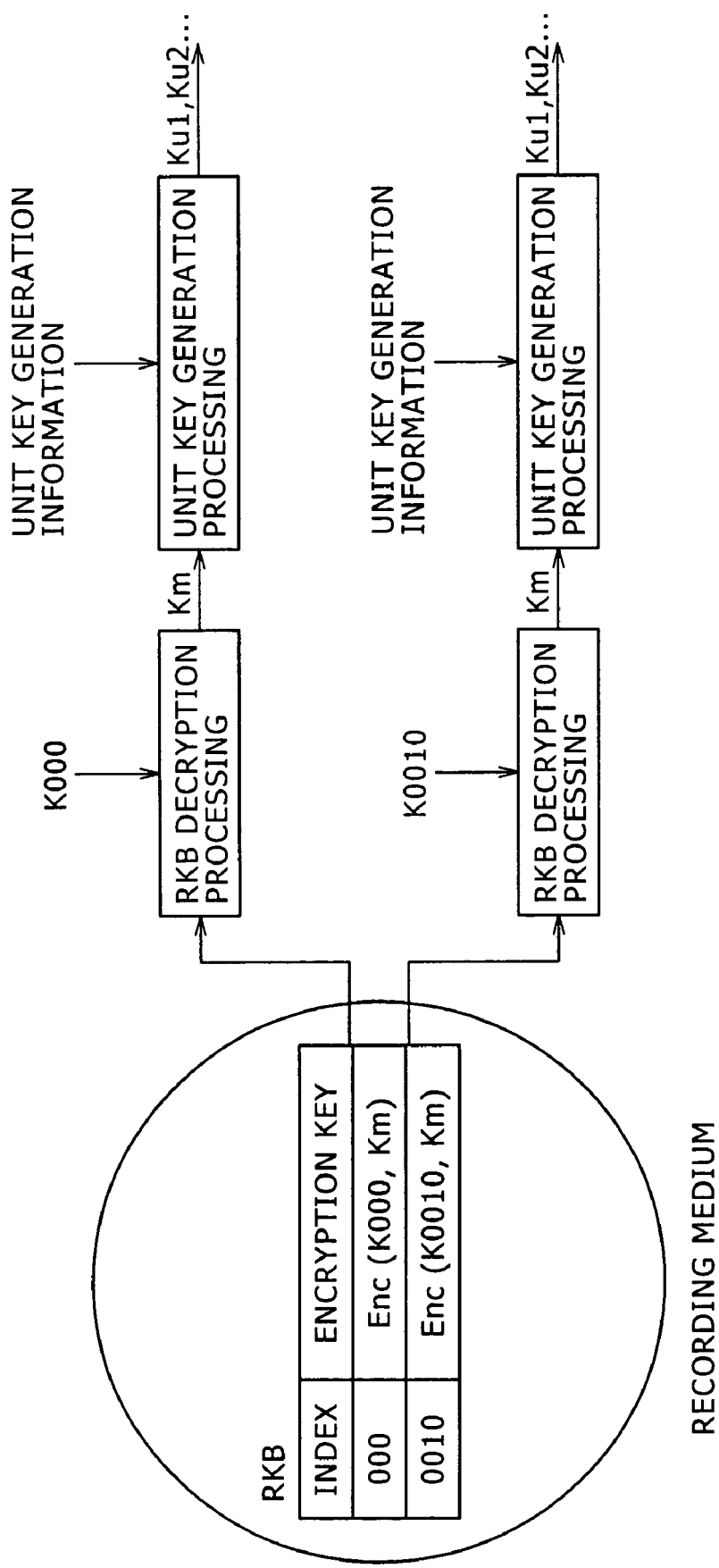
[FIG. 33]
Figure 34:
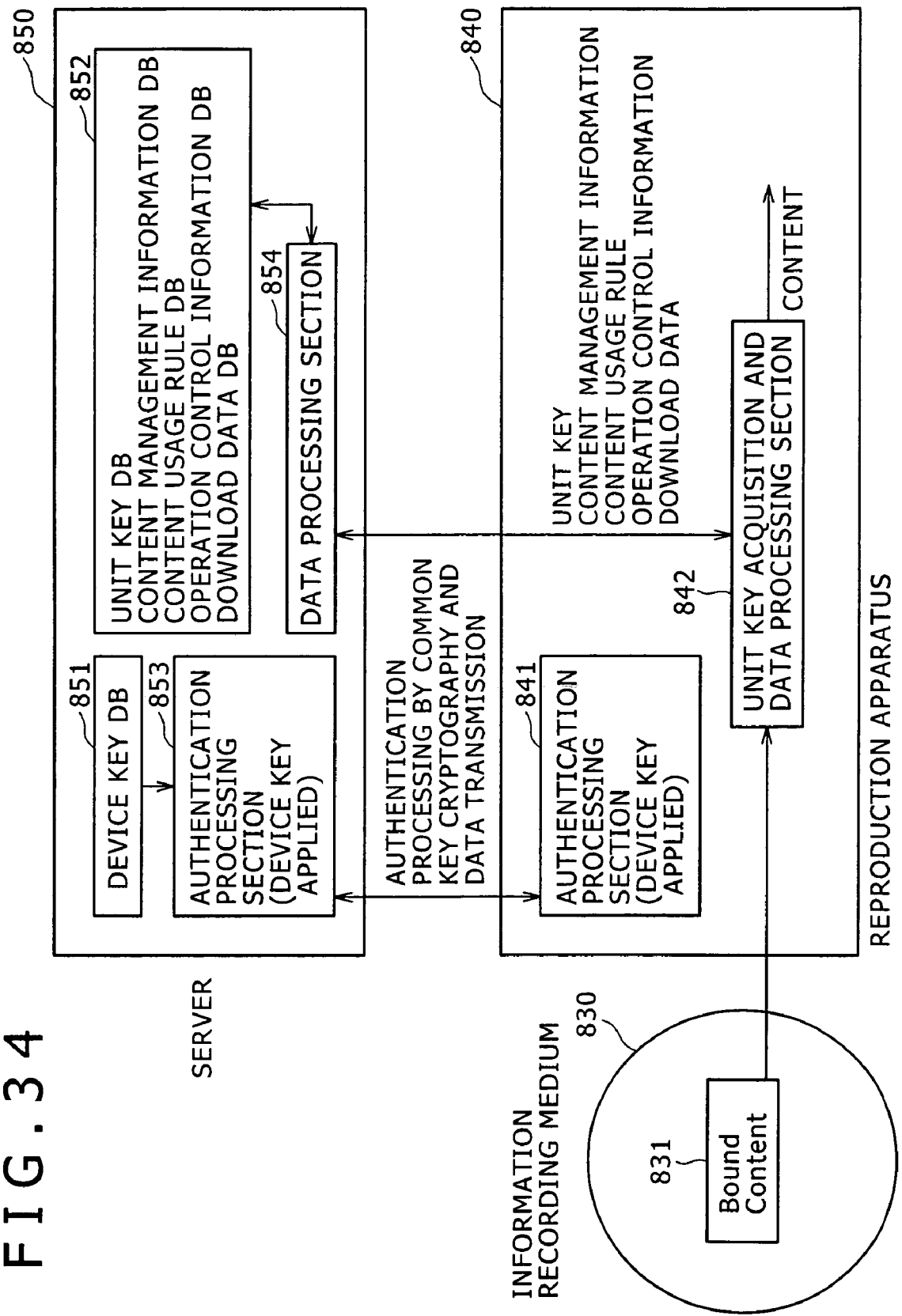
[FIG. 34]

| | |
|---|---|
| 100 | Information recording medium |
| 101 | Content |
| 102 | Disc ID |

[Description of Reference Symbols]

| | |
|---|---|
| 210 | Index (title) |
| 220 | Reproduction program |
| 230 | Reproduction section specification file (play list) |
| 240 | Clip |
| 251 | Clip information |
| 261, 262, 263 | AV streams |
| 311 to 315 | Application indexes |
| 321, 322, 323 | Reproduction programs |
| 331 | Image file |
| 332 | Audio file |
| 333 | Data file |
| 371, 372 | Application index files |
| 373 to 375 | Application execution files |
| 381 to 384 | Reproduction programs |
| 411, 412 | Content management units (CPS units) |
| 415, 416 | Content management units (CPS units) |
| 421, 422 | Content management units (CPS units) |
| 431, 432 | Content management units (CPS units) |
| 441, 442 | Content management units (CPS units) |
| 451 to 454 | Content management units (CPS units) |
| 461 to 463 | Content management units (CPS units) |
| 501 | Content management information configuration data |
| 502 | Content management information configuration data |
| 503 | Content management information configuration data |
| 511 | Content data section |
| 512 | Management data section |
| 600 | Information processing apparatus |
| 601 | Bus |
| 610 | Input and output I/F |
| 620 | TS/PS processing means |
| 630 | MPEG codec |
| 640 | Input and output I/F |
| 641 | A/D, D/A converter |
| 650 | Encryption processing means |
| 660 | ROM |
| 670 | CPU |
| 680 | Memory |
| 690 | Drive |
| 691 | Information recording medium |
| 710 | Home network |
| 711 | Recording and reproducing apparatus |
| 712 | Home server |
| 713 | Content reproducing device |
| 714 | Content reproducing device |
| 715 | Portable device |
| 720 | External server |
| 810 | Information recording medium |
| 811 | Renewal key information block (RKB) |
| 812 | Unit key generation information |
| 820 | Reproducing apparatus |
| 821 | Device key |
| 822 | Renewal key information block processing section |
| 823 | Unit key acquisition section |
| 824 | Data processing section |
| 830 | Information recording medium |
| 831 | Content |
| 840 | Reproducing apparatus |
| 841 | Device key |
| 842 | unit key acquisition and data processing section |
| 850 | Server |
| 851 | Device key database |
| 852 | Database |
| 853 | Authentication processing section |
| 854 | Data processing section |
| 855 | Server key database |
| 860 | Information recording medium |
| 861 | Renewal key information block (RKB) |
| 862 | Content |
| 870 | Reproduction apparatus |
| 871 | Device key |
| 872 | Authentication processing section |
| 873 | Renewal key information block processing section |
| 874 | Unit key acquisition and data processing section |
| 880 | Server |
| 881 | Authentication key database |
| 882 | Database |
| 883 | Authentication processing section |
| 884 | Data processing section |
| 910 | Information recording medium |
| 911 | Content |
| 920 | Reproducing apparatus |
| 921 | Device key |
| 922 | Renewal key information block processing section |
| 923 | Authentication processing section |
| 924 | Unit key acquisition and data processing section |
| 930 | Server |
| 931 | Renewal key information block (RKB) database |
| 932 | Authentication key database |
| 933 | Authentication section |
| 934 | Database |
| 935 | Data processing section |

The invention claimed is:

1. A non-transitory information recording medium comprising:
   (a) a plurality of different, individual content management units, including encryptable data, the content management units
   including a first content management unit including first encryptable data which includes:
      (i) at least one content file, the content file including at least one of a data file reproducible by an information processing apparatus and a program file executable by the information processing apparatus; and
      (ii) at least one of a content reproduction section specification file, a content reproduction processing program file, an application index file, and an application execution file;
   (b) a plurality of different, individual unit keys including a first unit key, each one of said plurality of unit keys associated with at least one of the content management units, the first encryptable data of the first content management being encrypted using the first unit key; and
   (c) a plurality of instructions which when executed by the information processing apparatus, cause the information processing apparatus, for one of the plurality of content management units, to:
      (i) determine whether the encryptable data of said content management unit includes the first encryptable data of the first content management unit; and
      (ii) if the encryptable data of the content management unit includes the first encryptable data of the first content management unit:
         (A) using the first unit key, decrypt the first encrypted data of the first content management unit; and
         (B) after decrypting the first encrypted data of the first content management unit, cause at least one of:
            (1) the data file of the first content management unit to be reproduced; and
            (2) the program file of the first content management unit to be executed.

2. The non-transitory information recording medium according to claim 1, wherein at least one of the content management units includes: (i) encryptable data corresponding to title information of the content file, and (ii) encryptable data corresponding to index information of the content file, and wherein, when executed by the information processing apparatus, the plurality of instructions cause the information processing apparatus, for one of the plurality of content management units, to: (i) cause a selection of said title information and said index information, and (ii) determine a designated one of the content management units and a designated one of the unit keys associated with the designated content management unit based on the selection of said title information and said index information.

3. The non-transitory information recording medium according to claim 2, wherein said title information and said index information are displayable to a user.

4. The non-transitory information recording medium according to claim 1, wherein at least one of the content management units includes encryptable data corresponding to at least one of a plurality of different content reproduction processing program files, and wherein, when executed by the information processing apparatus, the plurality of instructions cause the information processing apparatus, for one of the plurality of content management units, to: (i) cause a selection of one of the plurality of content reproduction processing program files to be executed by the information processing apparatus, (ii) determine a designated one of the content management units and a designated one of the unit keys associated with said designated content management unit based on the selection of said content reproduction processing program file.

5. The non-transitory information recording medium according to claim 1, wherein at least one of the content management units includes encryptable data corresponding to at least one of a plurality of different content reproduction section specification files, and wherein, when executed by the information processing apparatus, the plurality of instructions cause the information processing apparatus, for one of the plurality of content management units, to: (i) cause a selection of one of the plurality of content reproduction section specification files to be executed by the information processing apparatus, and (ii) determine a designated one of the content management units and a designated one of the unit keys associated with said designated content management unit based on the selection of said content reproduction section specification file.

6. The non-transitory information recording medium according to claim 1, wherein at least one of the content management units includes encryptable data corresponding to at least one of a plurality of different clip files, the plurality of clip files including a plurality of content real data storage files, and wherein, when executed by the information processing apparatus, the plurality of instructions cause the information processing apparatus, for one of the plurality of content management units, to: (i) cause a selection of one of the plurality of clip files to be reproduced by the information processing apparatus, and (ii) determine a designated one of the content management units and a designated one of the unit keys associated with the designated content management unit based on the selection of the clip file.

7. The non-transitory information recording medium according to claim 1 wherein at least one of the content management units includes:
a first unit including the at least one content file, said first unit being encrypted based on a first one of the unit keys; and
a second unit including at least one of the application execution file and the application index file, said second unit being encrypted based on a second, different one of the unit keys.

8. The non-transitory information recording medium according to claim 1, wherein at least one of the content management units includes encryptable data corresponding to: the application execution file and the content reproduction processing program file.

9. The non-transitory information recording medium according to claim 1, wherein at least one of the content management units includes encryptable data corresponding to: the application execution file, the content reproduction processing file, and an application resource file associated with the execution of said application execution file.

10. The non-transitory information recording medium according to claim 1, wherein at least one of the content management units includes encryptable data corresponding to: the content reproduction section specification file, an AV stream file corresponding to real data of the content file to be referenced from said content reproduction section specification file, the application execution file, and an application resource file associated with the execution of said application execution file.

11. The non-transitory information recording medium according to claim 1, which includes a management table associated with the plurality of the content management units, wherein for each one of the content management units, the management table includes unit setting unit information, content management unit identification information, and unit key identification information associated with said content management unit.

12. The non-transitory information recording medium according to claim 1, which includes a status management table associated with the plurality of the content management units, wherein for each one of the content management units, the status management table includes status information for said content management unit, said status information being indicative of whether said content management unit has network independent status or network associated status.

13. The non-transitory information recording medium according to claim 12, wherein, for each one of the content management units, said status management table includes at least initial status information for said content management unit.

14. The non-transitory information recording medium according to claim 12, wherein, for each one of the content management units, said status management table includes initial status information and current status information for said content management unit.

15. The non-transitory information recording medium according to claim 1, which includes a content use management information table associated with the plurality of the content management units, wherein, for each one of the content management units, the content use management information table includes restriction information associated with content use for said content management unit.

16. The non-transitory information recording medium according to claim 15, wherein, for each one of the content management units, said restriction information associated with content use for said content management unit indicates whether said content management unit has network independent status or network associated status.

17. The non-transitory information recording medium according to claim 15, wherein, for each one of the content management units, said content use management information table includes information for indicating that content is subject to control based on operation control information.

18. The non-transitory information recording medium according to claim 17, wherein said content use management information table includes information for specifying a server from which said operation control information is obtainable.

19. The non-transitory information recording medium according to claim 1, which includes at least one of: (i) copy processing content for copy processing in addition to the content files of the content management units; and (ii) streaming reproduction content for streaming reproduction in addition to the content files of the content management units.

20. The non-transitory information recording medium according to claim 19, wherein the content file is associated with a first data format, said copy processing content is associated with a second data format, and the streaming reproduction content is associated with a third data format, the second data format and the third data format being different than the first data format.

21. An information processing apparatus comprising:
(a) a unit key acquisition section configured to:
(i) identify a first content management unit from a plurality of different, individual content management units which include encryptable data stored in an information recording medium, of the first content management unit including first encryptable data corresponding to:
(A) at least one content file, the content file including at least one of a data file reproducible by the information processing apparatus and a program file executable by the information processing apparatus; and
(B) at least one of a content reproduction section specification file, a content reproduction processing program file, an application index file, and an application execution file; and
(ii) acquire a designated unit key from a plurality of different, individual unit keys, each one of the plurality of unit keys being associated with at least one of the plurality of content management units, wherein for the identified first content management unit, the first encryptable data is encrypted using the acquired designated unit key; and
(b) a data processing section configured to execute a plurality of instructions, wherein when executed by the data processing section, the plurality of instructions cause the data processing section to operate with the unit key acquisition section to:
(i) identify one of the content management units from the plurality of content management units;
(ii) determine if the encryptable data of the identified content management unit includes the first encrypted data; and
(iii) if the encryptable data of the identified content management unit includes the first encrypted data of the first content management unit:
(A) using the designated unit key, decrypt the first encrypted data of the first content management unit; and
(B) after decrypting the first encrypted data of the first content management unit, cause at least one of:
(1) the data file of the first content management unit to be reproduced; and
(2) the program file of the first content management unit to be executed.

22. The information processing apparatus according to claim 21, wherein said unit key acquisition section is configured to: (i) detect a switch from a first content management unit to a second, different content management unit, and (ii) if the switch is detected, acquire the unit key associated with the second, different content management unit based on a management table, the management table including unit setting unit information for each of the plurality of content management units, content management unit identification information for each of the plurality of content management units, and unit key identification information associated with each of the plurality of content management units.

23. The information processing apparatus according to claim 21, further comprising:

a renewal key information block processing section configured to decrypt a renewal key information block to obtain a media key, the decryption based on a device key associated with a legal content use right of the information processing apparatus, said device key being associated with said identified content management unit.

24. The information processing apparatus according to claim 23, wherein said renewal key information block processing section is configured to acquire the device key via communication with at least one of: an information recording medium, and a networked server.

25. The information processing apparatus according to claim 21, further comprising:
an authentication processing section configured to execute a plurality of instructions, wherein when executed by the authentication processing section, the plurality of instructions cause the authentication processing section to operate with the data processing section and the unit key acquisition section to authenticate a networked server; and
wherein, upon successful authentication of the networked server, the plurality of instructions when executed by at least one of said unit key acquisition section and said data processing section, cause at least one of said unit key acquisition section and said data processing section to acquire at least one of: (i) one of the unit keys from said networked server; and (ii) one of a plurality of content use conditions from said networked server.

26. The information processing apparatus according to claim 21, further comprising:
a renewal key information block processing section configured to execute a plurality of instructions, wherein when executed by the renewal key information block processing section, the plurality of instructions cause the renewal key information block processing section to decrypt a renewal key information block to acquire an authentication key for authenticating a networked server, the decryption of the renewal key information block being based on a device key associated with one of said content management units and a legal content use right of the information processing apparatus; and
an authentication processing section configured to execute a plurality of instructions, wherein when executed by the authentication processing section, the plurality of instructions cause the authentication processing section to operate with the data processing section and the unit key acquisition section to authenticate the networked server based on the authentication key acquired from said renewal key information block;
wherein, upon successful authentication of the networked server, the plurality of instructions when executed by at least one of said unit key acquisition section and said data processing section, cause at least one of said unit key acquisition section and said data processing section to acquire at least one of: one of the unit keys from said networked server; and (ii) one of a plurality of content use conditions from said networked server.

27. The information processing apparatus according to claim 21, wherein when executed by the data processing section, the plurality of instructions cause said data processing section to: (i) determine whether said content management unit has network independent status or network associated status; and (ii) cause the decryption of the content file of said content management unit based on the determination.

28. The information processing apparatus according to claim 27, wherein said data processing section causes the decryption of the content file based on a content use management information table which stores control information associated with each said content management unit.

29. The information processing apparatus according to claim 21, wherein when executed by the data processing section, the plurality of instructions cause said data processing section to: (i) receive operation control information corresponding to at least one of the content files of the plurality of content management units stored in said information recording medium; and (ii) for at least one of the content management units, based on the received operation control information corresponding to the at least one content file of said content management unit, cause at least one of: (A) the data file of said content management unit to be reproduced; and (2) the program file of said content management unit to be executed.

30. The information processing apparatus according to claim 21, wherein when executed by the data processing section, the plurality of instructions cause said data processing section to: (i) notify a networked server of at least one of: an user identifier, an information processing apparatus identifier, and an information recording medium identifier; (ii) receive operation control information from said networked server based on the identifier notified to the networked server, and (iii) based on the received operation control information, cause at least one of: (A) the data file of at least one of the content management units to be reproduced; and (2) the program file of at least one of the content management units to be executed.

31. An information processing method for reproducing or executing at least one content file stored in an information recording medium, said method comprising:
 (a) providing a plurality of different, individual content management units including encryptable data, the content management units including a first content management unit including first encrypted data which includes:
  (i) the at least one content file, the content file including at least one of a data file reproducible by an information processing apparatus and a program file executable by the information processing apparatus; and
  (ii) at least one of a content reproduction section specification file, a content reproduction processing program file, an application index file, and an application execution file; and
 (b) causing a processor to execute a plurality of instructions to operate with the information processing apparatus to:
  (i) identify one of the content management units from the plurality of content management units;
  (ii) determine if the identified content management unit includes the first encrypted data; and
  (iii) if the identified content management unit includes the first encrypted data:
   (A) select a first unit key from a plurality of different, individual units keys, each one of the plurality of unit keys being associated with at least one of the plurality of content management units, the selected first unit key corresponding to the first content management unit;
   (B) using the selected first unit key, decrypt the first encrypted data of said first content management unit; and
   (C) after decrypting the first encrypted data of the first content management unit, cause at least one of:
    (1) the data file of the first content management unit to be reproduced; and
    (2) the program file of the first content management unit to be executed.

32. The information processing method according to claim 31, which includes causing the processor to execute the plurality of instructions to operate with the information processing apparatus to: (i) detect a switch from a first content management unit to a second, different content management unit, and (ii) if the switch is detected, acquire the individual unit key associated with the second, different content management unit based on a management table, the management table including unit setting unit information for each of the plurality of content management units, content management unit identification information for each of the plurality of content management units, and unit key identification information associated with each of the plurality of content management units.

33. The information processing method according to claim 31, which includes:
 causing the processor to execute the plurality of instructions to operate with the information processing apparatus to decrypt a renewal key information block to obtain a media key, the decryption based on a device key associated with a legal content use right of the information processing apparatus, said device key being associated with said content management unit.

34. The information processing method according to claim 31, which includes causing the processor to execute the plurality of instructions to operate with the information processing apparatus to the device key via communication with an information recording medium or a networked server.

35. The information processing method according to claim 31, which includes:
 causing the processor to execute the plurality of instructions to operate with the information processing apparatus to: (a) execute authentication processing with a networked server, and (b) upon successful authentication of the networked server, acquire information necessary for content reproduction from said networked server, the acquired information including at least one of: (i) one of the unit keys; and (ii) one of a plurality of content use conditions.

36. The information processing method according to claim 31, which includes causing the processor to execute the plurality of instructions to operate with the information processing apparatus to:
 (a) acquire an authentication key to decrypt a renewal key information block in association with a media key, the media key associated with said content management unit and a legal content use right of the information processing apparatus;
 (b) authenticate a networked server based on the authentication key obtained from decrypting said renewal key information block; and
 (c) upon successful authentication of the networked server, acquire information necessary for content reproduction from said networked server, the acquired information including at least one of: (i) one of the unit keys; and (ii) one of a plurality of content use conditions.

37. The information processing method according to claim 31, which includes causing the processor to execute the plurality of instructions to operate with the information processing apparatus to:
 (a) determine whether said content management unit has network independent status or network associated status; and
 (b) control content use based on the determination.

38. The information processing method according to claim 37, wherein said content use control is based on a content use management information table which stores control information associated with each said content management unit.

39. The information processing method according to claim 31, which includes causing the processor to execute the plurality of instructions to operate with the information processing apparatus to:
(a) receive operation control information from a networked server, the operation control information corresponding to at least one of the content files of the plurality of management units; and
(b) based on the received operation control information, cause at least one of: (1) the data file of said content management unit to be reproduced or copied; and (2) the program file of the content management unit to be executed or copied.

40. The information processing method according to claim 31, which includes causing the processor to execute the plurality of instructions to operate with the information processing apparatus to:
(a) transmit at least one of an user identifier, an information processing apparatus identifier, and an information recording medium identifier to a networked server;
(b) receive operation control information from the network server based on the at least one identifier transmitted to said networked server; and
(c) based on the received operation control information, cause at least one of: (1) the data file of said content management unit to be reproduced or copied; and (2) the program file of the content management unit to be executed or copied.

41. An information processing apparatus comprising:, comprising:
a processor; and
a memory device which stores:
(a) data corresponding to a plurality of content management units including encryptable data, the content management units including a first content management units including first encrypted data which includes:
(i) the at least one content file, the content file including at least one of a data file reproducible by an information processing apparatus and a program file executable by the information processing apparatus; and
(ii) at least one of a content reproduction section specification file, a content reproduction processing program file, an application index file, and an application execution file; and
(b) a plurality of instructions, which when executed by the processor, cause the processor to:
(i) identify one of the content management units from the plurality of content management units;
(ii) determine if the identified content management unit includes the first encrypted data; and
(iii) if the identified content management unit includes the first encrypted data:
(A) select a first unit key from a plurality of units keys, the selected first unit key corresponding to the first content management unit, each one of the plurality of different unit keys being associated with at least one of the plurality of different content management units;
(B) using the selected first unit key, decrypt the first encrypted data of said first content management unit; and
(C) after decrypting the first encrypted data of the first content management unit, cause at least one of:
(1) the data file of the first content management unit to be reproduced; and
(2) the program file of the first content management unit to be executed.

42. A server in communication with a reproducing apparatus, said server comprising:
a processor;
an authentication processing section; and
a memory device which stores:
(a) a plurality of unit keys, each of the unit keys corresponding to at least one of a plurality of content management units which include encryptable data, the plurality of content management units being stored by an information recording medium operable with the reproducing apparatus, said plurality of content management units including a first content management unit which includes first encrypted data which includes:
(i) the at least one content file, the content file including at least one of a data file reproducible by the reproducible apparatus and a program file executable by the reproducible apparatus; and
(ii) at least one of a content reproduction section specification file, a content reproduction processing program file, an application index file, and an application execution file; and
(b) a plurality of instructions, which when executed by the processor, cause the processor to operate with the authentication processing section to:
(i) authenticate said reproducing apparatus based on an authentication key; and
(ii) upon successful authentication of the reproducing apparatus, provide a designated one of the unit keys to said reproducing apparatus, the designated unit key corresponding to the first content management unit, wherein the first encrypted data of said first content management unit is decryptable based on the designated unit key to cause at least one of: (A) the reproducing apparatus to reproduce the data file of the first content management unit; and (B) the reproducing apparatus to execute the program file of the first content management unit.

43. The server according to claim 42 further comprising:
an authentication key database storing a plurality of different authentication keys; and
a renewal key information block database which stores a renewal key information block associated with one of the authentication keys for authenticating the reproducing apparatus, the renewal key information block being encrypted based on a device key associated with a legal content use right of the reproducing apparatus,
wherein when executed by the processor, the plurality of instructions cause the processor to operate with the authentication processing section to provide said renewal key information block to the reproducing apparatus, such that the reproducing apparatus executes content reproduction and executes authentication processing based on the authentication key received from said authentication key database.

* * * * *